US012211481B2

(12) United States Patent
Memoli et al.

(10) Patent No.: US 12,211,481 B2
(45) Date of Patent: Jan. 28, 2025

(54) ACOUSTIC METAMATERIAL SYSTEMS

(71) Applicant: THE UNIVERSITY OF SUSSEX, Brighton (GB)

(72) Inventors: Gianluca Memoli, Brighton (GB); Mihai Caleap, Bristol (GB); Bruce Drinkwater, Bristol (GB); Sriram Subramanian, Brighton (GB)

(73) Assignee: The University of Sussex, Brighton (GB)

( * ) Notice: Subject to any disclaimer, the term of this patent is extended or adjusted under 35 U.S.C. 154(b) by 107 days.

(21) Appl. No.: 17/602,928

(22) PCT Filed: Apr. 14, 2020

(86) PCT No.: PCT/GB2020/050948
§ 371 (c)(1),
(2) Date: Oct. 11, 2021

(87) PCT Pub. No.: WO2020/208380
PCT Pub. Date: Oct. 15, 2020

(65) Prior Publication Data

US 2022/0180853 A1 Jun. 9, 2022

(30) Foreign Application Priority Data

Apr. 12, 2019 (GB) ...................................... 1905258

(51) Int. Cl.
*G10K 11/175* (2006.01)
*G10K 11/16* (2006.01)
*G10K 11/30* (2006.01)

(52) U.S. Cl.
CPC ............ *G10K 11/30* (2013.01); *G10K 11/175* (2013.01)

(58) Field of Classification Search
CPC ...... G10K 11/22; G10K 11/26; G10K 11/172; G10K 11/175; G10K 11/04; G10K 11/30;
(Continued)

(56) References Cited

U.S. PATENT DOCUMENTS 3,725,826 A 4/1973 Chiron
4,506,759 A 3/1985 Fatovic
(Continued)

FOREIGN PATENT DOCUMENTS

CN 106297762 A 1/2017
CN 106856090 A 6/2017
(Continued)

OTHER PUBLICATIONS

Ghaffarivardavagh, R. et al., "Ultra-open acoustic metamaterial silencer based on Fano-like interference," Physical Review B 99, 024302, Jan. 2019, American Physical Society, 10 pages.
(Continued)

*Primary Examiner* — Edgardo San Martin
(74) *Attorney, Agent, or Firm* — Withrow + Terranova, PLLC; Vincent K. Gustafson

(57) ABSTRACT

Disclosed herein are systems using acoustic metamaterial surfaces comprising arrangements of unit cells arranged to introduce time delays to an incident acoustic wave. In embodiments the relative positions of two or more acoustic metasurfaces (81, 82) is selected or adjusted to control the acoustic output of the system such that the acoustic output of the system is a non-linear combination of the respective operations performed by the plurality of acoustic metasurfaces (81, 82), the non-linear combination being a convolution of the respective operations performed by the plurality of acoustic metasurfaces that is determined as a function of the relative positioning between the acoustic metasurfaces
(Continued)

(81, 82). Also disclosed are applications of such acoustic metasurfaces in noise-reducing structures.

23 Claims, 19 Drawing Sheets

(58) Field of Classification Search
CPC ........ G10K 11/02; G10K 11/34; G01N 29/06; G01N 29/22; G01N 29/26; H04R 3/12
See application file for complete search history.

(56) References Cited

U.S. PATENT DOCUMENTS

| | | | | |
|---|---|---|---|---|
| 4,541,687 | A * | 9/1985 | Brooks | G06G 7/195 359/559 |
| 5,477,736 | A | 12/1995 | Lorraine | |
| 5,546,360 | A | 8/1996 | Deegan | |
| 6,554,826 | B1 | 4/2003 | Deardorff | |
| 7,561,320 | B2 | 7/2009 | Wang et al. | |
| 8,717,659 | B2 | 5/2014 | Zheludev et al. | |
| 9,390,702 | B2 | 7/2016 | Mathur | |
| 9,437,183 | B2 | 9/2016 | Semperlotti et al. | |
| 9,525,944 | B2 | 12/2016 | Clemen, Jr. | |
| 10,043,508 | B2 | 8/2018 | Park et al. | |
| 10,116,804 | B2 | 10/2018 | Cheatham, III et al. | |
| 10,160,061 | B2 | 12/2018 | Helvajian | |
| 10,284,176 | B1 | 5/2019 | Solal | |
| 10,755,538 | B2 * | 8/2020 | Carter | G10K 11/22 |
| 10,873,812 | B2 * | 12/2020 | Subramanian | H04R 3/12 |
| 11,228,838 | B2 * | 1/2022 | Subramanian | G10K 11/26 |
| 2012/0163129 | A1 | 6/2012 | Antoine et al. | |
| 2013/0112496 | A1 | 5/2013 | Neogi et al. | |
| 2013/0301394 | A1 | 11/2013 | Chen et al. | |
| 2013/0338499 | A1 | 12/2013 | Kameishi et al. | |
| 2014/0060960 | A1 | 3/2014 | Walker et al. | |
| 2015/0316511 | A1 | 11/2015 | Guo | |
| 2016/0027427 | A1 | 1/2016 | Yang et al. | |
| 2016/0044417 | A1 | 2/2016 | Clemen, Jr. et al. | |
| 2016/0111080 | A1 | 4/2016 | Robertson | |
| 2016/0189702 | A1 | 6/2016 | Blanc et al. | |
| 2016/0376192 | A1 | 12/2016 | Mitchell et al. | |
| 2017/0069303 | A1 * | 3/2017 | Song | G10K 11/08 |
| 2017/0085981 | A1 | 3/2017 | Mathur | |
| 2017/0112671 | A1 | 4/2017 | Goldstein | |
| 2018/0047259 | A1 | 2/2018 | Carter et al. | |
| 2018/0090124 | A1 | 3/2018 | Bowers et al. | |
| 2018/0166062 | A1 | 6/2018 | Hoffberg | |
| 2018/0257076 | A1 | 9/2018 | Weitz et al. | |
| 2018/0351656 | A1 | 12/2018 | Shi et al. | |
| 2018/0374466 | A1 | 12/2018 | Kim et al. | |
| 2019/0005938 | A1 | 1/2019 | Naya et al. | |
| 2019/0035374 | A1 | 1/2019 | Martin et al. | |
| 2019/0364362 | A1 | 11/2019 | Subramanian et al. | |
| 2021/0195332 | A1 | 6/2021 | Subramanian et al. | |
| 2022/0303681 | A1 | 9/2022 | Subramanian et al. | |

FOREIGN PATENT DOCUMENTS

| | | | | |
|---|---|---|---|---|
| CN | 108847211 | A | 11/2018 | |
| CN | 110012397 | A | 7/2019 | |
| JP | S57155893 | A | 9/1982 | |
| JP | S57155894 | A | 9/1982 | |
| KR | 20160099745 | A | 8/2016 | |
| KR | 20170011943 | A | 2/2017 | |
| KR | 101928141 | B1 | 12/2018 | |
| WO | 0209486 | A2 | 1/2002 | |
| WO | 2006055798 | A1 | 5/2006 | |
| WO | 2008023991 | A1 | 2/2008 | |
| WO | 2008135922 | A1 | 11/2008 | |
| WO | 2012106327 | A1 | 8/2012 | |
| WO | 2014207440 | A1 | 12/2014 | |
| WO | 2015039622 | A1 | 3/2015 | |
| WO | 2015129969 | A1 | 9/2015 | |
| WO | 2015157199 | A1 | 10/2015 | |
| WO | 2016022826 | A1 | 2/2016 | |
| WO | 2016118533 | A1 | 7/2016 | |
| WO | 2016173502 | A1 | 11/2016 | |
| WO | 2016196476 | A1 | 12/2016 | |
| WO | 2017011064 | A1 | 1/2017 | |
| WO | 2017027234 | A1 | 2/2017 | |
| WO | 2017075187 | A2 | 5/2017 | |
| WO | 2017093693 | A1 | 6/2017 | |
| WO | WO-2017093690 | A1 * | 6/2017 | G10K 11/04 |
| WO | 2017139126 | A1 | 8/2017 | |
| WO | 2017160364 | A1 | 9/2017 | |
| WO | 2017180436 | A1 | 10/2017 | |
| WO | 2017187216 | A1 | 11/2017 | |
| WO | 2018017558 | A1 | 1/2018 | |
| WO | 2018029460 | A1 | 2/2018 | |
| WO | 2018146489 | A1 | 8/2018 | |
| WO | 2018178764 | A1 | 10/2018 | |
| WO | 2019072746 | A1 | 4/2019 | |
| WO | 2019141794 | A1 | 7/2019 | |
| WO | 2020023820 | A1 | 1/2020 | |
| WO | 2020028838 | A1 | 2/2020 | |
| WO | 2020169498 | A1 | 8/2020 | |
| WO | 2020169711 | A1 | 8/2020 | |
| WO | 2020210690 | A1 | 10/2020 | |
| WO | 2021247519 | A1 | 12/2021 | |

OTHER PUBLICATIONS

Non-Final Office Action for U.S. Appl. No. 16/483,907, mailed Jan. 27, 2020, 10 pages.
Notice of Allowance for U.S. Appl. No. 16/483,907, mailed Aug. 10, 2020, 9 pages.
Non-Final Office Action for U.S. Appl. No. 17/127,555, mailed May 13, 2021, 10 pages.
Notice of Allowance for U.S. Appl. No. 17/127,555, mailed Sep. 8, 2021, 9 pages.
Search Report for United Kingdom Patent Application No. GB1702131.2, mailed Mar. 10, 2017, 5 pages.
International Search Report and Written Opinion for International Patent Application No. PCT/GB2018/050373, mailed Jul. 16, 2018, 15 pages.
International Preliminary Report on Patentability for International Patent Application No. PCT/GB2018/050373, mailed Aug. 22, 2019, 12 pages.
International Search Report (Form PCT/ISA/210) for International Application No. PCT/GB2020/050948 mailed Sep. 7, 2020, 5 pages.
Written Opinion (Form PCT/ISA/237) for International Application No. PCT/GB2020/050948 mailed Sep. 7, 2020, 11 pages.
Combined Search and Examination Report under Sections 17 and 18(3) for United Kingdom Patent Application No. GB2116381.1, mailed Feb. 15, 2022, 14 pages.
Combined Search and Examination Report under Sections 17 and 18(3) for United Kingdom Patent Application No. GB2116381.1 dated Feb. 15, 22, 14 pages.
Ghaffarivardavagh, R., et al., "Ultra-open acoustic metamaterial silencer based on Fano-like interference," Physical Review B 99, 024302 (2019), 10 pages.
Non-Final Office Action for U.S. Appl. No. 17/577,367, mailed Nov. 28, 2022, 14 pages.
Examination Report under Section 18(3) for United Kingdom Patent Application No. GB2116381.1, mailed Sep. 22, 2022, 3 pages.
Airoldi, L. et al., "Design of tunable acoustic metamaterials through periodic arrays of resonant shunted piezos," New Journal of Physics, vol. 13, 2011, IOP Publishing Ltd and Deutsche Physikalische Gesellschaft, 22 pages.
Al Jahdali, R. et al., "High transmission acoustic focusing by impedance-matched acoustic meta-surfaces," Applied Physics Letters, vol. 108, No. 031902, 2016, AIP Publishing LLC, 6 pages.
Author Unknown, "Fabricating MEMS and Nanotechnology," MNX, 2019, https://www.mems-exchange.org/MEMS/fabrication.html, 10 pages.

(56) References Cited

OTHER PUBLICATIONS

Author Unknown, "MEMS and Nanotechnology Applications," MNX, 2019, https://www.mems-exchange.org/MEMS/applications.html, 2 pages.
Author Unknown, "What is MEMS Technology," MNX, 2019, https://www.mems-exchange.org/MEMS/what-is.html, 3 pages.
Author Unknown, "Global MEMS & Sensors for Mobile Phones and Tablets: 2014 Report," PR Newswire, Jul. 14. 2014, https://www.prnewswire.com/news-releases/global-mems-sensors-for-mobile-phones-and-tablets-2014-report-267041421.html, 7 pages.
Author Unknown, "High Speed Visible DLP® chips," Texas Instruments, 2019, https://www.ti.com/dlp-chip/advanced-light-control/high-speed-visible/overview.html, 2 pages.
Bogue, R. et al., ""Recent developments in MEMS sensors: a review of applications, marketsand technologies,"" Sensor Review, vol. 33, No. 4, 2013, Emerald Group Publishing Limited, pp. 300-304.
Carter, T. et al., "UltraHaptics: Multi-Point Mid-Air Haptic Feedback for Touch Surfaces," 2013, ACM, 10 pages.
Cranston, D. et al., "A review of high intensity focused ultrasound in relation to the treatment of renal tumours and other malignancies," Ultrasonics Sonochemistry, vol. 27, 2015, Elsevier B.V., pp. 654-658.
Cui, T. et al., "Coding metamaterials, digital metamaterials and programmable metamaterials," Light: Science & Applications, vol. 3, e218, 2014, CIOMP, 9 pages.
Cummer, S. et al., "Controlling sound with acoustic metamaterials," Nature Reviews Materials, Article No. 16001, 2016, Macmillan Publishers Limited, 13 pages.
Devore, R. et al., "Image Compression Through Wavelet Transform Coding," IEEE Transactions on Information Theory, vol. 38, No. 2, Mar. 1992, IEEE, pp. 719-746.
Gelat, P. et al., "A comparison of methods for focusing the field of a HIFU array transducer through human ribs," Physics in Medicine and Biology, vol. 59, 2014, IOP Publishing, pp. 3139-3171.
Geng, J., "Three-dimensional display technologies," Advances in Optics and Photonics, vol. 5, 2013, OSA, pp. 456-535.
Ghodssi, R. et al., "Thick Buried Oxode in Silicon (TBOS): An Integrated Fabrication Technology for Multi-Stack Wafer-Bonded MEMS Processes," presented at Transducers '99, the 10th International Conference on Solid-State Sensors and Actuators, Sendai, Japan, Jun. 7-10, 1999, 4 pages.
Giovampaola, C. et al., "Digital metamaterials," Nature Materials, vol. 13, Dec. 2014, Macmillan Publishers Limited, pp. 1115-1121.
Jiang, X. et al., "Convert acoustic resonances to orbital angular momentum," Accepted Manuscript, 2016, Chorus, 6 pages.
Lalonde, R. et al., "Field Conjugate Acoustic Lenses for Ultrasound Hyperthermia," IEEE Transactions on Ultrasonics, Ferroelectrics, and Frequency Control, vol. 40, No. 5, Sep. 1993, IEEE, pp. 592-602.
Lane, C. et al., "The Inspection of Anisotropic Single-Crystal Components Using a 2-D Ultrasonic Array," IEEE Transactions on Ultrasonics, Ferroelectrics, and Frequency Control, vol. 57, No. 12, Dec. 2010, IEEE, pp. 2742-2752.
Larouche, S. et al., "Reconciliation of generalized refraction with diffraction theory," Optics Letters, vol. 37, No. 12, Jun. 15, 2012, Optical Society of America, pp. 2391-2393.
Li, Y. et al., "Experimental Realization of Full Control of Reflected Waves with Subwavelength Acoustic Metasurfaces," Physical Review Applied, vol. 2, Article 064002, 2014, American Physical Society, 11 pages.
Li, Y. et al., "Metascreen-Based Acoustic Passive Phased Array," Physical Review Applied, vol. 4, No. 024003, American Physical Society, 7 pages, Aug. 2015.
Li, Y. et al., "Reflected wavefront manipulation based on ultrathin planar acoustic metasurfaces," Scientific Reports, vol. 3, Article No. 2546, 2013, 6 pages.
Li, Y. et al., "Theory of metascreen-based acoustic passive phased array," New Journal of Physics, vol. 18, 2016, IOP Publishing Ltd and Deutsche Physikalische Gesellschaft, 20 pages.
Li, Y. et al., ""Three-dimensional collimatedself-accelerating beam through acoustic metascreen,"" Scientific Reports, vol. 5, No. 17612, 2015, 7 pages.
Liang, Z. et al., "Extreme Acoustic Metamaterial by Coiling up Space," Physical Review Letters, vol. 108, Mar. 16, 2012, American Physical Society, 5 pages.
Lipsman, N. et al., "MR-guided focused ultrasound thalamotomy for essential tremor: a proof-of-concept study," Lancet Neurology, vol. 12, Issue 5, May 2013, Elsevier Ltd., pp. 462-468.
Ma, G. et al., "Acoustic metamaterials: From local resonances to broad horizons," Science Advances, vol. 2, No. 2, e1501595, Feb. 26, 2016, 17 pages.
Marcellin, M. et al., "An overview of quanitization in JPEG 2000," Signal Processing: Image Communication, vol. 17, 2002, Elsevier Science B.V., pp. 73-84.
Marzo, A. et al., "Holographic acoustic elements for manipulation of levitated objects," Nature Communications, vol. 6, No. 8661, 2015, Macmillan Publishers Limited, 7 pages.
Marzo, A. et al., "Holographic acoustic elements for manipulation of levitated objects—Supplementary Material," Nature Communications, vol. 6, No. 8661, 2015, Macmillan Publishers Limited, 14 pages.
Mei, J. et al., "Controllable transmission and total reflection through an impedance-matched acoustic metasurface," New Journal of Physics, vol. 16, 2014, IOP Publishing Ltd Deutsche Physikalische Gesellschaft, 12 pages.
Memoli, G. et al., "Metamaterial bricks and quantization of metasurfaces," Nature Communications, vol. 8, a14608, 2017, 9 pages.
Miki, N. et al., "Multi-stack silicon-direct wafer bonding for 3D MEMS manufacturing," Sensors and Actuators A, vol. 103, 2003, Elsevier Science B.V., pp. 194-201.
Padgett, M. et al., "Holographic optical tweezers and their relevance to lab on chip devices," Lab Chip, vol. 11, 2011, the Royal Society of Chemistry, pp. 1196-1205.
Popa, B. et al., "Tunable active acoustic metamaterials," Physical Review B, vol. 88, 2013, American Physical Society, 8 pages.
Sackmann, E. et al., "The present and future role of microfluidics in biomedical research," Nature, vol. 507, Mar. 13, 2004, Macmillan Publishers Limited, 9 pages.
Scansen, D., "How MEMS Enable Smartphone Features," Engineering.com, Aug. 6, 2013, https://www.engineering.com/ElectronicsDesign/ElectronicsDesignArticles/ArticleID/6124/How-MEMS-Enable-Smartphone-Features.aspx#disqus_thread, 4 pages.
Silva, A. et al., "Performing Mathematical Operations with Metamaterials," Science, vol. 343, Jan. 10, 2014, American Association for the Advancement of Science, pp. 160-163.
Thalhammer, G. et al., "Speeding up liquid crystal SLMs using overdrive with phase change reduction," Optics Express, vol. 21, No. 2, 2013, Optical Society of America, 19 pages.
Wooh, S. et al., "Influence of phased array element size on beam steering behavior," Ultrasonics, vol. 36, 1998, Elsevier Science B.V., pp. 737-749.
Xie, Y. et al., "Wavefront modulation and subwavelength diffractive acoustics with an acoustic metasurface," Nature Communications, vol. 5, No. 5553, Macmillan Publishers Limited, 5 pages Nov. 2014.
Yang, J. et al., "Acoustic beamforming of a parametric speaker comprising ultrasonic transducers," Sensors and Actuators A, vol. 125, 2005, Elsevier B.V., pp. 91-99.
Yu, N. et al., "Light Propogation with Phase Discontinuities: Generalized Laws of Reflection and Refraction," Science, vol. 334, Oct. 21, 2011, American Association for the Advancement of Science, pp. 333-337.
Zhu, X. et al., "Implementation of dispersion-free slow acoustic wave propogation and phase engineering with helical-structured metamaterials," Nature Communications, vol. 7, May 2016, 7 pages.
International Search Report (Form PCT/ISA/210) for International Application No. PCT/GB2020/050948 mailed Jul. 13, 2020, 5 pages.
International Search Report (Form PCT/ISA/237) for International Application No. PCT/GB2020/050948 mailed Jul. 13, 2020, 11 pages.

(56) References Cited

OTHER PUBLICATIONS

Norasikin, M.A., et al., “SoundBender: Dynamic Acoustic Control Behind Obstacles,” pp. 247-259, UIST 2018, Oct. 14-17, 2018, Berlin, Germany, Association for Computing Machinery, URL<https://doi.org/10.1145/3242587.3242590>.

Search Report under Section 17(5) for United Kingdom Patent Application No. GB1905258.8 dated Jul. 29, 2019, 9 pages.

Examination Report for European Patent Application No. 20721688.8, mailed Jun. 6, 2023, 7 pages.

Declaration of Gianluca Memoli under 37 C.F.R. 1.132 Concerning Disclosure at 2018 Consumer Electronics Show dated Dec. 21, 2023, 2 pages.

Digital photograph of Metasonics booth and Prototype Window at 2018 Consumer Electronics Show in Las Vegas, Nevada between Jan. 8-12, 2018, 1 page.

Wright, Shona, “Metamaterials startup wins award for sonic technology,” Jun. 25, 2018 [online], [retrieved on Dec. 26, 2023]. Retrieved from the Internet <URL: https://techspark.co/blog/2018/06/25/metamaterials-startup-wins-award-for-sonic-technology/>, 3 pages.

Examination Report for European Patent Application No. 23218313.7, mailed Oct. 14, 2024, 8 pages.

* cited by examiner

ACOUSTIC METAMATERIAL SYSTEMS

This application is a 35 U.S.C. § 371 national phase filing of International Application No. PCT/GB/2020/050948 filed on Apr. 14, 2020 and claims the benefit of United Kingdom Patent Application No. 1905258.8 filed on Apr. 12, 2019, wherein the contents of the foregoing applications are hereby incorporated by reference herein in their respective entireties.

The present disclosure relates generally to devices for manipulating acoustic waves. In embodiments, the present disclosure relates to acoustic systems comprising a plurality of acoustic metasurfaces each comprising a plurality of unit cells arranged for manipulating incoming acoustic waves to generate a respective acoustic output. The present disclosure also relates in embodiments to noise reducing structures including such metamaterial unit cells.

BACKGROUND

The ability to manipulate acoustic waves may be important in various fields including, but not limited to, noise control, power charging, loudspeaker design, position/motion sensing, ultrasound imaging and therapy (e.g. High Frequency Focussed Ultrasound techniques), non-destructive testing of engineering structures, haptic control utilising focused acoustic waves (i.e. haptic user interfaces) and acoustic particle manipulation e.g. acoustic levitation. These applications generally require more precise control of acoustic waves.

Current approaches for manipulating acoustic waves rely on relatively large fixed acoustic lenses, or a phased array of transducers wherein the amplitudes and phases of the individual transducers within the array are independently controlled.

The latter approach is generally the preferred implementation (e.g.) for consumer electronic devices such as parametric speakers, mid-air haptic devices, proximity sensors, and the like. For instance, within such systems the amplitudes and phases may be controlled either by controlling the relative positions of the transducers within the array, within a fixed geometry, or more typically by introducing a phase delay by triggering the individual transducers at different points in time.

However, phased transducer arrays are difficult to scale up, and can be relatively bulky and expensive to control or manufacture.

Accordingly, it is desired to provide improved techniques for manipulating acoustic waves.

SUMMARY

According to a first aspect of the present disclosure, there is provided a method for designing or constructing a system for manipulating an incident acoustic wave to generate an acoustic output, the method comprising:

- providing a plurality of acoustic metasurfaces, each acoustic metasurface comprising an arrangement of unit cells, with at least some of the unit cells being configured to introduce time delays to an incident acoustic wave at the respective positions of the unit cells within the acoustic metasurface, such that the unit cells define an arrangement of time delays to thereby define a spatial delay distribution for manipulating an incident acoustic wave, and such that each acoustic metasurface performs a respective operation on an incident acoustic wave based on its spatial delay distribution; and
- selecting or adjusting the relative positioning between the acoustic metasurfaces to control the acoustic output of the system.

According to a second aspect of the present disclosure, there is provided a system for manipulating an incident acoustic wave to generate an acoustic output comprising:

- a plurality of acoustic metasurfaces, each acoustic metasurface comprising an arrangement of unit cells, with at least some of the unit cells being configured to introduce time delays to an incident acoustic wave at the respective positions of the unit cells within the acoustic metasurface, such that the unit cells define an arrangement of time delays to thereby define a spatial delay distribution for manipulating an incident acoustic wave, and such that each acoustic metasurface performs a respective operation on an incident acoustic wave based on its spatial delay distribution;
- wherein the relative positions of the acoustic metasurfaces are selected or adjusted to control the acoustic output of the system.

Preferably, according to the first and second aspects, the relative positions of the acoustic metasurfaces are selected or adjusted to control the acoustic output of the system such that the acoustic output of the system is a non-linear combination of the respective operations performed by the plurality of acoustic metasurfaces. In particular, the acoustic output may be given by (i.e. or determined from) a convolution of the respective operations performed by the plurality of acoustic metasurfaces that is determined as a function of the relative positioning between the acoustic metasurfaces.

The present disclosure, in any of its aspects and embodiments, relates generally to novel approaches for manipulating acoustic waves using various arrangements of metamaterial unit cells that are each capable of encoding a particular time delay (or in some cases a set of time delays).

In particular, according to the first and second aspects, the unit cells may be arranged into respective acoustic "metasurfaces" with each metasurface thus comprising an arrangement of plural unit cells. For instance, the unit cells within an acoustic metasurface may be arranged into a substantially contiguous array of unit cells. However, other suitable arrangements would also be possible. In whichever manner the unit cells are arranged the positions of the unit cells within an acoustic metasurface thus define an arrangement of time delays to thereby define a spatial delay distribution for manipulating an incident acoustic wave. The particular arrangement of unit cells within a metasurface controls the acoustic output that is generated by that surface, e.g., in response to an incoming acoustic wave. Each acoustic metasurface is therefore capable of performing a respective manipulation (i.e. operation) that is determined by its spatial delay distribution.

For example, the arrangement of unit cells within a particular acoustic metasurface may be arranged to perform a focusing operation to focus an incoming acoustic wave towards a particular point. In that case, the acoustic metasurface may be arranged as an acoustic "lens" (having an associated focal length). However, various other arrangements would of course be possible. For instance, a particular acoustic metasurface may be configured to act as an acoustic filter (to remove particular frequencies from the spectrum of an acoustic source), or a steering device (to perform a steering operation). In fact, an advantage of the unit cell metamaterial-based approaches described herein is that they provide the possibility for relatively easily designing and constructing a vast range of different acoustic metasurfaces (with different spatial delay distributions) capable of manipulating incident acoustic waves in a corresponding range of different ways to perform a range of operations (e.g. focusing, steering, noise reduction, intensity modulation etc.), depending on the desired acoustic output.

According to the present disclosure the unit cells generally comprise of "acoustic metamaterials". In other words, an acoustic metasurface, as used herein, is an acoustic metamaterial that is defined by an arrangement of individual metamaterial unit cells. As will be understood, an acoustic metamaterial can generally be constructed from any suitable material (e.g. paper, wood, metal, plastic, rubber) but has a structure (e.g. geometry, size, and/or arrangement) that is designed to perform various manipulations for an acoustic wave incident on the acoustic metamaterial, in particular by altering the effective speed of sound and/or path length within the material. In this context, the acoustic metamaterial performs passive wave engineering at a local level, effectively slowing down or speeding up acoustic waves impinging on (and/or passing through) the metamaterial surface.

For instance, an acoustic metamaterial can generally be characterised in terms of its effective mass density and bulk modulus, or by an effective length. These parameters will then determine how an acoustic wave incident on and passing into and/or through the acoustic metamaterial will be manipulated. The structure of an acoustic metamaterial can thus be engineered to tailor these properties in various ways (including providing negative effective mass density and/or bulk modulus, leading to interesting effects not normally occurring in nature such as negative refraction and sub-diffraction focusing).

It will be appreciated that metamaterial-based approaches may provide various advantages compared to more traditional approaches for shaping acoustic waves. For instance, phased transducer arrays offer real-time control of the desired acoustic field, but are often bulky and expensive, with cost and complexity typically scaling with the number of channels. On the other hand, traditional (non-metamaterial) acoustic lenses may be relatively cheaper but are typically relatively large (e.g. of the order 1 metre or larger for operation at 340 Hz) and presently limited mainly for use in higher frequency applications.

Such acoustic metamaterials have thus established themselves as a means for pushing the boundaries of acoustic manipulation beyond the limits of traditional transducer arrays and (non-metamaterial) acoustic lenses, towards more compact and cheaper devices. For example, effects such as anomalous diffraction, self-bending beams and acoustic holograms are now well accepted for audio and ultrasonic applications.

However, current generation metamaterial-based approaches are highly specialised, with the metamaterial typically designed with only a single function in mind. Such approaches can therefore be relatively inflexible.

One approach for addressing these limitations would be to realise acoustic metamaterials whose properties can be individually 'tuned' (or otherwise reconfigured) in order to change the associated acoustic output. Various possibilities might be considered in this respect. For instance, the structure of the acoustic metamaterial itself (and hence the effect introduced to an incoming acoustic wave) may be changed by suitable actuation using, e.g., piezoelectric or electromagnetic control, actuation by magnetic fields, by dynamically changing the structure of an array of acoustically trapped particles, by exploiting non-linear propagation, by mechanical actuation, by temperature changes, by partially filling the metamaterial itself with water or an elastomer, among other possibilities.

For example, International (PCT) Patent Publication number WO 2018/146489 describes an approach wherein a plurality of unit cells are provided in an array, with at least some of the unit cells being individually reconfigurable to change the respective time delays introduced by those unit cells to an incident acoustic wave at the respective positions of the unit cells within the array of unit cells. The spatial delay distribution of the array can thus be reconfigured accordingly by adjusting the individual unit cells to change the overall acoustic output.

Another approach, also described in International (PCT) Patent Publication number WO 2018/146489, would be to construct an acoustic metasurface from a plurality of preconfigured unit cells arranged into an array, with the unit cells being preconfigured to introduce a fixed time delay, but with the fixed unit cells then being physically rearranged to change the spatial delay distribution of the acoustic metasurface. That is, the positions of the unit cells within the array can also be changed in order to adjust the spatial delay distribution and to change the overall acoustic output.

Various combinations of these two approaches, as well as various other arrangements, are also contemplated in International (PCT) Patent Publication number WO 2018/146489.

However, it will be appreciated that these approaches may involve relatively complex control systems for tuning the acoustic metamaterial, or may still be limited in the range of configurability. Thus, whilst the various approaches described in International (PCT) Patent Publication number WO 2018/146489 provide many advantages compared to more traditional approaches, it would still be desirable to provide more, or more easily, adjustable systems for manipulating acoustic waves. Or, considered alternatively, it would be desirable to provide additional means for manipulating acoustic waves that can be used either in support of, or in place of, these approaches.

International (PCT) Patent Publication number WO 2018/146489 also describes how multiple such layers of unit cells may be stacked together. In particular, International (PCT) Patent Publication number WO 2018/146489 describes, among other arrangements, devices wherein multiple layers of unit cells are stacked together with a fixed spacing that is designed to substantially optimise transmission.

Against this background, the Applicants have now recognised (for the first time) that the relative positioning between two or more acoustic metasurfaces provides an additional design parameter that can be used for controlling (or adjusting) the acoustic output.

For instance, in International (PCT) Patent Publication number WO 2018/146489, the layers of unit cell are preferably stacked relatively closely together (e.g. in direct contact) such that all of the sound coming from a particular unit cell in one layer is passed into the unit cell at the corresponding position in an adjacent layer (and so on). At each position in the device, an acoustic wave thus experiences a time delay that is simply a linear combination of the time delays for the unit cells at that position. Accordingly, the overall acoustic output from the device is essentially a linear combination of the acoustic outputs from each of the individual layers (since time delays are generally additive).

However, the Applicants have now discovered that when designing systems comprising a plurality of acoustic metasurfaces, the relative positioning (e.g. mutual distance, relative angle of rotation in respect to a reference axis, etc.) between two or more of the acoustic metasurfaces in fact also controls the overall acoustic output of the system (since the relative positioning will impact how an acoustic wave output from a first acoustic metasurface will impinge onto a second acoustic metasurface, etc.). Thus, by selecting or adjusting the relative positioning (e.g. distance) between the acoustic metasurfaces appropriately, it is possible to further control the acoustic output.

In other words, the acoustic output of such systems designed according to the first and second aspects of the present disclosure rather than simply being a linear addition of the operations performed by the respective acoustic metasurfaces, is now determined through a relationship involving the relative positioning between the acoustic metasurfaces (with the precise form of the relationship depending on the function assigned to the acoustic metasurfaces involved). According to the first and second aspects, the overall acoustic output provided by the system is thus preferably a convolution of the operations performed by the respective acoustic metasurfaces of the system, with the convolution function taking into account the relative positioning between the different acoustic metasurfaces.

The present disclosure thus allows acoustic systems to be designed according to these principles, with the relative positioning of two or more acoustic metasurfaces being selected appropriately to control the acoustic output, e.g. to provide a desired acoustic output.

Once the acoustic system has been designed, e.g. to provide a desired acoustic output, the relative positioning between the acoustic metasurfaces may then be fixed. However, it is also contemplated that the relative positioning between the acoustic metasurfaces may be adjustable (or adjusted) in order to be able to reconfigure the system to change the acoustic output. That is, the present disclosure in embodiments may provide for more adjustable devices to extend the range of operations that can be performed.

Thus, the present disclosure, at least according to embodiments of the first and second aspects, opens up further possibilities for manipulating acoustic waves by selecting suitable acoustic metasurfaces and then selecting (and/or adjusting) the relative positions between the metasurfaces to control the acoustic output. In turn, this opens up the possibility for designing new types of acoustic systems for providing various acoustic outputs that may be realised in a relatively low-cost and compact manner.

Also disclosed are methods of using such systems. The methods according to these aspects may thus comprise selecting or adjusting the relative positions of the acoustic metasurfaces to provide a desired acoustic output.

Each acoustic metasurface comprises an arrangement of unit cells, with at least some of the unit cells being configured to introduce time delays to an incident acoustic wave at the respective positions of the unit cells within the acoustic metasurface. The unit cells thus define an arrangement of time delays across the acoustic metasurface that in turn defines a spatial delay distribution for the acoustic metasurface. The acoustic metasurfaces, and unit cells, used herein are preferably of the same type(s) generally described in embodiments of International (PCT) Patent Publication number WO 2018/146489. Thus, in embodiments, the unit cells and/or acoustic metasurfaces may have or comprise any features described in relation to embodiments of International (PCT) Patent Publication number WO 2018/146489, at least to the extent that such features are not mutually exclusive.

It will be appreciated that the unit cells that are configured to introduce time delays have the effect of slowing down acoustic waves passing through the device. Each unit cell may be configured to introduce a particular local time delay to an acoustic wave passing through the unit cell, and optionally also a specific intensity reduction (although in some cases the unit cells may be arranged to provide substantially 100% transmission—such as greater than 95% transmission—at least at a designated operating wavelength).

For instance, the physical structure of the unit cells may be designed so as to cause the acoustic waves to travel an extended effective path length, $L_{eff}$, so that it takes longer for the acoustic waves to transit the unit cell than it would if the acoustic waves travelled directly from one side of the unit cell to the other. Thus, in preferred embodiments, the respective time delay for each of the unit cells is determined by the path length through the unit cell (and optionally back again i.e. if acoustic waves are reflected by the unit cell). Each of the unit cells may therefore have an associated path length. By changing the path length at a particular location, or e.g. using unit cells with different path lengths, the spatial delay distribution of the device can thus be changed.

Additionally, or alternatively, in some embodiments the unit cells may be configured so that the speed of sound, c, within the unit cell is changed (i.e. reduced) relative to the speed of sound in the ambient medium. In general, the time delay introduced by the unit cells may be of the order $\Delta t \sim L_{eff}/c$. Depending on the design of the unit cells, the time delay may depend on the frequency of the incident acoustic wave or may be essentially frequency independent.

Preferably, the unit cells are filled in use with the same fluid (e.g. air or water) within which they are operating. That is, preferably the unit cells are substantially open (at least at one end) to allow the surrounding fluid to pass into or through the unit cells. However, in some embodiments, it is contemplated that a different fluid may be provided within the unit cells, e.g. to further modify the properties of the incident acoustic wave.

It will be appreciated that the effect of the time delays is that for an incident acoustic wave at a particular frequency f the unit cells will introduce a phase delay, wherein the phase delay angle is given by $\Delta\varphi = k.L_{eff}(f)$, where k is the wavenumber of the incident wave (i.e. $2\pi/\lambda$, where $\lambda$ is the wavelength). That is, the phase delays are generally frequency dependent. Thus, it will be understood that where reference is made herein to a "time delay", this may alternatively be considered as a "phase delay" that depends on the frequency of the incident acoustic wave and that the time delay and phase delay values may be related to each other depending on the operating frequency or frequencies. (It will be understood that there is a well-defined relationship between frequency and wavelength for an incident acoustic wave depending on the speed of sound in the medium through which the acoustic wave is travelling, and the terms (operating) frequency and wavelength are used interchangeably herein, except where context demands otherwise.)

An acoustic metasurface may comprise any number and any arrangement of unit cells. The unit cells may be arranged relative to one another in any suitable and desired arrangement. However, in embodiments, the acoustic metasurface may comprise a two-dimensional array of M×N unit cells where M and N may each independently comprise any integer value. For example, the values of M and/or N may each be selected from the list comprising 1, 2, 3, 4, 8, 16, 24, 100. In some embodiments, the arrangement may comprise a regular rectangular/square or circular/cylindrical array of unit cells. For instance, in embodiments, an acoustic metasurface may comprise a (e.g.) 16×16, 24×24, 48×48, 100×100, etc., square array. However, in general, the unit cells may be packed in any suitable regular (or non-regular) arrangement.

The acoustic metasurfaces used herein preferably comprise a single layer of unit cells. However, it is also contemplated that an acoustic metasurface may comprise two or more layers of unit cells. In that case, the layers of unit cells within each individual acoustic metasurface may be closely stacked (and preferably in direct contact) so that there is substantially complete direct transmission through the layers of unit cells.

The arrangement of the unit cells within an acoustic metasurface may be substantially flat or two-dimensional. That is, an acoustic metasurface may be substantially planar, with the unit cells arranged in a plane. However, it is also contemplated that the arrangement of unit cells within an acoustic metasurface need not be flat, and that an acoustic metasurface may also be curved. For instance, the unit cells may be mounted on, or otherwise arranged to form, a curved surface. The curved surface may generally be convex or concave or otherwise profiled. Thus, the acoustic metasurface(s) may generally be planar or curved. Where a system of two or more acoustic metasurfaces is provided, this may comprise any combination of planar and curved acoustic metasurfaces. For instance, the system may comprise a system of (only) planar metasurfaces. However, it would also be possible for a system to comprise a combination of planar and curved metasurfaces, or only curved metasurfaces.

The different unit cells within the acoustic metasurface may be configured so as to introduce different time delays. The acoustic metasurface is thus effectively spatially quantised according to the arrangement of, i.e. the positions and dimensions of, the unit cells. The dimensions of the unit cells effectively define the resolution at which the surface is quantised in the spatial domain. It will be appreciated that the time or phase delay for a particular unit cell may be zero, and that the arrangement of unit cells within an acoustic metasurface may also contain spaces or empty cells.

An acoustic wave incident on and passing into and/or through the acoustic metasurface may thus be subject to various different time delays at the positions of the unit cells. In particular, the unit cells are arranged together in an array such that the positions of the unit cells and their associated time (or phase) delays define a spatial delay distribution across the acoustic metasurface. It is this spatial delay distribution that determines how an acoustic wave incident on the array of unit cells will interact with and be manipulated by the acoustic metasurface. Thus, by appropriately controlling (selecting) the positions and/or time delays of the (individual) unit cells within the acoustic metasurface, the acoustic metasurface may be selectively configured to perform various manipulations of the incident acoustic waves. Each acoustic metasurface can thus be (and preferably is) configured to perform a respective operation based on its respective spatial delay distribution.

The unit cells may generally take various suitable forms. For example, each of the plurality of unit cells will typically (and preferably does) comprise a central channel extending from one side of the unit cell to the other to allow acoustic waves to pass through the unit cell. The central channel may be open at both ends such that acoustic waves can be transmitted through the unit cell or the central channel may be closed at one end such that the unit cell operates in reflection. The central channel is preferably structured, and the interactions of the incident acoustic waves with this structure may increase the effective path length for the acoustic waves travelling through the unit cell, and thereby introduce a time delay. Particularly, the unit cells may each comprise a collection of structures with which the incident acoustic wave is caused to interact, with the size of the structures typically being smaller than the wavelength of the incident acoustic wave. For example, the central channel may have a substantially labyrinthine or meandered structure that determines the respective time delay for the unit cell. In other embodiments, the unit cells may comprise a multi-slit, helical, coiled or Helmholtz-resonator type structure. The structure may generally be symmetric about a plane of symmetry through the central channel (but need not be).

In general, the unit cells, and acoustic metasurfaces, described herein may be formed according to any suitable and desired manufacturing techniques. For instance, in embodiments, it is contemplated that the unit cells may each be formed as individual structures, e.g. using an additive ("bottom-up") manufacturing technique such as 3D printing, and then assembled on-demand into an array structure (an acoustic metasurface) as desired. For example, each unit cell may be fabricated monolithically as a single structure comprising an acoustic channel suitably designed to encode a desired time delay. As another example, the unit cells may be fabricated using microfluidic techniques such as etching or stereo-lithography. It would of course also be possible to etch or print the acoustic metasurface in a single step (rather than assembling it from a plurality of individually manufactured unit cells). As another example, rather than using a monolithic construction, each of the unit cells may be fabricated as, or from, a stack of (relatively thin) layers. That is, the unit cells may (each) comprise a plurality of layers that are stacked together to define the desired structure to encode a particular time delay. Similarly, the acoustic metasurface as a whole may be fabricated in this way from a plurality of stacked together layers. Various approaches for manufacturing such unit cells are described in International (PCT) Patent Publication number WO 2018/146489, although other arrangements would of course be possible.

The arrangement of the unit cells within an (or any of the) acoustic metasurface(s) may be fixed i.e. static. That is, an acoustic metasurface may be a passive device that is preconfigured to perform (only) a certain operation (at least at the designed operating wavelength (or wavelengths)). For instance, the acoustic metasurface may comprise a fixed arrangement of unit cells, with each unit cell being preconfigured to encode a particular fixed time or phase delay.

However, it is also contemplated that at least some of the acoustic metasurfaces within the system may be reconfigurable. For example, the acoustic metasurface(s) may be reconfigured according to any of the approaches described in International (PCT) Patent Publication number WO 2018/146489.

Thus, in embodiments, at least some of the unit cells within an acoustic metasurface may be individually reconfigurable that may each be selectively (controllably) reconfigured to cause the unit cell to introduce different time (or phase) delays. For instance, each of the reconfigurable unit cells may comprise one or more moveable elements moveable between a plurality of positions (such as one or more bars or flaps that can be selectively moved into a central channel of the unit cell in order to introduce a meandered structure) in order to vary the time delay introduced by the reconfigurable unit cell. In that case, each unit cell may encode a plurality of discrete time delay values, and the acoustic metasurface may be dynamically adjusted, e.g. using suitable electronic control circuitry.

Alternatively, in embodiments, an acoustic metasurface may be re-configured by being able to physically rearrange the unit cells to create a different acoustic metasurface. For instance, individual unit cells may be configured to be releasably mounted within a support structure defining the acoustic metasurface. Thus, an acoustic metasurface may further comprise a frame or mounting structure defining the acoustic metasurface, wherein the plurality of unit cells may be releasably mounted on or within the frame or mounting structure. In this case the unit cells may have a fixed structure that is pre-configured to encode a certain time (or phase) delay. The pre-configured unit cells may then be inserted into respective positions within a grid structure in order to define the acoustic metasurface. Alternatively the unit cells may be configured for mutual interconnection with each other to define the acoustic metasurface. Particularly, the unit cells may be releasably interconnectable with one another. For instance, the unit cells may be configured such that different unit cells may be clipped together, or otherwise interconnected, in order to define the acoustic metasurface. In this case a separate frame or mounting structure for the unit cells may not be required.

A system according to the present disclosure may comprise any combination of static and reconfigurable acoustic metasurfaces.

The unit cells within an acoustic metasurface may each be configured to encode a specific time delay and/or a specific phase delay. For instance, in embodiments, the unit cells are each designed to encode a specific phase delay at a particular operating frequency (or wavelength) of interest. That is, the structure of the unit cells may be designed to introduce a desired phase delay at a selected frequency (wavelength). Thus, the arrangements of unit cells described herein, or the acoustic metasurfaces, are preferably configured to perform a certain operation at least at a selected frequency (wavelength), or set e.g. range of frequencies (wavelengths). An acoustic metasurface may thus have one or more (selected) operating frequency/frequencies (wavelength(s)). In embodiments, an acoustic metasurface may thus be designed for operating at a single selected frequency (wavelength) (with an associated operating bandwidth). However, as will be explained further below, in some preferred embodiments, the arrangement of unit cells and/or acoustic metasurfaces may be configured to allow for operation at multiple (more) frequencies (wavelengths).

For the selected operating frequency (wavelength), a typical set of unit cells may be designed that are arranged to span the phase delay range 0 to $2\pi$ in discrete intervals. For instance, the set of unit cells may be configured to span the phase delay range 0 to $2\pi$ in uniform intervals of (e.g.) $\pi/8$. Thus, in that case, 16 unique pre-configured unit cells may be available for forming an acoustic metasurface. (It has been found that using 16 unique phase delays allows the reproduction of essentially any desired acoustic wave with a precision of about 0.1 dB.) However, in general, there may be fewer or greater unique types of unit cells, as desired. Further, where a set of unit cells is provided, these not be spaced uniformly in phase delay space. In general the unit cells described herein may be designed to introduce essentially arbitrary phase delays, e.g. depending on the precision of the manufacture process.

In embodiments, an acoustic metasurface may be substantially optimised or configured for operation at a certain operating wavelength, $\lambda_0$ (i.e. or frequency, $f_0$). For instance, and in general, and as described above, according to any of the aspects described herein, the unit cells within an acoustic metasurface may be configured so as to introduce a desired phase delay (or set of phase delays, e.g. where the unit cells are individually re-configurable) for incident acoustic waves at a certain operating wavelength, $\lambda_0$ (frequency, $f_0$). For example, the dimensions of the unit cells, and the structures thereof, may be designed so as to introduce a desired phase delay at the particular operating wavelength or wavelengths (frequency/frequencies) for which the acoustic metasurface is optimised. Furthermore, the unit cells may be designed to have a relatively high transmission (e.g. substantially 100%) at the operating wavelength, $\lambda_0$. However, the acoustic metasurfaces described herein may generally be operated at a range of different wavelengths (frequencies), as will be explained further below.

For instance, an acoustic metasurface may in embodiments operate over a frequency range $f_0 \pm \Delta f$, centered on the design frequency, $f_0$ ($=c/\lambda_0$, where c is the speed of sound through the unit cell) and characterised by a bandwidth, $2\Delta f$. The bandwidth, $2\Delta f$, may for instance be defined in terms of the acoustic transmission through the acoustic metasurface (e.g. a range of frequencies where the transmission changes by no more than 10%) and/or the function of the acoustic metasurface (e.g. in the case of an acoustic metasurface lens a range of frequencies where the focal length changes by no much than 10%).

Of course, even when a unit cell (or device) has been designed for operating at a particular wavelength (frequency), the unit cell (device) may still be used at wavelengths (frequencies) other than the intended design wavelength (frequency). However, in that case the phase delays introduced by the unit cell(s) will generally be different. For example, a unit cell that is configured to introduce a first phase delay at a first operating frequency may introduce a different phase delay at a second operating frequency. However, there may be another unit cell that introduces the same (or substantially the same) first phase delay at the second operating frequency.

For instance, for a given unit cell design (having a particular effective length), the phase delay is typically linear with the operating frequency. The relationship between phase delay and frequency will depend on the effective length and on how close the frequency is to a resonant frequency of the unit cell. In general, for a unit cell having a certain dimension, it is possible to design this for use at a desired frequency, e.g. by adjusting the internal structure of the unit cell until a desired transmission and phase delay is achieved. However, it is also possible to select an internal structure that is resilient to changes in the operating frequency to provide a multi-frequency response (i.e. so that the unit cell provides substantially the same desired phase delay—with limited variation—for a range of frequencies).

Based on knowledge of the operating wavelength (frequency), it may therefore be possible to select the appropriate unit cells for use at that wavelength (frequency), even where that wavelength (frequency) is not the wavelength (frequency) for which the unit cells were originally configured. For instance, a suitable lookup table may be constructed and used to associate the unit cells with the appropriate phase delays at the selected wavelength (frequency) or wavelengths (frequencies).

Alternatively, the unit cells may be configured to introduce a fixed time delay that is substantially independent of wavelength (frequency). A desired phase delay can then be achieved by using the appropriate time delay for the selected wavelength (frequency) or wavelengths (frequencies).

In some embodiments, an acoustic metasurface may be designed or configured for operation in the ultrasonic range. For instance, the acoustic metasurface may be substantially optimised or configured for operation at an operating wavelength, $\lambda_0$ (or frequency, $f_0$), within the ultrasonic range. For example, the acoustic metasurface may be optimised or configured for operation at a frequency of about 40 kHz. However, it will be appreciated that an acoustic metasurface may suitably be designed or configured for operation in any frequency range and the operating frequency or frequencies may e.g. be in the audible frequency range (for instance, to manipulate a loudspeaker output) or in the MHz range (for instance, where the system is intended to be used in a liquid medium).

In some embodiments, the unit cells may be configured to transmit acoustic waves substantially only at the operating wavelength, $\lambda_0$, for which the acoustic metasurface has been designed to operate at. That is, the transmission of the incident acoustic wave may be substantially zero at wavelengths other than the operating wavelength, e.g. as in a bandpass filter.

Preferably, however, the acoustic metasurface may be configured to also operate at wavelengths (frequencies) other than the designated operating wavelength, $\lambda_0$ (frequency, $f_0$). Thus, it is contemplated that although the acoustic metasurface and/or unit cells may be optimised or configured for operation at a particular operating wavelength, $\lambda_0$ (or frequency, $f_0$), by appropriate design of the unit cells, the unit cells may also be configured to transmit and/or manipulate acoustic waves at wavelengths other than the designated operating wavelength, $\lambda_0$ (or frequency, $f_0$).

That is, although the (or at least some of the) unit cells within an acoustic metasurface may be designed for operation at one or more particular operating wavelength(s) (or frequency/frequencies)), this does not mean that the acoustic metasurface cannot be used at other wavelengths (frequencies).

In particular, where a unit cell is optimised or configured for operating at an operating frequency, $f_0$ ($=c/\lambda_0$), the unit cell may suitably be designed to also transmit acoustic waves at all frequencies, $f_j$, satisfying the relationship: $f_j=f_0-jC_0/L_{eff}$, wherein j is an integer, $c_0$ is the speed of sound through the unit cell and $L_{eff}$ is the effective path length through the unit cell that determines the phase delay introduced by the unit cell ($\varphi=e^{ikLeff}$ for an incident acoustic wave of wavenumber k). In this way, a multi-frequency response may be provided.

Furthermore, it has been found that the operating frequency and bandwidth of a unit cell may generally be related to the transmission of acoustic waves through the unit cell (essentially because the unit cells may act as resonant structures). That is, the transmission (or reflection) efficiency of each of the unit cells may provide a further parameter for controlling or adjusting the output of an acoustic metasurface, particularly to provide a different frequency response. Thus, in embodiments, instead of configuring a unit cell with a relatively high (e.g. substantially 100%, e.g., greater than about 95%) efficiency at the operating frequency, the transmission or reflection efficiency of the unit cell(s) may be selected or adjusted in order to control (e.g. vary) the operation performed by the acoustic metasurface. For instance, each of the unit cells may have an associated amplitude (e.g. or intensity) value representing the relative amplitude (e.g. intensity), or change in amplitude (e.g. intensity), introduced by that unit cell to an incident acoustic wave of a particular frequency (e.g. at the operating frequency of the device) passing through the unit cell. Thus, by appropriately selecting or configuring the amplitude (e.g. intensity) values for a unit cell it is possible to change the acoustic manipulation provided by that unit cell. For example, the amplitude (e.g. intensity) value for a unit cell may be selected or configured e.g. to increase or optimise the operating bandwidth for that unit cell.

Accordingly, each of the unit cells may have an associated amplitude (e.g. or intensity) value representing the relative amplitude (e.g. intensity), or change in amplitude (e.g. intensity), introduced by that unit cell to an incident acoustic wave, with the arrangement of unit cells thus defining an amplitude (e.g. intensity) distribution for manipulating incident acoustic waves. That is, amplitude modulation may be performed across the acoustic metasurface.

Alternatively, or additionally, a multi-frequency response may be provided by incorporating different types of unit cell that are configured for operating at different wavelengths into an acoustic metasurface. For instance, unit cells designed to operate at different frequencies may be arranged together in a "block" (of multiple unit cells) which will work over the range of frequencies defined by the individual unit cells within the block. Other arrangements would of course be possible. Thus, the acoustic metasurface may in embodiments be configured to operate at a plurality or a range of operating wavelengths.

An acoustic metasurface according to the present disclosure may thus be used to manipulate incident acoustic waves at the operating wavelength, $\lambda_0$, for which the, or at least some of the, unit cells have been optimised or configured. However, in embodiments, the acoustic metasurface may also or alternatively be used to manipulate incident acoustic waves at other wavelengths. It will be appreciated that at other wavelengths the acoustic metasurface may no longer be optimised for transmission and/or phase delay.

Where an acoustic metasurface is optimised or configured for operation at an operating wavelength, $\lambda_0$, at least some of, or each of, the plurality of unit cells may have a dimension within the acoustic metasurface of half the operating wavelength (i.e. $\lambda_0/2$), or smaller. It has been found that limiting the size of the unit cells within the array to this dimension helps to provide better spatial resolution for generating or recreating desired acoustic waves. Where the dimension of the unit cells is half the operating wavelength (i.e. $\lambda_0/2$) or smaller, the acoustic metasurface may also suitably be used for wavelengths less than the operating wavelength at which the unit cells were optimised or configured for operating at. On the other hand, operating the acoustic metasurface at wavelengths higher than the operating wavelength (i.e. greater than $\lambda_0$) may result in the appearance of acoustic field artefacts and a loss of accuracy.

In general, it is contemplated that where the lateral dimension of the unit cells (i.e. the dimension of the unit cells that defines the array of unit cell) is fixed at some value, L, the acoustic metasurface may suitably be used at a or all frequencies below a maximum frequency, $f_{max}=c/2L$.

It is contemplated that an acoustic metasurface may be used in a single or mono frequency operation. However, it is also contemplated that an acoustic metasurface may be used for "broadband" (and/or multi-frequency) operation. For instance, a limited band of frequencies around a central operating frequency may be passed to the acoustic metasurface. By appropriate design of the unit cells, for example such that the effective path length (and hence time delays) does not depend (or has only a small dependence) on frequency, at least in the frequency range of operation, the unit cells may transmit across the range of frequencies. The array of unit cells may be designed so as to effectively average the frequency response of the individual unit cells to allow the acoustic metasurface to work over the frequency range. Alternatively, the different frequency response(s) of the unit cells may be exploited to produce a frequency dependent acoustic output. For example, the acoustic metasurface may be configured to manipulate an incident acoustic wave containing a range of frequencies to generate a first acoustic output associated with a first frequency and a second acoustic output associated with a second frequency and so on. The acoustic metasurface may thus be used to effectively split the different frequency components of the incident acoustic wave.

According to embodiments of the present disclosure a system is provided comprising two or more acoustic metasurfaces. The relative positioning between the acoustic metasurfaces can then be selected or adjusted in order to control the acoustic output of the system. In general, selecting the relative positioning of the acoustic metasurfaces may comprise selecting the relative positioning of any two acoustic metasurfaces of the system. Thus, where the system comprises more than two acoustic metasurfaces, the relative positioning of each of these acoustic metasurfaces may be selected (or adjusted) to control the acoustic output of the system. Alternatively, the relative positioning of some of the acoustic metasurfaces may be fixed, with only the relative positioning of one or more of the other acoustic metasurface(s) being selected (or adjusted) to control the acoustic output of the system.

In particular, in embodiments, the mutual distance between two or more of the plurality of acoustic metasurfaces is selected or adjusted in order to control the acoustic output. That is, the system may comprise a plurality of spaced-apart acoustic metasurfaces with the spacing between the acoustic metasurfaces being selected or adjusted to control the acoustic output.

In such cases, the mutual distance between the acoustic metasurfaces (measured as the closest distance between the two acoustic metasurfaces) may typically be larger than the (intended) operating wavelength(s) for the acoustic metasurfaces (i.e. larger than the maximum operating wavelength for the system). That is, in embodiments of the present disclosure the acoustic metasurfaces may be spaced apart at distances greater than one times the operating wavelength(s) for which the acoustic metasurfaces are designed for operating at (or alternatively, greater than the wavelength(s) of the incident acoustic waves that are to be manipulated). In embodiments, the mutual distance may be greater than about 1.5 or 2 times the operating wavelength(s). For instance, and depending on the operating wavelength(s) and the desired acoustic output (e.g. to provide a desired magnification and/or focal length for a system comprising an acoustic metasurface lens), the mutual distance between the acoustic metasurfaces may be greater than 5 cm, or even greater than 10 cm. For example, for operating at 300 Hz (the lowest frequency for human speech), the mutual distance may be up to about 100 cm.

This allows, for example, the acoustic wave to be focused or otherwise manipulated between the acoustic metasurfaces (whilst preferably keeping the acoustic waves substantially within the device i.e. reducing side diffraction and avoiding too much loss of acoustic energy between the acoustic metasurfaces). The second acoustic metasurface thus acts on the manipulated acoustic wave output from the first acoustic metasurface. In effect, each position (i.e. unit cell) in the first acoustic metasurface acts as an acoustic source that provides an acoustic input (wave) to the second acoustic metasurface. Each unit cell of the second acoustic metasurface thus receives contributions coming from multiple (i.e. each) of the unit cells of the first acoustic metasurface, which are then manipulated accordingly to generate the output at that position in the second acoustic metasurface (and so on, for the third and further acoustic metasurfaces, where provided). The outputs from each position in the second (or final) acoustic metasurface together define the acoustic output for the system. The overall acoustic output is thus determined by some non-linear combination (e.g. convolution) of the operations performed by the first and second acoustic metasurfaces.

It will be appreciated that the mutual distances between the acoustic metasurfaces according to embodiments of the present disclosure may thus be (and preferably are) larger than the typical spacing between layers of unit cells when being stacked according to the techniques described in International (PCT) Patent Publication number WO 2018/146489 (where the layers will typically be stacked as closely as possible, if not in direct contact, such that an acoustic wave will pass in line between corresponding unit cells in each layer such that the acoustic wave encounters a phase delay that is simply the phase delays for each of the unit cells added together).

Thus, in embodiments, selecting the relative positioning of the acoustic metasurfaces comprises selecting or adjusting the mutual distance between the acoustic metasurfaces to control the acoustic output of the system.

The mutual distance(s) (and more generally the relative positioning) between the acoustic metasurfaces once selected may then be fixed. For example, the system may further comprise a support (or frame) that acts to hold the acoustic metasurfaces in their respective fixed positions. The support (frame) may thus include, or act as, a spacer for holding the acoustic metasurfaces at the selected mutual distance. In that case, the acoustic system may comprise a passive device providing a fixed acoustic output (at least at the operating wavelength(s) (frequency/frequencies) i.e. if the acoustic metasurfaces within the system are each designed to perform a single fixed operation. Alternatively, the relative positioning of the acoustic metasurfaces may be fixed but the acoustic metasurfaces themselves may be re-configurable to adjust the acoustic output.

However, it is also contemplated that the relative positioning (e.g. mutual distance) between two or more acoustic metasurfaces may be adjusted (adjustable) in use in order to vary the acoustic output. Thus, in embodiments, the acoustic output can be adjusted through the relative positioning of the acoustic metasurfaces (which acoustic metasurfaces may in some embodiments be fixed, such that acoustic output is adjusted only through the relative positioning, or which acoustic metasurfaces may also be re-configurable).

In such cases, the support (frame) for holding the acoustic metasurfaces may comprise one or more moveable elements and/or a drive member for moving one or more of the acoustic metasurfaces to adjust the mutual distance (or generally the relative positioning) between the acoustic metasurfaces. For instance, at least one of the acoustic metasurfaces may be slidably mounted such that it can be moved towards/away from another of the acoustic metasurface. For example, at least one of the acoustic metasurfaces may be arranged to move (slide) along one or more guide rails. In that case, a fixing mechanism may be provided for temporarily locking the acoustic metasurface in the selected position (although this would not be necessary). As other examples, two acoustic metasurfaces may be telescopically connected, or connected via a screw mechanism to allow the mutual distance to be adjusted. However, it will be appreciated that any suitable mechanism (or means) for adjusting the mutual distance (or generally the relative positioning) between the acoustic metasurfaces may be used, and various possibilities are contemplated in this respect.

Alternatively, or additionally, the acoustic metasurfaces may be slotted, or otherwise temporarily fixed, into place onto a support (frame) structure, with the acoustic metasurfaces then being able to be physically removed and reordered relative to one another. For example, a support (frame) may be provided having a plurality of discrete slots into which acoustic metasurfaces can be mounted, e.g. to form an axial arrangement (or stack) of acoustic metasurfaces. The mutual distance between the acoustic metasurfaces is thus determined by the relative position(s) of the acoustic metasurfaces in the arrangement (stack). The mutual distance between the acoustic metasurfaces can then be adjusted by physically moving the acoustic metasurfaces into different slots. In this case the mutual distance may be adjusted between a number of discrete values, e.g., based on the positions of the slots.

Various other possibilities for adjusting the relative positioning of the acoustic metasurfaces are contemplated.

In whatever form the means for adjusting the distance (position) between the acoustic metasurfaces is provided, it will be appreciated that the distance (position) may generally be adjusted in any suitable fashion, which may, e.g., be substantially continuously, incrementally, or in a stepped manner, as desired.

In embodiments where the mutual distance between acoustic metasurfaces is selected or adjusted to control the acoustic output, the acoustic metasurfaces may be arranged parallel to each other. However, this need not be case.

Furthermore, it is contemplated that the relative orientation and/or alignment between the acoustic metasurfaces may be selected to control the acoustic output. Thus, in embodiments, additionally/alternatively to selecting or adjusting the mutual distance, the relative orientation and/or alignment between the acoustic metasurfaces may be used to control the acoustic output. For instance, by introducing a tilt between two acoustic metasurfaces (e.g. to make them non-parallel) it may be possible to redirect acoustic waves, or otherwise modify (control) the acoustic output. That is, a tilt may be used for performing additional steering operations. In other embodiments, substantially parallel (or parallel) acoustic metasurfaces may be rotated or otherwise moved relative to one another in order to adjust the acoustic output. Various other arrangements would of course be possible. Again, the relative orientation and/or alignment once selected may then be fixed, or may be adjustable (adjusted) in use to vary the acoustic output.

Thus, rather than simply stacking layers (closely) together such that acoustic waves incident at a particular position in a first acoustic metasurface pass directly to the same position in a second acoustic metasurface, and so on, such that the phase delays at each position are effectively added together in a linear fashion, the present disclosure recognises that the relative positioning between two or more acoustic metasurfaces may provide further possibilities for controlling the acoustic output. That is, it has been recognised that the relative positioning between the acoustic metasurfaces provides a relatively straightforward way to (further) control or adjust the acoustic output of such systems.

The system according to embodiments of the present disclosure may comprise any number of acoustic metasurfaces. For instance, in embodiments, there are two (and only two) acoustic metasurfaces. However, in general it is contemplated that there may be three, four, or more acoustic metasurfaces, with the relative position between any two or more of the acoustic metasurfaces being selected to control the acoustic output.

Each of the acoustic metasurfaces are generally arranged to manipulate an incident acoustic wave. Generally, this is a spatial manipulation of the incident acoustic wave, i.e. the device acts to spatially modulate, shape, or otherwise control the incident acoustic wave. However, an acoustic metasurface may also manipulate the intensity of the incident acoustic wave. The acoustic metasurfaces may generally be configured to perform any desired operation, e.g. depending on the application. For instance, it will be appreciated that by suitably varying the spatial delay distribution of the acoustic metasurface, it is possible to realise a great number of different manipulations, so as to be able to generate or reproduce essentially arbitrarily complex acoustic outputs.

In general, the acoustic metasurfaces described herein may be configured to operate either in transmission or reflection. That is, an acoustic metasurface may be configured so that when an incident acoustic wave is provided on a first side of the acoustic metasurface, acoustic waves travel through and out of the acoustic metasurface to provide an acoustic output on the opposite side of the acoustic metasurface (i.e. in transmission).

However, the acoustic metasurface may alternatively be configured so that the acoustic output is provided on the same side of the acoustic metasurface onto the incident acoustic wave is provided (i.e. reflection). For instance, when the unit cells comprise a central channel, the channel may be open, and extend between opposite sides of the unit cell so that acoustic waves are transmitted from one side of the device to the other. Alternatively, the channel may be closed at one end to cause acoustic waves to be reflected. Or, the system may be mounted at a certain distance from a flat reflecting surface, such as a wall, that causes acoustic waves to pass back through at least some of the unit cells.

It is also contemplated that in some examples the system may be used to transfer (incident) evanescent waves into a surface. That is, one of the acoustic metasurfaces may be provided directly adjacent to a surface to allow for the transfer of evanescent waves into, or through, that surface.

Various techniques for designing an acoustic metasurface, and in particular determining the required arrangement unit cells for reproducing a desired acoustic field are described in International (PCT) Patent Publication number WO 2018/146489, and reference is made to that reference in this respect.

Where the system comprises two or more acoustic metasurfaces, each metasurface may have a different spatial delay distribution and/or a different spatial configuration of unit cells. However, it is also contemplated that multiple of (or each of) the metasurfaces within a system may have the same, or a substantially similar, spatial delay distribution.

For example, in some preferred embodiments, the spatial delay distribution of at least some of the acoustic metasurfaces forming part of the system may be configured so as to focus an incident acoustic wave. That is, at least some of the acoustic metasurfaces may be configured to act as an acoustic lens having an associated focal length (at least for incident acoustic waves at the designed operating frequency). It will be appreciated that an acoustic lens may, for example, be constructed using a metasurface having the same transmission across its surface but with the unit cells arranged to introduce a local change of phase at their respective positions in the metasurface to define a spatial delay distribution that acts to focus an incident acoustic wave. The acoustic lens may be characterised according to its focal length (F), and its designed frequency range of operation (f±Δf, where Δf may be defined, e.g., as the range of frequencies within which both the transmission and the focal change by no more than 10%). Various other arrangements would of course be possible, some of which will be presented below.

The Applicants have further recognised for the first time that when working with acoustic metasurfaces, it is possible to determine a relationship linking the acoustic output of the system and the mutual distance(s) between the metasurfaces that can then be used when designing such systems comprising multiple acoustic metasurfaces. In particular, for systems comprising acoustic lenses, it has remarkably been found that the acoustic metasurface lens can be modelled using a relationship of the form $1/F=1/p+1/q$, where F is the focal length of the acoustic metasurface lens, p is the distance to the acoustic source and q is the distance at which the acoustic output is formed.

It will be appreciated that this relationship is analogous to the thin lens equation used for modelling certain optical lens systems. That is, the Applicants have recognised that an analogue of the thin lens equation derived for optical lens systems can also be applied to systems formed of acoustic metasurface lenses. However, this previously unrecognized result is not trivial as it would not necessarily be expected that optical equations describing systems of lenses, or holographic systems, should also apply to acoustic systems, as in optical systems the size of the devices are much larger than the operating wavelengths whereas in acoustics this is not the case, as the devices may be comparable or smaller than the operating wavelength.

This is principally a result of working in the acoustic metasurface regime particularly when using the metamaterial unit cell-based approaches described herein. For instance, for the acoustic metasurfaces of the present disclosure, the Applicants have realised that each unit cell in a given acoustic metasurface can be considered to act as an acoustic source for the next acoustic metasurface in the system, and so on, with contributions from each unit cell in the previous layer then being combined at each of the positions of the unit cells in the next layer. An acoustic wave incident on the system will thus be manipulated by each of the acoustic metasurfaces in a manner that will also depend on the relative positioning between the acoustic metasurfaces. This behaviour can then be modelled in order to design or construct a system having a desired acoustic output extending beyond that which might be obtainable from a mere close stacking of the acoustic metasurfaces.

That is, the Applicants have discovered how to model the behaviour of systems of acoustic metasurface lenses in order to realise new functionalities/acoustic devices such as acoustic telescopes, microscopes, objective (zoom) lenses, and so on. The principles above are however not limited to systems of acoustic metasurface lenses. For instance, the Applicants have also extended this analysis to more complex (and/or arbitrary) systems of acoustic metasurfaces including systems having more than two acoustic metasurface lenses and/or including acoustic metasurfaces performing different operations with the acoustic output of the system being a convolution of these operations.

Based on this new understanding, the present disclosure thus opens up the possibility for realising novel acoustic systems of acoustic metasurfaces that can be designed for a wider range of applications.

For example, in embodiments, the system may comprise one or more acoustic lens(es). In that case, the relative positioning between the acoustic lens(es) (and the other acoustic metasurfaces) can be selected, e.g., in order to control an overall focus and/or magnification of the acoustic system.

For example, in embodiments, a system is provided that comprises (at least) two acoustic lenses. In that case, by selecting the mutual distance between the two acoustic metasurface lenses, it is possible to control a focus and/or magnification of the acoustic lens system. For instance, in embodiments, the system may comprise an acoustic 'telescope' or a focused/magnifying microphone (i.e. an acoustic 'microscope').

Furthermore, by adjusting the mutual distance between the two acoustic metasurface lenses it is possible to create an acoustic lens system having a variable focus (i.e. an acoustic varifocal or zoom lens). In this way, it may be possible to create an acoustic lens having variable magnification. This may then be used, e.g. as part of a varifocal acoustic telescope and/or microphone, e.g. for tracking a moving acoustic source when operated in reception (or correspondingly for tracking and delivering an acoustic output to a moving target when operated in transmission rather than reception).

The relative positioning (e.g. mutual distance) between the acoustic metasurfaces may be selected or adjusted manually, or in response to a user action. For instance, a user may manually select the relative positioning (e.g. mutual distance) between the acoustic metasurfaces either during the manufacture, or in use (where the mutual distance is adjustable in use). Alternatively, a suitable control circuit (control circuitry) may be provided for adjusting the relative positioning (e.g. mutual distance). In that case, a user may input a desired positioning, and the control circuit (circuitry) then adjusts the position of one or more of the acoustic metasurfaces according to the set position. For example, the control circuit may control a motor to cause one or more acoustic metasurface(s) to move to the set position.

However, in some embodiments, the relative positioning (e.g. mutual distance) between the acoustic metasurfaces may be adjusted automatically and without user intervention, e.g. using a feedback circuit (feedback circuitry). In this case a dynamic adjustment may be provided. For instance, the feedback circuit/circuitry may provide feedback from a distance sensor such as a camera having depth determining capability, or a suitable infrared or ultrasonic sensor. In this case, where the system comprises one or more acoustic lens(es), acoustic waves can then be automatically focused onto a fixed or moving object. That is, the system may provide an acoustic auto-zoom lens. For instance, when operated in transmission, the system may be used to direct acoustic waves towards a moving target. Correspondingly, the system may be operated in reception and used to track an acoustic source, e.g. to provide an auto-zooming microphone.

Such acoustic metasurface lenses may also of course be used in combination with other types of acoustic metasurfaces (i.e. that are configured to perform different operations) to create other interesting acoustic systems.

As another example, in embodiments, at least one of the acoustic metasurfaces may be configured as an acoustic lens (or a system of two or more acoustic lenses may be provided), and another acoustic metasurface within the system may be used to encode an acoustic "hologram" (i.e. a three-dimensional highly shaped acoustic field). In that case, by adjusting the mutual distance between the acoustic metasurfaces, the position of the hologram (acoustic field) can be moved. For example, the mutual distance between the two acoustic metasurfaces can be adjusted to change the position (e.g. the distance from the system) at which the hologram is created. This would allow the possibility to design a moveable acoustic hologram, for example, for creating a tactile television. This may also find application, e.g., for haptic interfaces. Thus, in embodiments, the system comprises at least one (e.g. two) acoustic metasurface(s) configured as an acoustic lens and at least one acoustic metasurface that is configured to encode an acoustic hologram. The position at which the acoustic hologram is formed can then be selected using the acoustic lens(es).

The plurality of acoustic metasurfaces within the systems described herein may (each) be configured to operate at the same operating wavelength (or over the same range of frequencies). In that case, the overall system may be arranged for operation at that wavelength (or frequency range). However, it is also contemplated that different acoustic metasurfaces within the system may be arranged for operating at different operating wavelengths.

For example, in embodiments, two or more different acoustic metasurfaces may be provided that are configured to operate at different frequencies. In that case, the mutual distance between the acoustic metasurfaces may be selected or adjusted to create a system having increased bandwidth. For example, in the case of two acoustic lenses, designed to operate respectively at frequencies $f_1$ and $f_2$, the mutual spacing between the lenses may be adjusted in order to allow the second lens (designed for operating at the second frequency, $f_2$) to correct for aberrations due to using the first lens at the second frequency, $f_2$, rather than its intended operating frequency $f_1$. For instance, in this way, an acoustic analogue of an achromatic lens (i.e. an acoustic "achromat") can be realised that is operable to limit the effect of frequency aberrations in the acoustic input. For example, a system of two acoustic lenses may be used to bring acoustic waves of two different wavelengths to focus on the same plane. In embodiments this is achieved by controlling the mutual spacing between two acoustic lenses. Thus, in embodiments, the system comprises at least one acoustic metasurface that is configured as an acoustic lens, and the relative positioning between the acoustic metasurfaces is selected or controlled to focus acoustic waves of two different wavelengths to the same focal plane. This could also be achieved using two differently configured acoustic lenses.

More generally, in embodiments, systems of acoustic metasurfaces are provided that are configured to perform the same operation (i.e. to generate substantially the same acoustic output) over a wider range of frequencies. For instance, in embodiments, a system may comprise two or more (and preferably three or more) acoustic metasurfaces that are each configured for operating at a different operating wavelength (or frequency), each with an associated operating bandwidth, where the respective operating bandwidths for the acoustic metasurfaces at least partially overlap. The relative positioning (e.g. distance(s)) between the acoustic metasurfaces can then be selected appropriately, e.g. so as to maximise in convolution the bandwidth of the system. For instance, for a set of acoustic metasurfaces that are configured to operate at different (fixed) frequencies, the mutual distance(s) between the acoustic metasurfaces can then be adjusted or selected in a quasi-random pattern to provide a structure that performs a desired operation over a wider range of frequencies. Correspondingly, if the mutual distances are fixed, e.g. due to space constraints, the operating frequencies (and/or operating bandwidths) may be adjusted or selected for the same purpose.

In embodiments, at least one of the acoustic metasurfaces may be used to modulate intensity (but not the phase). In that way, the whole system can be used for controlling both phase and intensity. This may help to reduce aberrations in the resulting field (i.e. aberration-corrected system). For instance, at least one of the acoustic metasurfaces may be configured to act as an intensity filter. An intensity filter may be realised as an acoustic metasurface which has the same phase throughout (i.e. there is no variation in the spatial delay distribution), but wherein the unit cells are arranged to introduce different intensities to an incident acoustic wave.

Various other arrangements would of course be possible and the system may generally comprise any suitable combination of acoustic metasurfaces, e.g. depending on the desired application or acoustic output.

In embodiments, the system of acoustic metasurfaces may be used in combination with an acoustic source in order to manipulate the acoustic waves generated by the acoustic source. It will be appreciated that the manipulation performed by the acoustic metasurfaces may be essentially independent of the acoustic source. That is, the manipulation of the incident acoustic wave by the system is generally controlled by the distribution of time delays across the various acoustic metasurfaces forming the system, and not by the form of the incident acoustic wave. Advantageously, this means that the system does not need to draw any power from the acoustic source. This separation of the acoustic source from the manipulation may help to simplify the power requirements for the acoustic source and/or for the system. (By contrast, in conventional phased transducer arrays, because the sound modulation is performed by the transducers themselves, any switching of the transducers to re-configure the acoustic wave results in a loss of acoustic power. For instance, typically around 10-20% of the acoustic power may be lost when re-configuring a phased transducer array. These problems can be avoided using the unit cell metamaterial-based approaches described herein.)

Furthermore, because the manipulation may be essentially independent of the acoustic source, the form of the incident acoustic wave and hence of the acoustic source does not particularly matter and the systems according to the present disclosure may generally be configured to receive and manipulate any incident acoustic wave.

For instance, in embodiments, the systems according to the present disclosure in any of its aspects may be used to manipulate an acoustic wave that is incident normally to a (first) acoustic metasurface of the system and is substantially uniform over the surface. In this way, the power requirements for the acoustic source can be dedicated solely to providing acoustic wave strength, and need not perform any manipulation, which can be achieved solely using a system of acoustic metasurfaces according to the present disclosure. Thus, an assembly may be provided comprising an acoustic source for generating such acoustic waves combined with a system substantially as described herein in relation to the first and second aspects of the present disclosure.

Accordingly, in embodiments, the system may further comprise an acoustic source. It will be appreciated that the relative distance from the acoustic source and the acoustic metasurface(s) may also affect the acoustic output. In embodiments, the distance between the acoustic source and the acoustic metasurface(s) may thus (also) be selected, or adjusted, to control the acoustic output. This may particularly be the case where an acoustic system is provided that also includes an integrated acoustic source (i.e. an in-built acoustic source, e.g., provided within the same housing or support structure as the acoustic metasurfaces).

In this way it is possible to provide various advantages compared to more traditional acoustic sources. For example, by providing a passive (or fixed) acoustic source in combination with a system of acoustic metasurfaces, the entire power supply for the acoustic source can be used for generating intensity, with the modulation being controlled solely by the system of acoustic metasurfaces.

On the other hand, combining one or more acoustic metasurface(s) with a dynamic acoustic source such as a phased transducer array may provide a highly dynamic acoustic source capable of manipulating sound in new and interesting ways. For example, the metasurface may be used to encode a complex but essentially static acoustic field (such as an acoustic hologram), while the phased transducer array adds dynamic and real-time control over the acoustic output (e.g. by moving the acoustic field). That is, a system of one or more acoustic metasurface(s) may be used in combination with a dynamic acoustic source such as a phased transducer array to provide a hybrid sound modulator combining the benefits of both acoustic metamaterials and phased transducer arrays.

Thus, according to a further aspect, a system for generating an acoustic output is provided that comprises: an acoustic source; and one or more acoustic metasurface(s), wherein an acoustic metasurface comprises an arrangement of unit cells, with at least some of the unit cells being configured to introduce time delays to an incident acoustic wave at the respective positions of the unit cells within the acoustic metasurface, such that the unit cells define an arrangement of time delays to thereby define a spatial delay distribution for manipulating an incident acoustic wave, and such that each acoustic metasurface performs a respective operation on an incident acoustic wave based on its spatial delay distribution.

The acoustic metasurface(s) in this case may comprise the same type(s) of acoustic metasurface described above in relation to the first and second aspects in any of their embodiments. For example, the acoustic metasurface(s) in this aspect preferably comprise an arrangement of unit cells of the type described in International (PCT) Patent Publication number WO 2018/146489, as set out above. Particularly, the acoustic metasurface preferably comprises an arrangement of unit cells of the type generally described above comprising a central channel extending from one side of the unit cell to the other that is structured to increase the effective path length for the acoustic waves travelling through the unit cell, and thereby introduce a time delay.

The acoustic metasurface(s) (and unit cells) according to this further aspect may thus have or comprise any of the features described above in relation to the first and second aspects, at least to the extent these features are not mutually exclusive.

According to this further aspect the acoustic source may be a dynamic i.e. reconfigurable source (such as a phased transducer array). In that case the acoustic metasurface(s) may be static or passive devices, with the dynamic control of the output being delegated to the acoustic source. However, this need not be the case. Further, in other embodiments the acoustic source may be a static source that generates a fixed acoustic output that is then modified by the acoustic metasurface(s).

The acoustic source and the acoustic metasurface(s) may be arranged within a common housing or structure such that acoustic waves generated from the acoustic source are provided to and operated on by the acoustic metasurface(s) to generate an acoustic output.

Thus, the acoustic metasurface(s) may be positioned adjacent to, e.g. in front of, the acoustic source, e.g. as a baffle, in order to control the acoustic output. In this case the mutual distance between the acoustic metasurface(s) and the acoustic source may be adjusted, e.g. in a similar manner as described above, in order to provide further control of the acoustic output.

Alternatively, or additionally, the acoustic source itself may incorporate one or more acoustic metasurface(s). For example, a surface of the acoustic source, or one or elements thereof, may be patterned with an arrangement of unit cells, e.g. to thereby define an acoustic metasurface.

That is, in embodiments, an existing structure of the acoustic source and/or housing may be modified to incorporate a metamaterial design. For example, a surface of the acoustic source and/or housing may be patterned with an arrangement of unit cells. An example of this would be a speaker wherein the diaphragm (or cone) of the speaker is provided with an arrangement of unit cells, e.g. by corrugating the curved surface of the speaker diaphragm (cone) with an arrangement of unit cells, such that the speaker diaphragm (cone) thereby defines an acoustic metasurface. That is, an arrangement of unit cells may be incorporated into a surface of the acoustic source in order to control the acoustic output. This may be used to design a parametric (directional) speaker, for example. Such acoustic source can thus be provided relatively cheaply, e.g. compared to existing parametric speakers, as the speaker itself may otherwise be a conventional (non-directional) speaker design but with the acoustic metasurface then shaping the output as desired.

Thus, in embodiments, there is provided a loudspeaker having a diaphragm that is moved (e.g. by a magnet) in use in order to generate an acoustic output, wherein the diaphragm is patterned with an arrangement of unit cells, with at least some of the unit cells being configured to introduce time delays to an incident acoustic wave at the respective positions of the unit cells on the diaphragm, such that the unit cells define an arrangement of time delays to thereby define a spatial delay distribution for controlling the acoustic output. However, various other arrangements would of course be possible.

The present disclosure also provides a method of using such a system for generating an acoustic output. The method may generally comprise generating acoustic waves using the acoustic source, with the acoustic waves then interacting with the acoustic metasurface(s) to generate a desired acoustic output.

However, in other embodiments, a system of acoustic metasurfaces according to the first and second aspects may be used with arbitrary or pre-existing acoustic sources. For instance, the system may be a stand-alone device that can be retro-fitted or added to an existing acoustic source in order to provide a desired manipulation for acoustic waves coming from the acoustic source.

In other embodiments, rather than using the system to shape the output of an acoustic source, the systems of the present disclosure may be used in reception, e.g. in combination with a suitable sensor or detector as part of an imaging or sensing assembly. For instance, the system may be used to receive or sense an incident acoustic wave, and to direct the acoustic output onto or towards the sensor or detector for recording and/or analysis. In this case, the arrangement of time delays of the unit cells within the acoustic metasurfaces may be appropriately selected depending on the desired application in a similar manner to that described above. For instance, an acoustic metasurface may be configured to focus the incident acoustic wave onto a sensor or detector element.

For example, when used in combination with a suitable sensor or detector, the relative positioning between two or more acoustic metasurfaces may be adjusted in order to provide a varifocal microphone that is able to track a particular acoustic source (i.e. speaker). Other arrangements would of course be possible.

It also contemplated that the acoustic metasurface(s) when used in reception may be configured to perform various other manipulations, depending on the application, in order to help detect a desired property. For instance, one of the acoustic metasurfaces may be configured to sum the contributions of the incident acoustic wave(s) at different spatial positions according to the spatial delay distribution of the device. The system may thus be configured to act as a radar, or a sonar, wherein the system acts to capture acoustic waves from a specific position and/or direction and to transmit the capture acoustic waves onto a (fixed) sensor or detector.

As yet another example of how an acoustic metasurface may be arranged, in embodiments, one or more acoustic metasurface(s) may have a spatial delay distribution that is configured to reduce sound associated with incident acoustic waves (e.g. to reduce the intensity of an acoustic wave incident on the acoustic metasurface by at least 10 dB, or whatever, as desired, at least at the designed operating wavelength(s)). That is, it has been recognised that certain arrangements of unit cells (i.e. arrangements of time delays) may be configured to provide a noise reducing effect, e.g. to reduce noise associated with incident acoustic waves at a certain frequency or within a certain frequency range.

For instance, a noise reducing acoustic metasurface may be designed by providing an alternating, e.g. checkerboard, pattern of unit cells having different phase delays (e.g. of 0 and $\pi$). An incident acoustic wave encountering such pattern of phase delays will thus be caused to destructively interfere with itself to generate an acoustic output of reduced intensity. Thus, in the simplest case, the acoustic metasurface may comprise a checkerboard pattern of open cells (a phase of '0') and structured cells (e.g. introducing a phase of IT at least for a selected frequency/frequencies). However, various other possible arrangements of unit cells may of course be used to perform such noise reduction. For instance, a range of (more than two) phase delays may be arranged in a repeating pattern, e.g., to extend the frequency range. This may, e.g., comprise a checkerboard or otherwise repeating arrangement of 'blocks' of unit cells. Another possibility would be to provide a phase delay gradient across the acoustic metasurface that is configured to perform a noise reducing operation for at least some directions.

It will be appreciated that this type of noise reducing acoustic metasurface, or other such arrangement of unit cells, may be used by itself as a noise reducing structure. For example, such structures may be placed over, or in front of, one or more source(s) of noise in order to at least partially attenuate the noise. In such cases the unit cells may preferably then be designed for reducing noise associated with at least one or more dominant frequency/frequencies associated with the source of noise.

Thus, according to another aspect of the present disclosure, there is provided a noise reducing structure comprising a plurality of unit cells arranged into one or more acoustic metasurface(s), at least some of the unit cells being configured to introduce time delays to an incident acoustic wave at the respective positions of the unit cells, such that the plurality of unit cells define an arrangement of time delays to thereby define a spatial delay distribution that is configured to cause an incident acoustic wave passing into and/or through the structure to at least partially destructively interfere with itself to generate an acoustic output with a reduced intensity.

For instance, preferably, the structure is arranged to reduce the intensity of an incident acoustic wave (at least at a selected operating frequency) by at least 10 dB.

Preferably, the unit cells are arranged into one or more array(s), e.g. in the form of one or more acoustic metasurface(s) of the type described herein. In that case, the arrangement of unit cells i.e. delays in each acoustic metasurface (array) may in embodiments be configured to perform a noise reducing operation wherein at least for one or more selected operating frequency/frequencies there is a reduction (or cancellation) of sound for incident acoustic waves.

For instance, in some preferred embodiments each array of unit cells may define an alternating e.g. checkerboard pattern of two or more discrete time delays that is configured to reduce noise associated with incident acoustic waves passing into and/or through the array. Thus, in embodiments, at least some of the unit cells are arranged into one or more array(s), each array defining an alternating pattern of two or more time delays to thereby define a spatial delay distribution that causes an incident acoustic wave passing into and/or through the structure to at least partially destructively interfere with itself to generate an acoustic output with a reduced intensity. However, other arrangements would of course be possible.

It will be appreciated that the noise reduction will generally be frequency dependent. For example, as explained above, an acoustic metasurface may generally be designed for operating at a selected one or more operating frequency/frequencies (wavelength(s)). Thus, the structure may generally be configured to reduce noise at the selected one or more operating frequency/frequencies (wavelength(s)). For other frequencies (wavelengths), there may be only a partial (or no) attenuation of sound. Of course, the operating range may be extended, e.g. using the techniques presented above.

It is also contemplated that a system may be provided comprising a plurality of acoustic metasurfaces wherein the individual acoustic metasurfaces may not be configured to perform a noise reducing operation by themselves, but a noise reducing effect is nonetheless provided by a combination of two or more acoustic metasurfaces, e.g. by appropriately selecting the relative distance and/or orientation between the two or more acoustic metasurfaces to provide the desired noise reduction for incident acoustic waves at one or more frequency/frequencies.

The unit cells preferably have the same general metamaterial construction described above, in particular of the type having a central channel through which acoustic waves can pass from one side of the unit cell to the other. The central channel may further comprise various sub-wavelength structures or features that act to slow down the acoustic waves and/or increase the effective path length travelled by the acoustic waves through the channel thereby introducing a phase delay.

Thus, an advantage of this structure and the unit cells described herein is that fluid (e.g. air) may still be able to pass into/through the open cells but sound is substantially attenuated. For instance, this type of structure may be used (by itself) to create a noise reducing barrier, or 'window', that still permits air flow through the barrier.

However, this type of noise reducing acoustic metasurface may of course also be used as part of systems of plural acoustic metasurfaces, e.g., of the type described herein, particularly in relation to the first and second aspects described above. For instance, a system may be provided comprising at least one noise reducing acoustic metasurface in combination with one or more other acoustic metasurface(s), of any suitable type, e.g. depending on the desired application. For example, in embodiments, a system may be provided comprising at least one acoustic lens in combination with a noise reducing acoustic metasurface (or set of acoustic metasurfaces that are together configured for performing a noise reducing operation). In that case, the mutual distance between the acoustic lens and the noise reducing acoustic metasurface(s) may be selected or adjusted, e.g. in the manner described in relation to embodiments of the first and second aspects above, e.g. in order to select an acoustic source to attenuate.

It will be appreciated that the attenuation may also be directional. For instance, noise attenuation may be provided in a direction substantially orthogonal to the acoustic metasurface. However, the structures may also be configured to attenuate noise in other (off-axis) directions, e.g. by adding additional acoustic metasurfaces and/or by configuring the unit cells accordingly. For instance, where a gradient of time (phase) delays is provided, this may attenuate noise in a direction that is dependent on the magnitude of the delay gradient.

Various other arrangements for reducing/controlling noise are also contemplated. For instance, in embodiments, systems are provided comprising two noise reducing acoustic metasurfaces. For example, a system may be provided that comprises two noise reducing acoustic metasurfaces, each preferably having a checkerboard arrangement as described above. In that case, the relative positioning (e.g. mutual distance, angle and/or alignment) between the two acoustic metasurfaces can be changed in order to control the acoustic output, and particularly to selectively filter out an acoustic source (in an analogous manner to an optical polariser system, for example).

For example, consider the case of two parallel noise reducing acoustic metasurfaces, each having a similar alternating arrangement of time delays that is configured to define an alternating distribution of 0 and $\pi$ phase delays (at least for a selected operating frequency/frequencies). In that case, by moving (e.g. sliding or rotating) one of the acoustic metasurfaces relative to the other, it is possible to provide a selective noise reduction. In particular, when both acoustic metasurfaces comprise a similar checkerboard pattern, e.g., introducing alternating phase delays of, e.g., 0 and $\pi$, if the patterns are fully aligned, the resulting combined pattern of phase delays (for both acoustic metasurfaces) is then an alternating pattern of 0 and $2\pi$ phase delays, and so noise is not attenuated. However, when the metasurfaces are not fully aligned, there may be at least a partial noise reduction. By selecting the relative positioning (i.e. overlap) of the two patterns appropriately, it is thus possible to selectively filter noise at least in some directions. The noise attenuation may also be frequency selective, e.g. where the noise reducing acoustic metasurfaces are each configured for operating at different, albeit overlapping, frequency ranges (i.e. where they are designed for operating at different frequencies, but wherein the frequency bandwidths overlap).

As another example, the acoustic metasurfaces may each comprise a phase delay gradient so that the arrangement of time delays progressively varies in one or more directions across the surface of the metasurface. In that case, the acoustic metasurface may by itself be configured to attenuate noise at least in some directions. However, by positioning two such acoustic metasurfaces with opposing delay gradients next to each other, the noise reducing effect of the first acoustic metasurface may then be cancelled, with sound thus being transmitted through the pair of acoustic metasurfaces.

However, as mentioned above, various other possible arrangements and combinations of unit cells may of course be used to provide such intensity (noise) reduction. For instance, the individual acoustic metasurfaces need not be noise reducing by themselves, but a combination of acoustic metasurfaces may perform a desired noise reducing operation, at least in certain configurations.

For instance, as another example, the metasurfaces may each comprise an alternating pattern of 0 and $\pi/2$ phase delays. In that case, when the patterns are aligned the combined pattern will be an alternating pattern of 0 and $\pi$ phase delays (since phase delays are generally additive) and so noise will be reduced. However, at other positions there will be only a partial attenuation. Any other suitable alternating arrangement of phase delays may of course be used to similar effect.

Thus, in such embodiments where two acoustic metasurfaces are provided, the system can be changed between noise reducing and noise permitting configurations e.g. by rotating, sliding, or otherwise moving one of the acoustic metasurfaces relative to the other. Similarly, where a system is provided comprising a (first) noise reducing acoustic metasurface, by adding another acoustic (second) noise reducing metasurface, it is then possible to hear the sound that was previously cancelled by the first noise reducing acoustic metasurface. This may be useful, e.g., for inspecting a previously silenced machinery during its operation. For instance, a noise-proof window may be provided whose noise attenuating properties can be selectively stopped to allow sound to pass when desired.

It will be appreciated that in these cases the acoustic metasurfaces should be relatively closely spaced together, and are preferably in direct contact, so that the acoustic waves experience at each position in the structure a phase delay that is a linear combination of the phase delays introduced by each of the acoustic metasurfaces (rather than being a convolution of the overall operations performed by the acoustic metasurfaces as in the first and second aspects of the present disclosure).

However it has been found that it is also possible to achieve similar effects of selectively noise cancellation by controlling the mutual distance between two parallel acoustic metasurfaces. For instance, the mutual distance between two parallel acoustic metasurfaces may be selected (or adjusted) to control the overall acoustic output to provide a noise reduction effect. In this case the acoustic metasurfaces may have various suitable spatial delay distributions (and need not perform a noise reducing operation themselves, although of course they may also do this). That is, in embodiments of the first and second aspect, the mutual distance between two or more acoustic metasurfaces may be selected or adjusted in order to control the sound attenuation for incident acoustic waves.

Thus, the unit cells described herein may be construct an acoustic metasurface that performs a noise reducing operation, that may be used either by itself, or as part of a system of acoustic metasurfaces whose relative positioning can be tailored in order to control an acoustic output.

In fact, the unit cells described herein may advantageously be used for various noise reducing applications, not limited to systems comprising two or more acoustic metasurfaces. For instance, it will be appreciated that the preferred unit cells described herein may advantageously comprise open channels extending through the unit cell thereby allowing fluid to be passed through the unit cells. Such unit cells can thus readily be incorporated into existing structures to manipulate acoustic waves passing through or along a surface of the structure without necessarily impacting the original function of the structure. In particular, in embodiments, the unit cells can be provided within a cavity, such as along an internal surface thereof. The arrangement of unit cells can then be used to provide a noise reducing effect whilst still allowing for the presence of fluid within the cavity.

Thus, from a further aspect, there is provided a noise reducing structure comprising a cavity or passage, wherein a surface of the cavity/passage is provided with a plurality of unit cells, each unit cell with at least some of the unit cells being configured to introduce time delays to an incident acoustic wave at the respective positions of the unit cells on the surface of the cavity/passage, wherein the unit cells are arranged so as to reduce a noise associated with (at least some) acoustic waves passing through the cavity/passage.

In particular, the unit cells may be arranged to cause acoustic waves passing into and/or through the cavity/passage to at least partially destructively interfere with themselves to reduce the acoustic output from the cavity/passage. For instance, as mentioned above, the unit cells may be arranged in a suitable alternating pattern, e.g. to introduce alternating phase delays (e.g. of 0 and $\pi$, at least for one or more selected operating frequency/frequencies for which it is desired to reduce noise). Similarly, a gradient of delays may be provided.

The unit cells that are provided on a surface of the cavity/passage may thus be configured for operating at one or more selected frequency/frequencies. These may be frequencies for which noise is typically generated within the cavity e.g. depending on the nature of the cavity, or the overall structure or device within which the cavity is provided. In some preferred embodiments, a plurality of unit cells are provided that are configured for operating at multiple frequencies in order to attenuate a wider frequency range. Various possibilities for extending the operating range are contemplated, similarly as presented above.

In this case, the unit cells may be of the same general metamaterial construction described above in relation to the first and second aspects of the present invention. Particularly, the unit cells may define a central channel through which acoustic waves pass from one side of the unit cell to the other. The central channel may further comprise various sub-wavelength structures or features that act to slow down the acoustic waves and/or increase the effective path length travelled by the acoustic waves through the channel thereby introducing a phase delay.

However, rather than being arranged as a 'stand-alone' acoustic device (i.e. an acoustic metasurface, as in the first and second aspects described above), the unit cells may now be provided along or as part of the interior surface of a cavity or passage (or 'flow channel'). For instance, the surface may be patterned with an arrangement of unit cells. The arrangement of unit cells may be engraved or embossed onto the surface. Alternatively, the surface may be formed, e.g. by 3D printing, or molding, to include an arrangement of unit cells. Any other suitable manufacturing techniques may of course be used as desired.

For such noise reducing applications, any suitable arrangement of unit cells may be provided. For instance, in embodiments, an arrangement of two or more unit cells may be provided that are arranged to introduce alternating phase delays (e.g. 0 and $\pi$), at least for a designed operating wavelength. However, further unit cells (introducing additional phase delays) may be provided, e.g. to extend the frequency range. Other arrangements would of course be possible.

In some embodiments, the cavity may comprise an open flow channel (passage). For example, the cavity may comprise a substantially cylindrical pipe e.g. having a substantially circular cross section. However, in general, the cavity may comprise any bounded channel (passage) through which fluid (e.g. air) can flow, and may have any suitable cross section. The unit cells can then be provided on the internal surface of the flow channel (passage). This means that fluid (air) can still pass through the cavity, but with noise associated with the cavity being reduced.

This structure may find utility for various applications. For instance, in embodiments, the structure may comprise part of a larger device or appliance. For example, the unit cells may be provided within a vacuum tube of a vacuum cleaner. As another example, the unit cells may be provided within a hollow structure of a fan, or a hair dryer, or other similar appliance. However, various applications in home and personal care appliances are contemplated. Indeed, other applications are envisioned and in general this approach may be used for reducing noise in any suitable flow channels (passages). The unit cells may then be designed to reduce/cancel noise at one or more frequency/frequencies that are associated with the typical operation of the appliance (e.g. vacuum cleaner, fan, etc.) within which the noise reducing structure is incorporated.

In some embodiments, rather than a substantially cylindrical channel (passage), the flow channel (passage) may be formed within a surface of a structure. In that case, the channel (passage) may comprise a surface pattern or ridge, which may e.g. have a substantially U- or V-shaped cross section. However, again, unit cells may suitably be provided along the interior of the channel (passage) in order to reduce noise. An example of this would be a surface channel (passage) formed within a tyre, or an item of clothing. However, various other applications would be possible. Again, the unit cells may be provided in one or more acoustic metasurfaces that extend partially around the surface channel, preferably with multiple such acoustic metasurfaces being provided along the axial length of the channel.

In other embodiments, rather than substantially open flow channels (passages), the cavity may be a closed cavity containing a fluid (but which fluid cannot pass out of the cavity). An example of this would be an anechoic tile for a submarine. However, other applications would of course be possible. In that case, the unit cells may be provided within the closed cavity in order to reduce noise passing through the cavity (from either surface).

In general, the orientation of the unit cells within the arrangement may generally be selected in dependence on the direction in which it is desired to reduce noise. For instance, where the unit cells themselves each comprise a central (structured) channel, e.g. as described above, the central channels of the unit cells may generally be arranged either parallel or orthogonal to the longitudinal axis of the cavity (e.g. flow channel) within which they are disposed. However, any suitable arrangement of unit cells providing a desired noise reduction would of course be possible.

The unit cells may be provided along the cavity in any suitable form. For instance, in some cases a set of unit cells may be provided in an annular, or semi-annular, arrangement extending at least partially around the internal surface of the flow channel (passage). Considered another way, the internal surface of the flow channel (passage) may be patterned or otherwise provided with one or more acoustic metasurfaces that are suitably curved (e.g. in an annular, semi-annular, etc., arrangement) to match the curvature of the internal surface of the flow channel (passage). However, in general, the unit cells may be arranged along the cavity in any desired pattern. For instance, the unit cells may be distributed in a quasi-random arrangement along a surface of the cavity, rather than being in any regular arrangement.

In embodiments, multiple sets of unit cells may be provided along the length of the flow channel (passage). For instance, the unit cells may be arranged into a plurality of sets (e.g. with each set comprising an annular, or semi-annular, arrangement of unit cells) that are spaced axially along the length of the flow channel (passage). In that case, as well as the internal (metamaterial) structures of the unit cells, and the spatial delay distribution provided thereby, the relative spacing and positioning between the different unit cells may also contribute to the noise reducing effect.

For instance, in a similar fashion as described above in relation to the first and second aspects of the present disclosure, the mutual distance (i.e. axial spacing) between the sets of unit cells may then be selected to control how acoustic waves generated in and/or passing through the cavity are manipulated (i.e. the acoustic output). In particular, the axial spacing may be selected to provide a wider frequency response. For example, the different sets of unit cells may be configured for operating at different, but overlapping frequency ranges (i.e. bandwidths). In that case, the axial spacing may be selected to maximise in convolution the frequency bandwidth over which the desired e.g. noise reducing operation is achieved. Other arrangements would of course be possible.

It will be appreciated that an arrangement of unit cells disposed on one or more surface(s) of a cavity need not necessarily (only) be configured to perform a noise reducing operation but may generally be configured to manipulate incident acoustic waves in any suitable and desired fashion, and that any desired operation and/or arrangement of unit cells may be provided.

Thus in general, the unit cells described herein may be used to create as 'stand-alone' acoustic metasurface devices. However, it is also contemplated that the unit cells described herein may be incorporated as part of a larger structure. Accordingly, from another aspect there is provided a structure comprising an arrangement of unit cells (i.e. an acoustic metasurface) substantially as described in relation to any of the aspects or embodiments herein. For example, a device comprising a plurality of unit cells may be provided on a surface of a structure to provide the structure with the ability to spatially modulate acoustic fields. The unit cells may generally be provided either as a metamaterial layer on top of the existing structure or formed integrally with the structure. This may find various applications especially where the structure is a structure formed within a larger device or appliance for which it is desired to reduce associated noise (e.g. fans, hair dryers, tyres, etc., as mentioned above, among other possibilities).

It will be appreciated that the unit cell metamaterial-based approach of the present disclosure, according to the various aspects and embodiments described herein, thus allows for various novel acoustic systems to be realised that are capable of providing a range of different acoustic outputs.

DESCRIPTION OF THE FIGURES

Various embodiments will now be described, by way of example only, and with reference to the accompanying drawings in which.

DETAILED DESCRIPTION

The concepts described herein generally relate to approaches for spatially manipulating sound using acoustic metamaterials. Thus, in embodiments a device for manipulating acoustic waves (hereinafter, a "sound modulation device") may be provided. In particular, a plurality of unit cells each capable of encoding a particular time or phase delay, or plurality of time or phase delays, are arranged together in an array in order to construct an acoustic "metasurface" (or, metamaterial layer). The time delay or phase distribution of the acoustic metasurface may thus be quantised in the spatial domain according to the positions and sizes of the unit cells. The spatial distribution of the time or phase delays across the acoustic metasurface generally determines how an acoustic wave incident on the metasurface will be transformed or manipulated as it passes through and interacts with the unit cells of the metasurface. The arrangement of unit cells within the metasurface may be configured for performing various different acoustic transformations or manipulations. A sound modulation device can then be provided comprising a system of a plurality of such metasurfaces.

Various non-limiting examples and embodiments will now be described to help illustrate these concepts.

Figure 1:
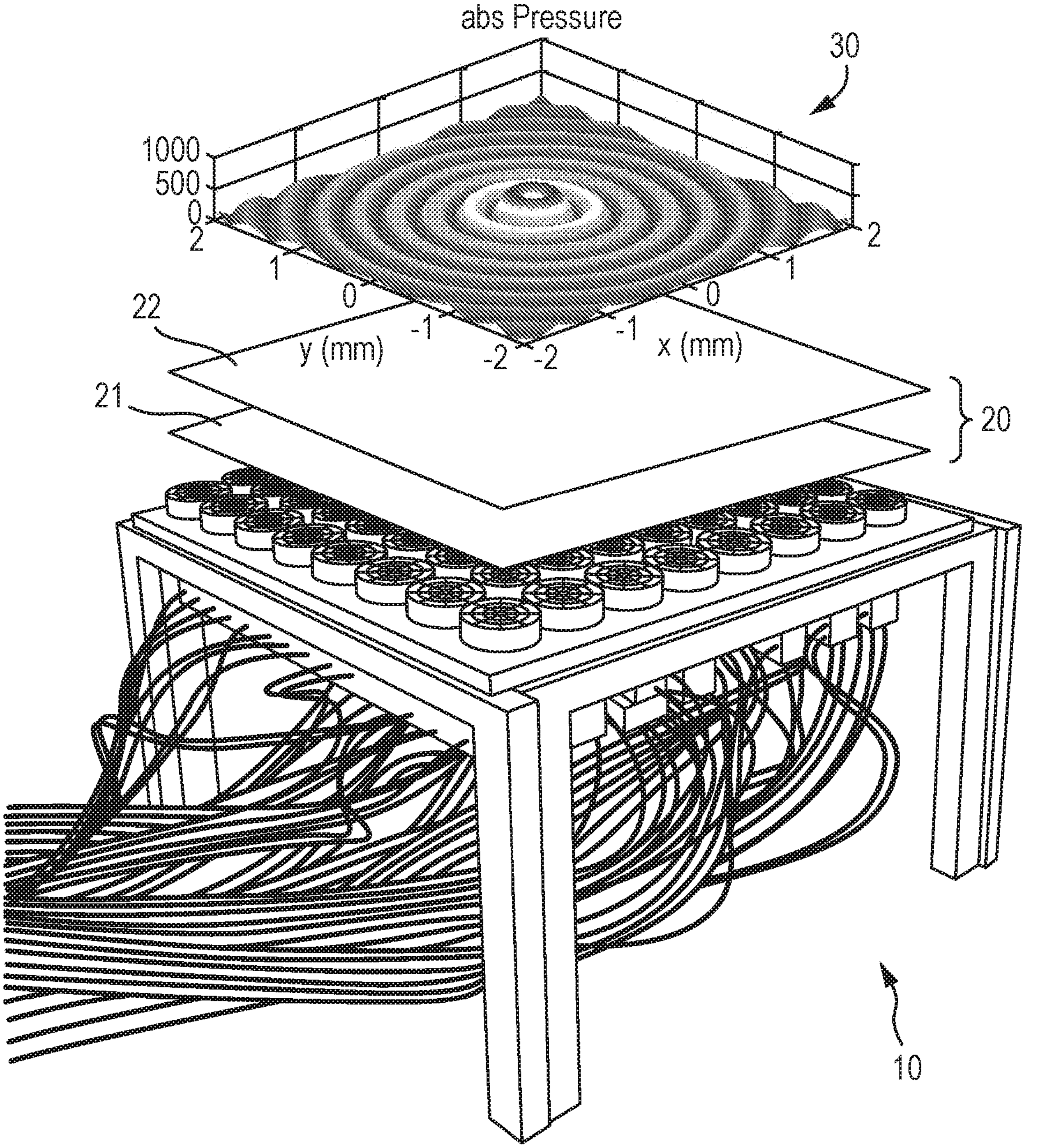
FIG. 1 shows schematically an assembly for modulating sound according to various embodiments of the present disclosure.

FIG. 1 shows schematically an assembly for modulating sound according to various embodiments of the present disclosure. The assembly comprises an acoustic source 10 which as shown in FIG. 1 may generally comprise a transducer or array of transducers driven in phase and a sound modulation device 20 for manipulating the acoustic wave generated by the acoustic source 10. The sound modulation device 20 may be positioned over the acoustic source 10 at a certain fixed distance from the plane of the acoustic source 10 so that the acoustic waves generated by the acoustic source 10 are passed towards and through the sound modulation device 20. However, it will be appreciated that the sound modulation device 20 need not be positioned directly over the acoustic source 10 in the manner shown in FIG. 1, and in embodiments desirably may not be, so long as the acoustic waves generated by the acoustic source 10 are directed towards and through the sound modulation device 20.

It will be appreciated that the acoustic source 10 itself does not itself need to perform any spatial modulation as this functionality may be completely devolved to the separate sound modulation device 20. That is, the spatial sound modulation device 20 can act independently to the acoustic source 10, and can act on the incident acoustic waves in whatever form they are provided. Thus, the acoustic source 10 may typically be arranged to generate substantially uniform acoustic waves normal to the surface of the spatial sound modulation device 20 so that the spatial modulation can be controlled completely by the sound modulation device 20. In other embodiments, the acoustic source may already provide a directional or focused acoustic wave. In this case, the spatial sound modulation device may perform an additional manipulation on the field. In whatever form they are provided, the sound modulation device 20 acts to shape or otherwise spatially transform or manipulate the incident acoustic waves in order to generate a desired acoustic output field 30.

By way of example, FIG. 1 shows the generation of a 'bottle' type acoustic field 30 suitable for acoustic levitation. However, as explained further below, the spatial sound modulation device 20 may be configured to generate different acoustic fields 30 as desired.

The sound modulation device 20 is generally composed of a plurality of acoustic metasurfaces 21, 22 with each acoustic metasurface comprising a substantially flat and two-dimensional arrangement of unit cells each capable of encoding a particular time or phase delay. The positions of the unit cells (and their associated time or phase delays) thus define the spatial delay distribution for each of the acoustic metasurfaces 21,22, which are effectively quantised according to the positions and dimensions of the unit cells. By controlling the positions and/or delays of the unit cells within the acoustic metasurfaces 21,22 of the sound modulation device 20, the sound modulation device 20 may be selectively configured to perform various manipulations or transformations of an incident acoustic wave to generate an acoustic output.

Although the acoustic metasurfaces 21,22 are shown in FIG. 1 as being substantially flat and two-dimensional, it is also contemplated that the sound modulation device 20, or at least an upper or lower surface thereof, may be curved or profiled. For instance, the upper or lower surface of the sound modulation device 20 may be substantially convex or concave. In this way, the shape of the surface may also in part contribute to the transformation applied to the incident acoustic waves.

As discussed above, it will be appreciated that the manipulation of the acoustic wave may advantageously be performed solely by the sound modulation device 20. That is, the spatial manipulation or modulation may be independent of and disconnected from the acoustic source 10. The acoustic source 10 may thus be used solely for generating the incident acoustic waves, and may typically therefore generate a substantially uniform acoustic wave perpendicular to the surface of the sound modulation device 20. This means that the modulation does not need to draw any power from the power supply of the acoustic source 10. In this way the power requirements for the acoustic source and the modulation may be kept relatively simple (or low), e.g. compared to conventional phased transducer array approaches, and independent from each other.

This is in direct contrast to known approaches utilising phased transducer arrays, where the same elements i.e. transducers are used for generating the acoustic wave and for shaping it. These known approaches typically require relatively complex and expensive electronics for re-configuring the acoustic output field. Furthermore, any switching or re-configuring of the phased transducer array results in a loss of power. Since the spatial sound modulation techniques described in the present application allow the sound power to be disconnected from the modulator, the device may have much lower power requirements that conventional phased transducer arrays. By decoupling the manipulation from the acoustic source, the devices according to the present disclosure may also allow for a faster switching or re-configuration than conventional phase transducer arrays.

In embodiments, the unit cells are each pre-configured to encode a particular, fixed time delay. The unit cells effectively therefore become, in isolation, the building blocks of the acoustic metamaterial layers or metasurfaces, whereby the individual unit cells can be assembled on-demand into arrays or layers having a desired delay distribution. For instance, the pre-configured unit cells may be interconnected together, or inserted into a frame, to form a two-dimensional array or metamaterial layer. The unit cells may then be released, or removed from the frame, and then re-configured into a different arrangement to perform a different transformation.

Because each of the unit cells forming the layer or metasurface is pre-configured to encode a single, specific time delay or intensity, the array or layer of unit cells quantised in both the spatial and time delay domains. Various spatial delay distributions suitable for generating a great number of acoustic output fields may be encoded by selecting the appropriate unit cell (i.e. time delay) for each position within the array or layer. The accuracy at which the sound modulation device 20 can generate a desired arbitrarily complex acoustic wave may in general be increased by increasing the number of unit cells within the array and/or decreasing the size of the unit cells within the array (i.e. so that the spatial delay distribution is quantised with a higher resolution), or by increasing the number of different types of unit cells available (i.e. the number of available time delays and hence the resolution of the time delays) so that the time delay at each position may be chosen to better match that for the desired field.

The unit cells may take various suitable forms so long as they act to introduce a well-defined time delay to an incident acoustic wave. Generally, the unit cells may be designed to introduce a local phase shift at least within the range 0 to $2\pi$ for a selected operating frequency. In order to form a desired acoustic wave with the required accuracy, and in order to avoid spatial aliasing effects, the unit cells desirably hold sub-wavelength resolution. The unit cells should also be able to transmit sound effectively with minimal energy losses, particularly where it is desired to stack the unit cells or layers.

For instance, in embodiments, the unit cells may define a central channel through which acoustic waves pass from one side of the unit cell to the other. The central channel may further comprise various sub-wavelength structures or features that act to slow down the acoustic waves and/or increase the effective path length travelled by the acoustic waves through the channel thereby introducing a phase delay. For example, the channels may include a substantially labyrinthine, or meandered, structure, or a multi-slit, coil, helical, or Helmholtz resonator-type structure. One suitable structure is illustrated by way of example in FIG. 2 which shows in cross section an example of a labyrinth structure with meanders defined by four bars extending into an open channel.

The effective path length, $L_{eff}$, for acoustic waves travelling through the unit cell is given by $L_{eff}=h+\Delta L$, where h is the height on the unit cell, and $\Delta L$ is the additional path length introduced by the structure of the unit cell. This additional path length introduces a phase delay $\varphi=e^{ikLeff}$, where k is the wavenumber ($k=2\pi/\lambda$) of the acoustic wave.

The shape and/or dimensions of the unit cells may generally be selected to introduce a desired phase delay for acoustic waves of a particular wavelength. That is, the design of unit cells may be substantially optimised or configured for use with a particular operating wavelength, such that a desired phase delay is provided for incident acoustic waves at the operating wavelength, $\lambda_0$. In embodiments, the device may be designed for use substantially only at a single operating wavelength, such that there is little or no response or transmission at other wavelengths. In other embodiments it is contemplated that the device may be designed for use with a range of wavelengths, such as a range of wavelengths around a central operating wavelength. It is also contemplated that the device may be configured to operate at a number of different operating wavelengths.

Figure 2:
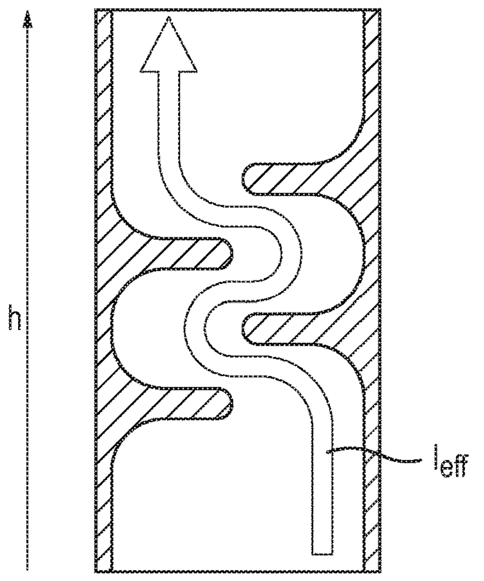
FIG. 2 shows schematically a unit cell construction for introducing a phase delay to an incident acoustic wave.
Figure 3:
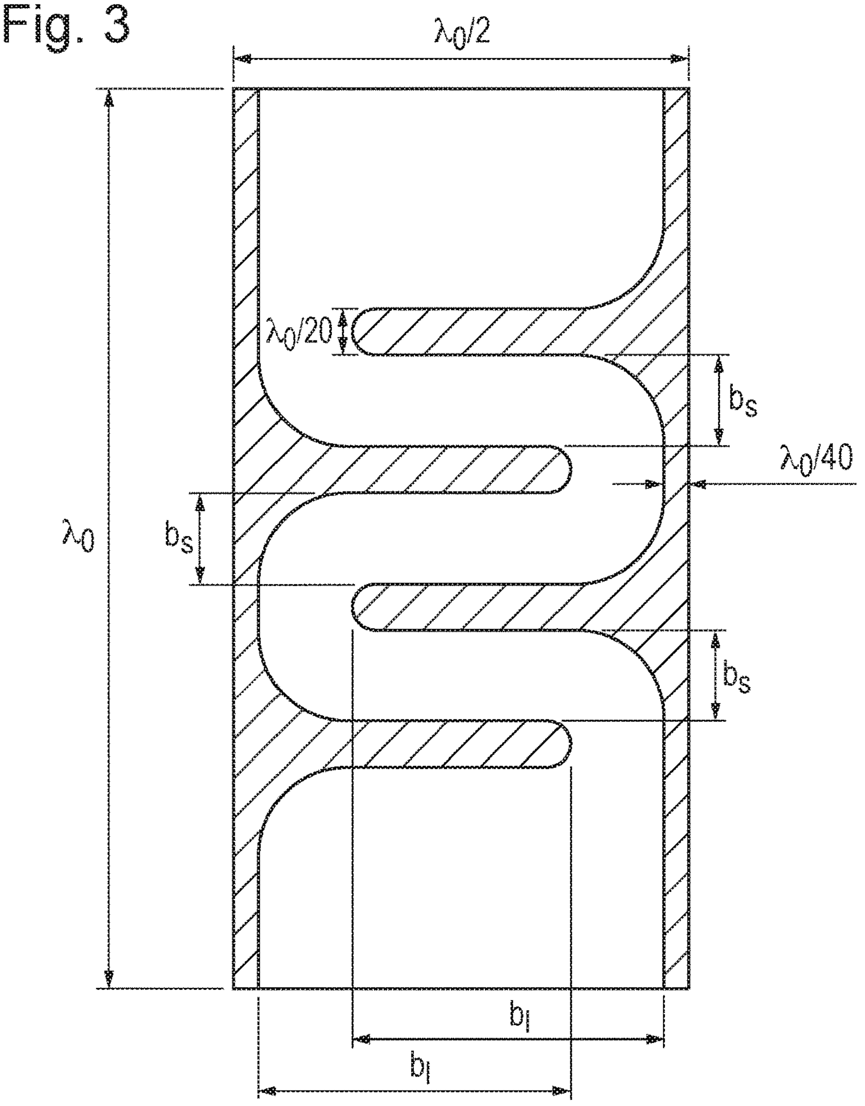
FIG. 3 illustrates how the unit cell construction shown in FIG. 2 may be designed to introduce different phase delays to an incident acoustic wave.

FIG. 3 illustrates how the exemplary unit cell construction shown in FIG. 2 may be designed to encode a range of different phase delays. The unit cells shown in FIG. 3 are generally in the form of a rectangular cuboid with a square base shape of side $\lambda_0/2$ and height of $\lambda_0$. Thus, the unit cells allow the acoustic metamaterial layers to be quantised with a resolution of $\lambda_0/2$. This may be a good compromise between ease-of-manufacture and the need to realise diffraction-limited fields without spatial aliasing. Indeed, it has been found that it may be advantageous to keep the size of the unit cells (in the plane of the metamaterial layers) smaller than the wavelength corresponding to the Nyquist frequency. Thus, when designing a device that is optimised or configured for use at an operating wavelength, $\lambda_0$, the unit cells may suitably have a dimension of $\lambda_0/2$, or smaller.

As shown in FIG. 3, and as mentioned above in relation to FIG. 2, the unit cells each comprise an open central channel having a structure that delays the incident wave, hence shifting the relative phase of the output. In particular, the open central channel is provided with a labyrinthine or meandered structure by a plurality of bars extending into the channel. The length of, $b_l$, and spacing between, $b_s$, the meanders may then be varied in order to provide a range of effective path lengths as shown in FIG. 3. In FIG. 3, the thickness of the walls relative to the configured operating wavelength, $\lambda_0$, is $\lambda_0/40$ and the thickness of the meanders is $\lambda_0/20$. However, these values may be selected as desired e.g. to achieve a desired strength or robustness, or based on manufacturing constraints.

Figure 4:
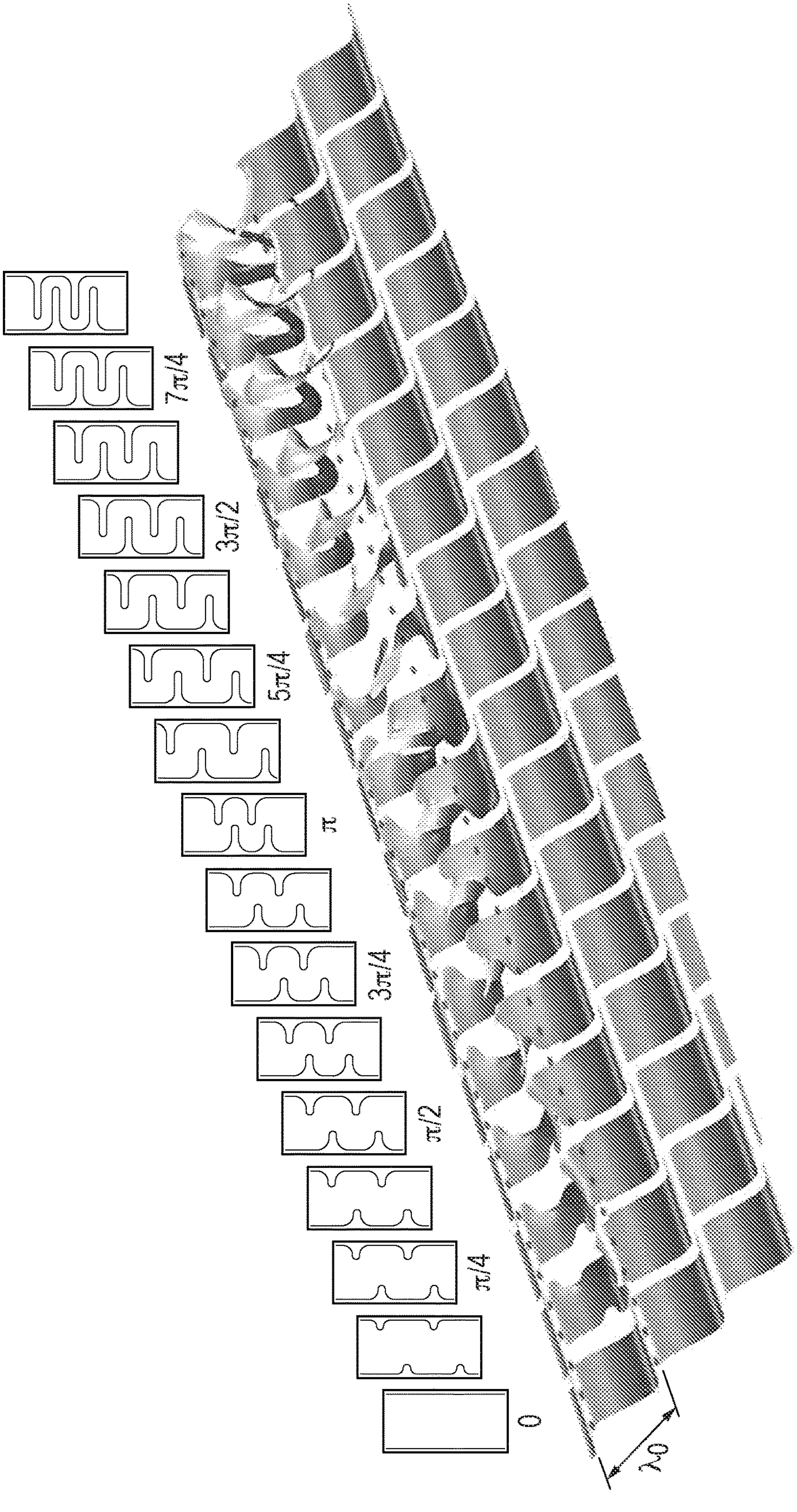
FIG. 4 shows a set of unit cells configured to introduce phase delays spanning the range 0 to $2\pi$ in discrete intervals of $\pi/8$.

FIG. 4 shows in cross-section 16 different unit cells that are pre-configured to introduce phase delays spanning the range 0 to $2\pi$ in discrete steps of $\pi/8$. It can be seen from FIG. 4 how varying the lengths and spacing of the bars allows the phase delay to be adjusted.

The 16 different unit cells shown in FIG. 4 represent a set of 16 unique quanta. The illustrated set of unit cells are uniformly spaced in phase and FIG. 4 thus represents a uniform 4-bit control (i.e. 16=24). It has been found that any focused field can be reproduced with an error of less than 0.1 dB using such uniform 4-bit control. Using fewer quanta, or lower bit control, generally increases the error. For instance, the error may increase to about 1 dB for a uniform 3-bit control (8 quanta), or about 3 dB with uniform 2-bit control (4 quanta). The error may be determined by comparing the analogue field that is desired to be reproduced with the field generated by the spatial sound modulation device.

Although the example set of unit cells shown in FIG. 4 are uniformly spaced in the phase domain (in discrete intervals of $\pi/8$) it will be appreciated that a set of unit cells need not be uniformly spaced, and in embodiments, the set of unit cells may advantageously be non-uniformly spaced in the phase domain. For instance, by selecting an appropriate non-uniform set of quanta (i.e. phase delay values), practically any focused field may be reproduced with similar error to the uniform 4-bit control mentioned above but using fewer quanta. For instance, it has been found that a non-uniform 3-bit control may provide similar results to a uniform 4-bit control.

As best shown in FIG. 3, the base portions of the bars defining the meanders may have ‘shoulders’ such that they gradually taper into the channel to the desired end thickness (e.g. $\lambda_0/20$). These ‘shoulders’ may help to increase robustness and stability during manufacture and/or may help contribute to impedance matching. In particular, the geometry of the unit cells may be selected so that the effective acoustic impedance of each unit cell is matched to that of the ambient medium within which the device is operating (e.g. air or water), thereby increasing the efficiency of transmission (and suppressing reflection).

It is emphasised again that FIGS. 1 to 4 merely illustrate one example of a suitable unit cell for introducing a time delay, and that the unit cells may generally take various forms including, but not limited to, other types of labyrinthine or meandered structures, multi-slit, helical or coiled structures, or Helmholtz resonator-type structures.

Also, whilst FIGS. 1 to 4 illustrate pre-configured unit cells, it is also contemplated that the unit cells themselves are each re-configurable between a plurality of different time delay values. Thus, in embodiments, the unit cells may be fixed in position within the array or layer, but are re-configured in situ to encode a plurality of different phase delays. Naturally, it is also possible that in a given sound modulation device or metamaterial layer some of the unit cells may be both removable and re-configurable, or that some of the unit cells may be fixed in both position and phase. Furthermore, in embodiments, it is contemplated that a single sound modulation device or metamaterial layer may contain a mixture of pre-configured and re-configurable unit cells.

The arrangement of the unit cells within an acoustic metasurface will determine how an acoustic wave incident on, and passing through, the acoustic metasurface will be manipulated. Thus, it is possible to design a vast range of acoustic metasurfaces that are arranged to perform various different acoustic manipulations.

For instance, in basic terms, there are four steps involved in designing an acoustic metasurface according to the present disclosure to perform a certain function: (1) choosing the desired function (i.e. the operation performed by the acoustic metasurface); (2) transforming this information into an analogue phase/intensity distribution on the acoustic metasurface; (3) selecting the unit cells to use to best reproduce the required phase/intensity distribution; and (4) fabricating the acoustic metasurface, taking into account any constraints in terms of its spatial and frequency response. It will be appreciated that this process essentially involves moving from a desired analogue field that is to be reproduced to a discrete spatial delay distribution within the plane of the metasurface, with the delay distribution being quantised according to the positions of the unit cells in the metasurface.

Various techniques for designing and constructing such metasurfaces are described, for example, in International (PCT) Patent Publication number WO 2018/146489. In particular, various approaches are described wherein the required analogue phase/intensity distribution is quantised to match the possible unit cells. The acoustic metasurfaces of the present disclosure can thus be fabricated similarly, although other arrangements may of course be possible.

The operation that is performed by an acoustic metasurface is generally defined in terms of how an acoustic wave is manipulated, both spatially and in terms of its intensity, after it has passed through the acoustic metasurface.

For example, by appropriately arranging the unit cells (time delays) within an acoustic metasurface, the acoustic metasurface may be arranged to perform a focusing transformation, and thus configured as an acoustic "lens". That is, the metasurface may be configured to focus an incident acoustic wave towards a certain focal point (i.e. defined in terms of the focal length of the lens).

A converging lens is generally characterised by two quantities: its focal length and its physical extension (i.e. for an acoustic metasurface, how many unit cells it contains). So, once a desired focal length F has been set along the axis of the acoustic lens, the phase distribution $\varphi(x,y)$ for the metasurface (i.e. in the z=0 plane) can then be obtained, e.g. by imposing that all the contributions from the unit cells arrive in phase at a position (0,0,F). For example, the basic focusing transformation for a converging lens may be described by the analogue phase distribution: $\varphi(x,y)=\phi_0-2\pi/\lambda_0(\sqrt{r^2+F_0^2}-F_0)$, where $r^2=x^2+y^2$, $\phi_0$, is a phase value, $\lambda_0$ is the operating wavelength and $F_0$ is the focal length.

Figure 5A:
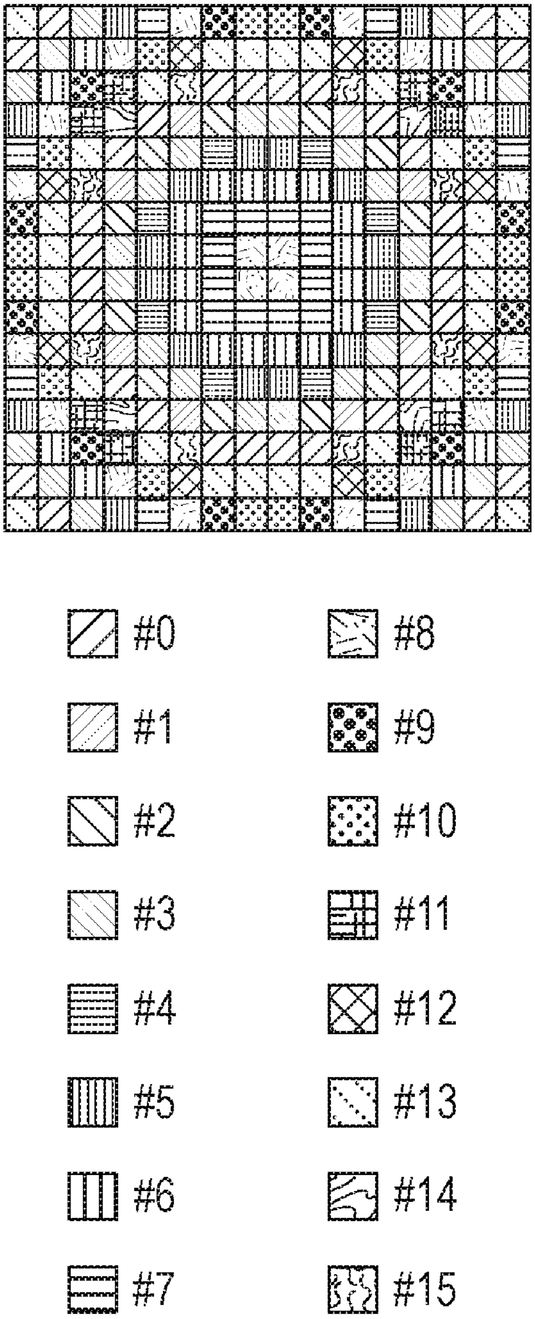
FIG. 5A shows schematically an example of how a set of metamaterial unit cells may be arranged to construct a converging acoustic lens.
Figure 5C:
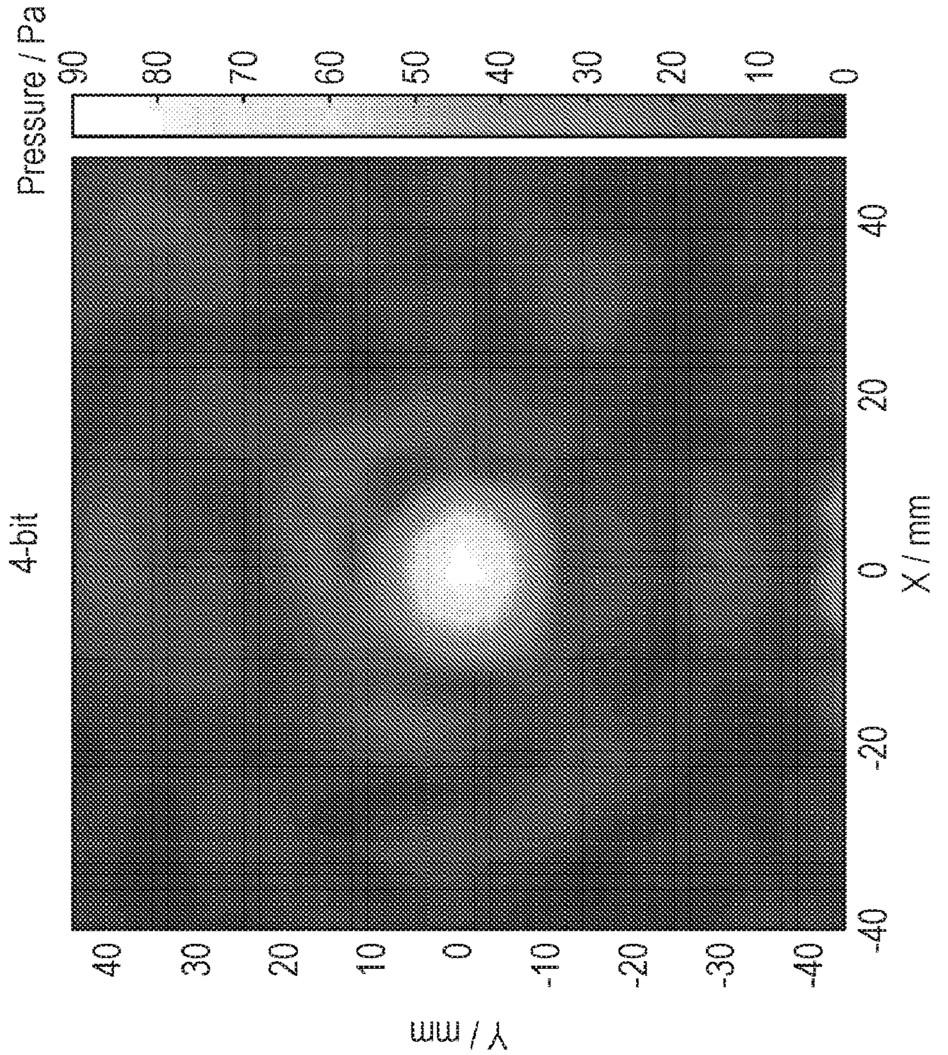
FIGS. 5B and 5C show pressure plots illustrating the acoustic wave in the vertical plane moving away from the surface of the metamaterial layer of FIG. 5A.
Figure 5B:
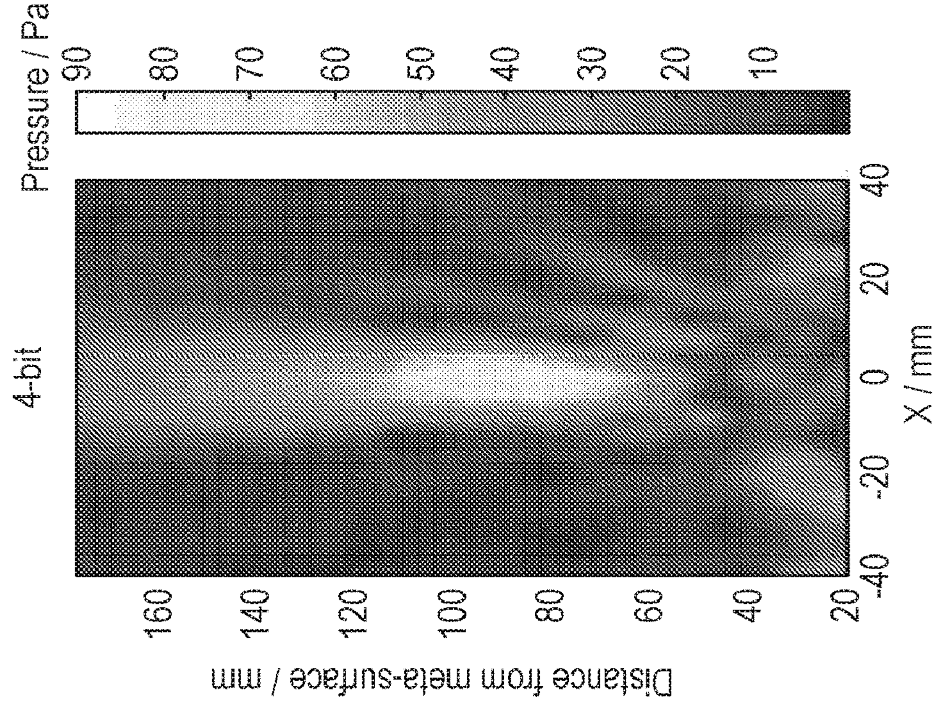

FIGS. 5A to 5C illustrate an example of an acoustic metamaterial layer that is configured to provide a converging focusing transformation at 40 kHz. In particular, the metamaterial layer shown in FIG. 5A is formed of 16 different phase values, e.g. corresponding to the 16 phase values between 0 and $2\pi$ in steps of $\pi/8$ shown in FIG. 4, with the unit cells (or blocks of unit cells) at each discrete position (i,j) within the metamaterial layer being selected or configured to have a phase value that closely matches the desired phase as defined by the analogue phase distribution w (x,y). For the surface shown in FIG. 5A, that means the unit cells at each position are selected to have a phase value selected from the 16 available phase values that most closely matches the desired phase. The acoustic metamaterial layer thus contains a quantised representation, of the analogue phase distribution $\varphi(x,y)$. To account for the presence of the frame, etc. the phases assigned to the unit cells may be taken as the phase according to the analogue phase distribution $\varphi(x,y)$ corresponding to an imaginary point at the centre of each unit cell. However, it will be appreciated that the layer may equally use alternative arrangements of unit cells that may be either pre-configured or re-configurable, and may be either uniformly or non-uniformly spaced in the phase domain.

FIGS. 5B and 5C show pressure plots illustrating the acoustic wave in the vertical plane moving away from the surface of the metamaterial layer and in the horizontal plane at a position 100 mm from the surface. It can be seen that the spatial sound modulation device performs as expected by focusing the acoustic wave.

It has also been found that the size of the focal region perpendicular to the axis depends on the lateral dimensions of the acoustic metamaterial layer. In particular, the larger the lateral dimensions of the acoustic metamaterial layer, the tighter the focus. Again, this is not necessarily expected when working with acoustic waves, but has been found to result from the unit cell metamaterial-based approaches described herein.

Figure 6A:
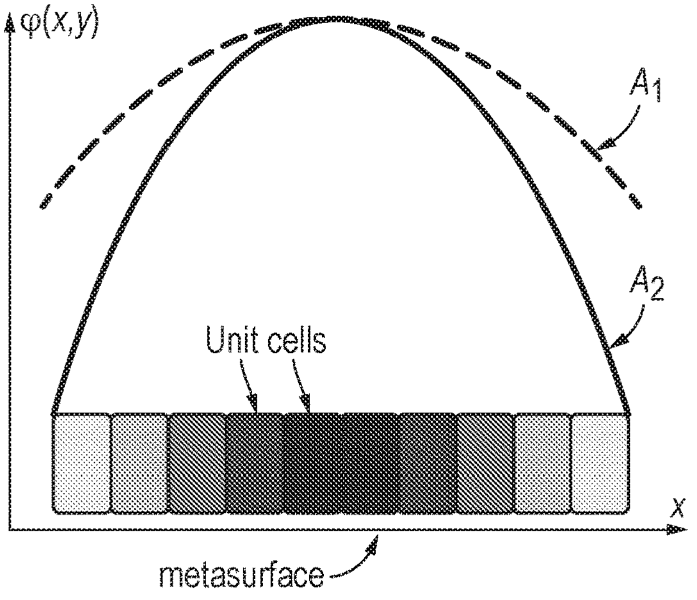
FIG. 6A shows an example of how a parabolic acoustic lens may be designed and FIG. 6B illustrates how the unit cells may be operable at a number of different frequencies.

Although FIG. 5A shows one example of a converging lens, it will be appreciated that other suitable arrangements are also possible. For example, it would also be possible to design an acoustic lens having a parabolic phase profile, i.e.: $\varphi(x,y)=\varphi_0-A^2(x^2+y^2)$, where $\varphi(x,y)$ is local phase (assigned to a unit cell), A is a constant related to the local curvature of the phase profile, and $\varphi_0$ is an arbitrary constant. For instance, this phase profile may allow for more compact acoustic lenses to be realised, and allows the parameter A to be easily related to the "curvature" of the lens. In particular, as shown in FIG. 6A, a larger value of A corresponds to a more focusing lens.

Figure 6B:
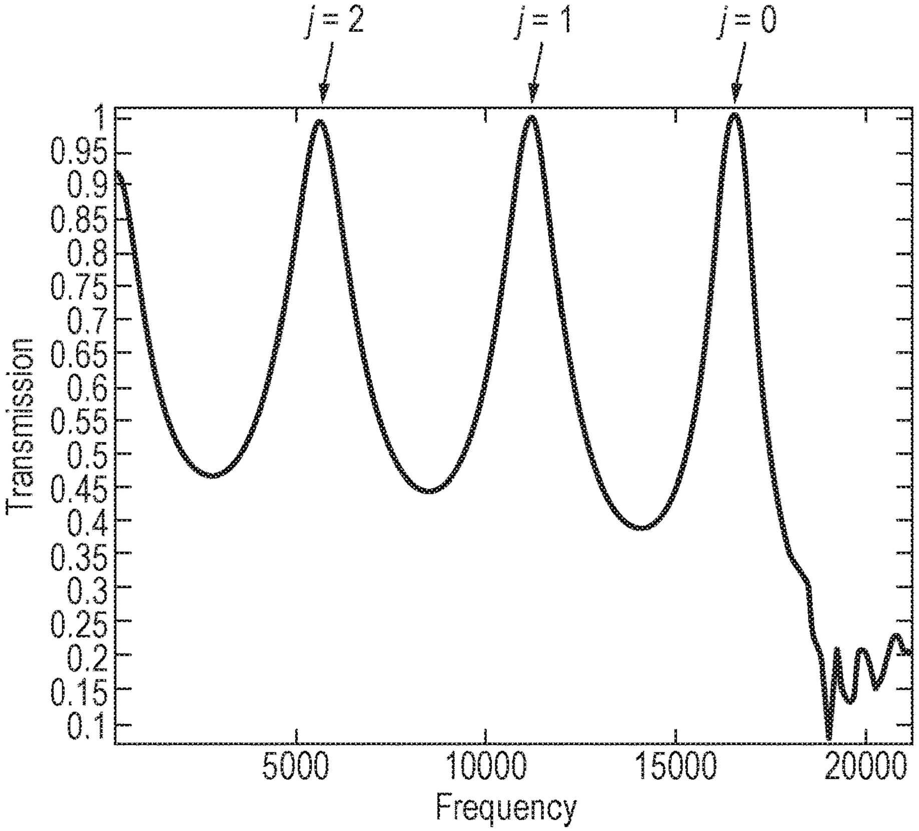

So, as mentioned above, once the required phase distribution $\varphi(x,y)$ for the metasurface is known, whatever this is, a set of unit cells must then be chosen for reproducing this. Preferably the unit cells are of the type above (although it will be appreciated that other types of unit cells may also be used). These unit cells are designed to have a maximum transmission (e.g. of approximately 97%) at a particular operating wavelength (corresponding to 40±1 kHz). However, the unit cells may still be used at other wavelengths. In particular, for this type of unit cell, substantially the same transmission at the designed operating wavelength is also achieved at a set of other frequencies: $f_j=f_0-j\cdot C_0/L_{eff}$, where $L_{eff}$ is a design parameter of the specific unit cell wherein j=0, 1, 2, . . . , N, with N being the integer number of times that $L_{eff}$ contains the wavelength. As shown in FIG. 6B, it is thus possible to operate the unit cells at one of these frequencies, maintaining a similar transmission to the one in $f_0$ (but considering that the phase encoded at $f_j$ is different from the one at $f_0$, so a suitable look-up table may be used).

The present Applicants have further developed some design tools that can be used to model such acoustic metasurface lenses. This discovery simplifies the realisation of metamaterial based devices and leads to solving some of the limitations of current metamaterial-based approaches.

Figure 7:
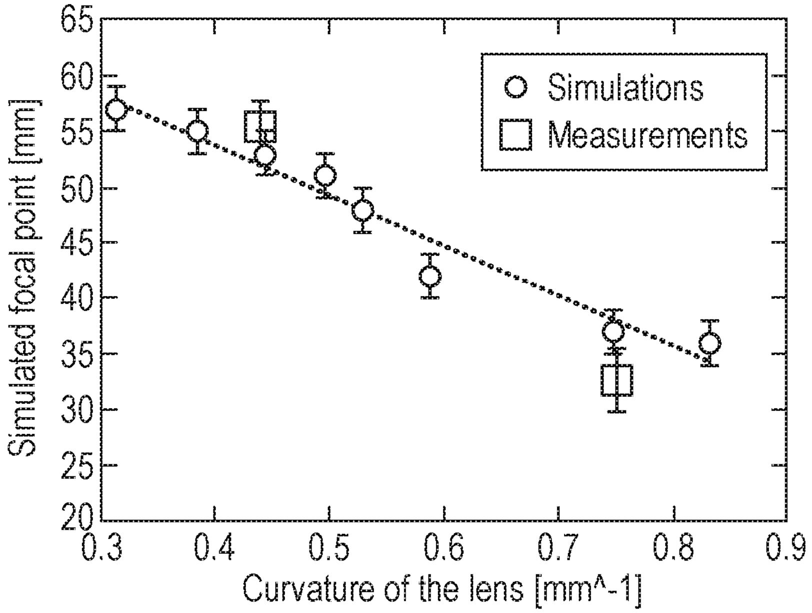
FIG. 7 shows a determined relationship between the focal length of an acoustic lens designed according to the present disclosure and the curvature of the lens.

In particular, it has been found that the focal length of an acoustic metasurface lens can be related to the positions of the source and the image using a relationship of the form: $1/p+1/q=1/f$, where f is the focal length of the lens, p is the distance between the source and the lens, q the distance between the lens and the image of the source. This equation is based on the same hypotheses used to design the metasurface and has been found to apply directly at least when the metasurface thickness is smaller than the wavelength. Remarkably, despite the different nature of acoustic and electromagnetic waves, this equation is of the same general form as the thin lens equation that can be applied to optical systems. FIG. 7 is a plot essentially confirming the validity of this relationship for a parabolic acoustic lens and in particular showing how the focal point varies with the curvature of the lens (i.e. with the parameter A).

The discovery of this relationship leads naturally to the design of systems including various arrangements of acoustic lenses such as acoustic telescopes or microscopes. For instance, for a system of two acoustic metasurface lenses, the focal length is then given by: $1/F=1/f_1+1/f_2-D/(f_1 \cdot f_2)$, where $f_1$ and $f_2$ are the focal lengths of the two lenses and D is the mutual distance between the two lenses.

By appropriately selecting the mutual distance between two such acoustic metasurface lenses, it is thus possible to control the acoustic output. For instance, FIG. 8 shows a system comprising two acoustic metasurface lenses whose mutual distance can be varied in order to vary an acoustic output.

Figure 8:
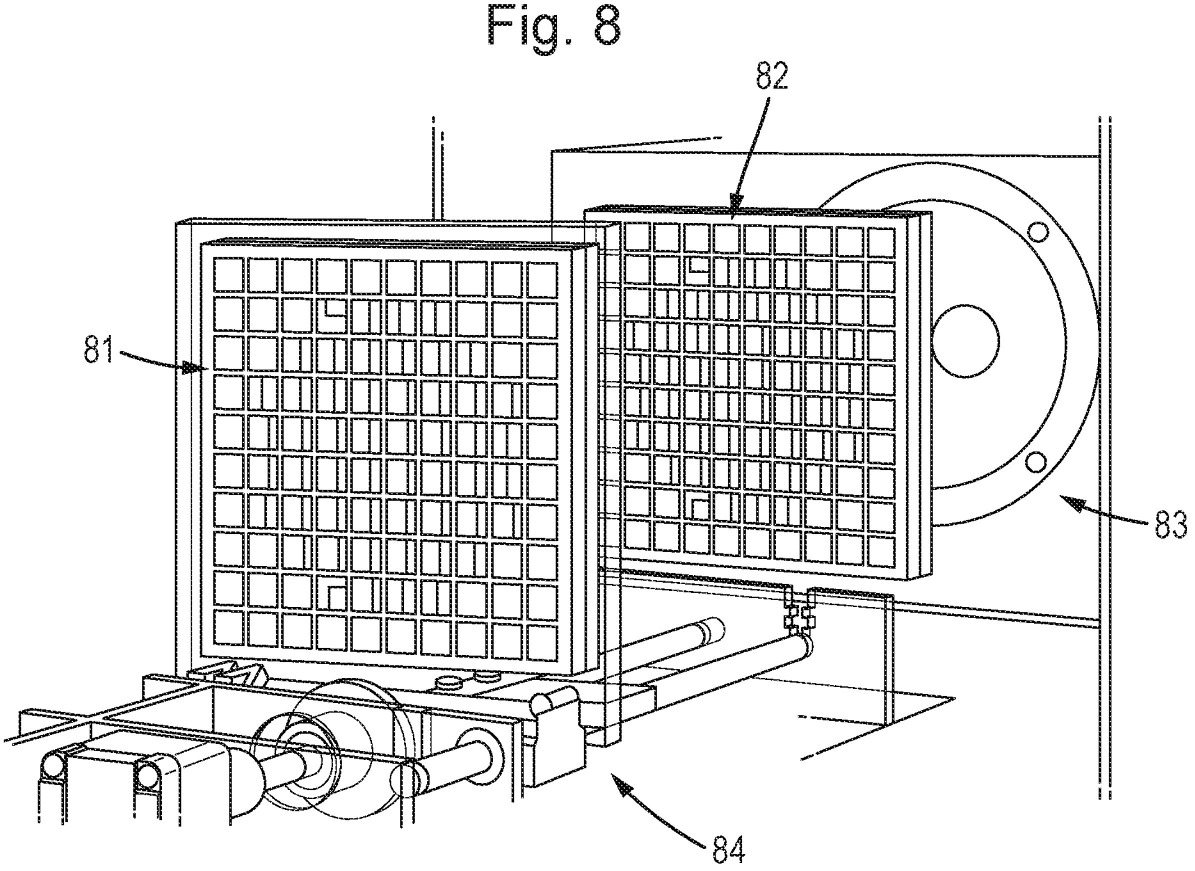
FIG. 8 shows a system of acoustic lenses that may be used to provide a varifocal lens.

For instance, in FIG. 8, a system is provided comprising a first acoustic metamaterial lens 81 and a second acoustic metamaterial lens 82 that are provided in front of an acoustic source in the form of a speaker 83. Acoustic waves from the speaker 83 are thus transmitted through the acoustic metamaterial lenses and acted on accordingly in order to generate a certain acoustic output.

A suitable mechanism is also provided for adjusting the mutual distance between the first and second acoustic metamaterial lenses. For instance, in FIG. 8, a drive means 84 is provided that allows the mutual distance to be adjusted in order to vary the acoustic output (i.e. to vary the magnification and/or focus of the acoustic output). However, various other possibilities would be provided. For example, the acoustic metamaterial lenses may be translated along suitable guide rails, or a screw mechanism may be provided to allow the mutual distance to be adjusted. However, various other arrangements would of course be possible.

Figure 9:
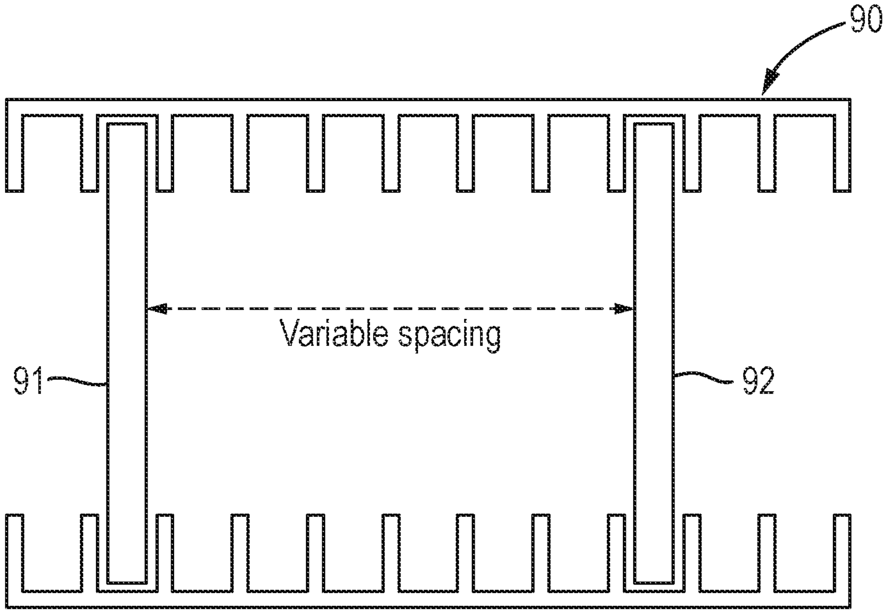
FIG. 9 shows another example of a system of acoustic lenses having a variable focal length.

For instance, in another embodiment, rather than providing some mechanism for incrementally adjusting the mutual distance between the first and second acoustic metamaterial lenses, the first and second acoustic metamaterial lenses may be stacked at different positions within a housing, as shown in FIG. 9. For instance, the housing 90 may comprise a plurality of axial slots to allow acoustic metamaterial lenses 91, 92 to be arranged in a suitable stack with the mutual distance between the acoustic metamaterial lenses being determined by the position of the acoustic metamaterial lenses within the stack.

Figure 10:
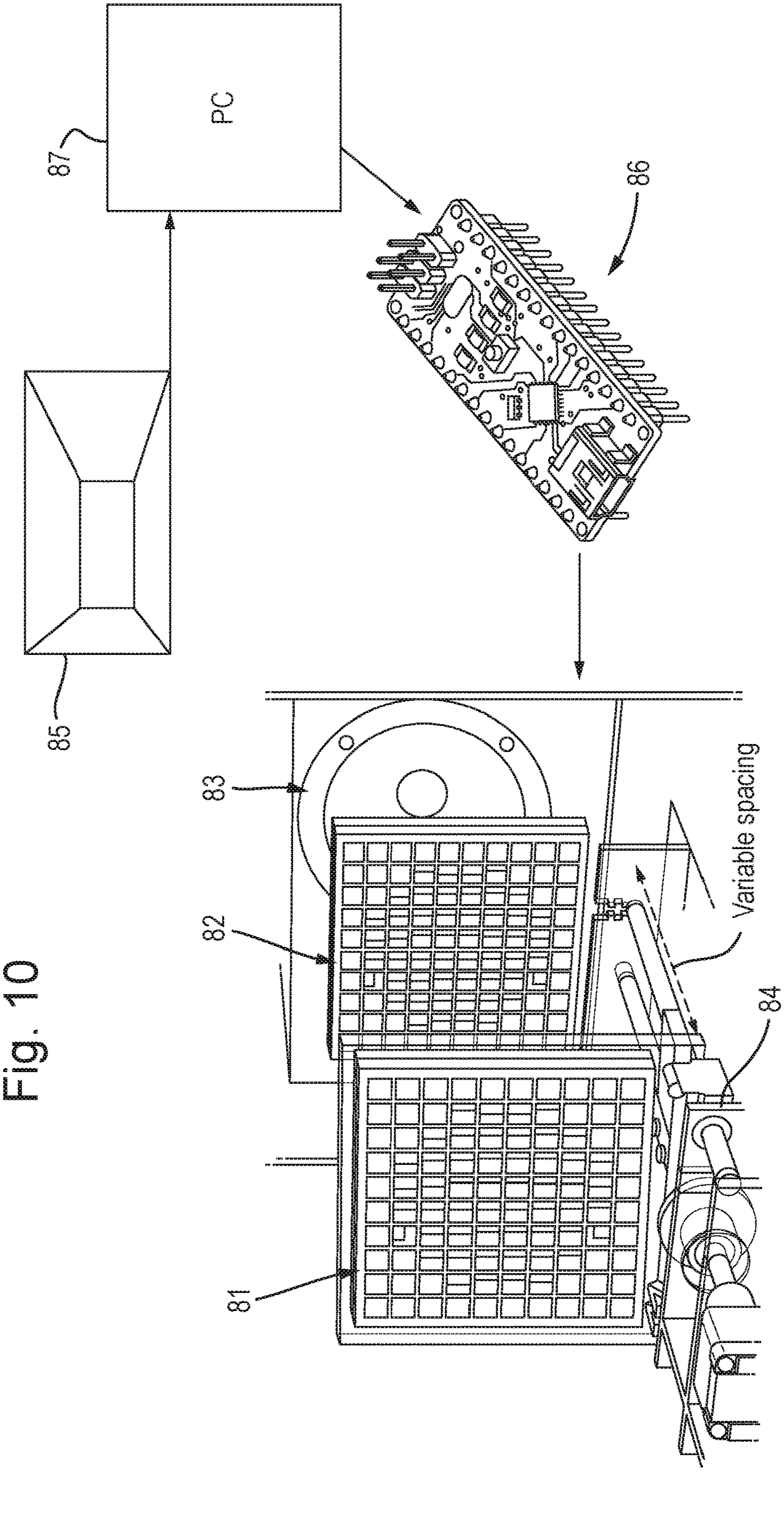
FIG. 10 shows an example of a system of acoustic lenses that may be used to provide an automatic zoom lens.

In embodiments, the mutual distance between the acoustic metamaterial lenses may be set or controlled by a user. However, it is also contemplated that the mutual distance between the acoustic metamaterial lenses may be controlled automatically. For example, by providing a suitable feedback circuit, it would be possible to automatically focus the acoustic output towards a moving target. An example of this is shown in FIG. 10. FIG. 10 thus shows a sound delivery system designed to be able to track a moving target. The system of FIG. 10 is based on the device illustrated in FIG. 8. However, n FIG. 10, a position sensor 85 is provided (that may comprise a camera, or any other suitable position sensor) that is able to determine the distance to a target object. The target position information is then passed to a suitable processing circuit and used to adjust the distance between the acoustic metamaterial lenses appropriately to track the target and continue to deliver focused sound to the target as it moves towards/away from the speaker. As shown, the processing circuit may generally comprise any suitable circuitry. For instance, in some embodiments, the processing circuit may comprise a dedicated microprocessor 86 that is able to directly control the spacing based on the information obtained from the position sensor. This may provide sufficient control for some sensors. However, in the illustrated embodiment, the control may be performed by a computer 87. Thus, the information from the position sensor 85 is processed by the computer 87 which in turn causes the microprocessor 86 to control the mechanics to vary the spacing between the two acoustic metamaterial lenses 81, 82. For example, this may be the case where the sensor is a camera and the image tracking is performed on a computer or a Raspberry-Pi microprocessor.

Of course the device can also work in reception. For instance, rather than providing an audio spotlight that can track and deliver sound to a moving target (as shown in FIG. 10), a zoom microphone could be realised that automatically tracks a moving acoustic source. In such an auto zoom system (operating in detection) the speaker may thus be substituted for a microphone positioned in the focal plane of the closest lens.

Thus, based on the principles set out above, it is possible to realise various novel acoustic metamaterial-based devices. Various embodiments will now be described with respect to systems of acoustic lenses. Like in modern optical objectives, it is also possible to design systems with more than two lenses.

For instance, based on the principles set out above, it is possible to build an acoustic collimator that acts to correct the geometric divergence of a source (so that the output is spatially contained in a highly directional beam). For instance, by locating an acoustic metasurface lens at a distance from the source equal to its focal length, the acoustic waves from the source can be transformed into a substantially parallel beam. By providing two such acoustic lenses, it is possible to further control the acoustic output, e.g. to reduce the divergence. Such systems can then be used to transform an arbitrary speaker into a highly directional audio spotlight.

In the same way, an acoustic collimator system could be used in detection, to transform generic acoustic sensors into highly directional ones. Indeed, although FIG. 1 shows a transmitting device, it will be appreciated that the devices substantially as described herein may also be used as part of a receiver or sensor assembly, for example, for acoustic sensing or imaging applications.

Similarly, such systems may be used to provide highly personalised audio experiences in shared spaces. For instance, an acoustic beam can be sent selectively to different areas in order to optimise or tailor the acoustic experience at different positions.

Similar considerations can be applied to smart speakers, like Google Home or Amazon Echo, whose 360 degree range of emission is provided by an array of speakers.

Various other systems would of course be possible. For instance, systems of acoustic metasurface lenses may also be used to construct acoustic magnifying glasses, or acoustic telescopes. This might find utility in various applications. For example, one possibility would be to create the image of a speaker in front of the user and thus providing the feeling that the sound is coming from a localised source. This might then provide a more immersive audio experience, analogous to a surround sound system, but without requiring an expensive speaker system (since the modulation of the acoustic output can be performed instead using the acoustic metasurface system).

Thus, in embodiments, the techniques described herein may be used to realise a directional sound system such as an 'audio spotlight' used with digital signage, or displays, or kiosks for targeted advertising or announcements. A directional sound system may also be employed on consumer electronic devices e.g. for providing wireless audio devices.

As another example, the techniques may be used for wireless power transfer such as ultrasonic charging. Existing techniques for wireless ultrasonic charging using a phased transducer array require extremely high operating powers in order to provide a sufficiently strong focused beam, and may not therefore be practical or safe. As explained above, because the power requirements for the modulator are separated from the power requirements of the source, the techniques described herein may operate at significantly lower powers than phased array techniques.

A further example would be using the acoustic wave for interactions with other objects, for instance, in the field of haptic control e.g. for consumer electronic devices, or for acoustic levitation or tractor beams. For instance, using an appropriate system of acoustic metamaterial lenses, it may be possible to extend the range of haptic devices to large distances. Similarly, the techniques may be used in virtual reality applications.

The techniques may also find a variety of application in the medical and industrial sectors. For instance, there are a variety of therapeutic and diagnostic techniques involving spatial sound modulation. One example of this would be High Intensity Focussed Ultrasound for ablating tissue. Another example would be targeted drug delivery. A typical industrial application may be in the field of non-destructive testing, or for waste manipulation.

Such acoustic metasurface lenses may also of course be used in combination with other types of acoustic metasurfaces.

For example, an acoustic metasurface lens may be used in combination with a metasurface that is arranged to generate an acoustic hologram. Such systems may thus also be used for extending the range of haptic devices, or providing moveable acoustic holograms. An application of this would be, e.g., to provide a tactile television that provides extra sensory output.

Figure 11A:
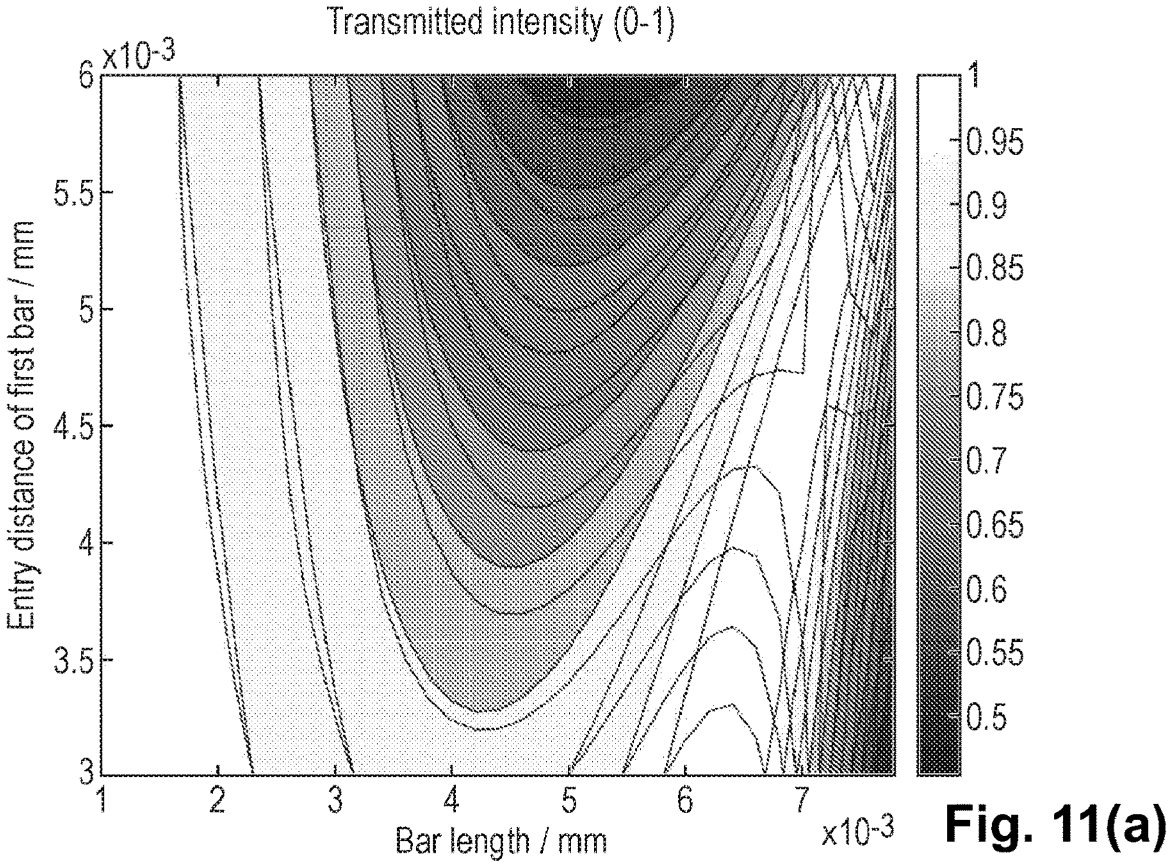
FIGS. 11A and 11B illustrate how the structure of a unit cell can be designed to control both the transmission (intensity) and phase delay values for that unit cell.
Figure 11B:
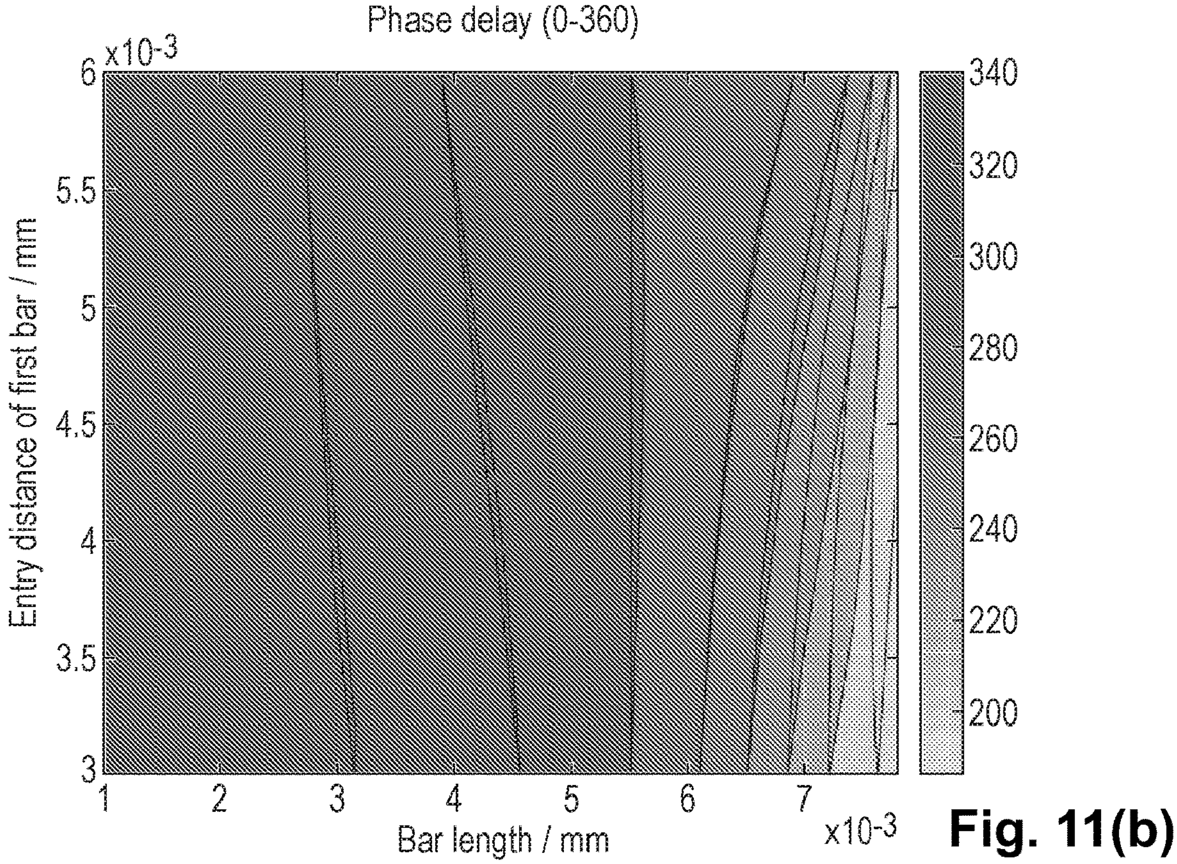

As another example, acoustic metasurface lenses may be used in combination with an intensity filter or intensity modulator. For instance, an acoustic metasurface may be configured to act as an intensity filter that provides the same phase delay for a range of different intensities. FIGS. 11A and 11B illustrate this concept. More specifically, FIGS. 11A and 11B show how the transmitted intensity and phase delay for a unit cell can be adjusted by changing the structure of the unit cell (in particular by changing the geometrical parameters, i.e. the lengths $b_s$ and b as shown in FIG. 3). In particular, FIGS. 11A and 11B show the effect of changing geometrical parameters for a unit cell geometry of the type shown in FIG. 3 with four horizontal bars (two on each side) and for acoustic waves at 5200 Hz. It can be seen that the same phase delay can be achieved using different geometry choices. Correspondingly, this means that the same phase delay can be achieved using different intensities, which would allow an intensity filter or modulator to be created.

For instance, for a given design of unit cell (i.e. having a fixed effective length), the delay is typically linear with the frequency. So, for a unit cell having a fixed area, it is possible to optimise the design for use around a certain frequency. A possible way of optimising the unit cell design is: (a) change the length and the spacing of the horizontal bars ($b_i$ and $b_s$ in FIG. 3) until the desired transmission is achieved; (b) among the configurations that give the desired transmission, select the ones that give the desired phase delay; (c) among the ones that give the desired phase delays and transmission, select those that are more "resilient" to changes of in the operating frequency, to provide a larger operating bandwidth.

Thus, it will be appreciated that the present disclosure provides various novel acoustic systems that can be realised through the appropriate combination of differently configured acoustic metasurfaces. In general each acoustic metasurface may be quantised spatially, i.e. according to the positions of the unit cells. In such systems, each unit cell thus effectively acts as a 'control point' (i.e. a separate acoustic source) whose output is then provided to the next acoustic metasurface in the system, and so on. The output of the system can thus generally be determined from a convolution of the operations performed by the acoustic metasurfaces within the system, with the convolution depending on the mutual orientation (e.g. spacing) between the various acoustic metasurfaces. For the case of acoustic metasurface lenses, the Applicants have recognised (and confirmed through extensive testing and device realisation) that this behaviour remarkably can be modelled using an acoustic analogue of the thin lens equation. However, the Applicants have also extended this analysis to more general systems of acoustic metasurfaces, and developed a tensor-based method for modelling and/or designing acoustic metasurface systems. In particular, it has been found that the acoustic output (or a desired acoustic output), $P_n$, for a system of two acoustic metasurfaces may be given by a relationship of the form:

$$P_n = \underbrace{M_{nl} \cdot N_{jlk}}_{T_{njk}} \ldots I_j^{(2)} \cdot I_k^{(1)}$$

where $M_{nl}$ looks at the geometrical propagation from the second metasurface to the N control points, $N_{lk}$ considers the propagation from the K unit cells in the first meta-surface to the L unit cells in the second meta-surface, while $I^{(2)}$ reports the change in phase and amplitude encoded by the second meta-surface and $I_k^{(1)}$ the change in phase and amplitude encoded by the first meta-surface. The two-dimensional problem of a stack of two meta-surfaces can therefore be written using a 3rd-order tensor $T_{njk}$ and the problem of finding $I_j^{(2)}$ and $I_k^{(1)}$ can be solved with the methods of tensor factorization.

The techniques described herein thus represent a very powerful approach for designing and constructing acoustic systems that are capable of performing essentially arbitrarily complex operations on an acoustic wave, and whose acoustic output can be readily tailored through a suitable adjustment of the mutual orientation between a number of acoustic metasurfaces constituting the acoustic system.

Figure 12A:
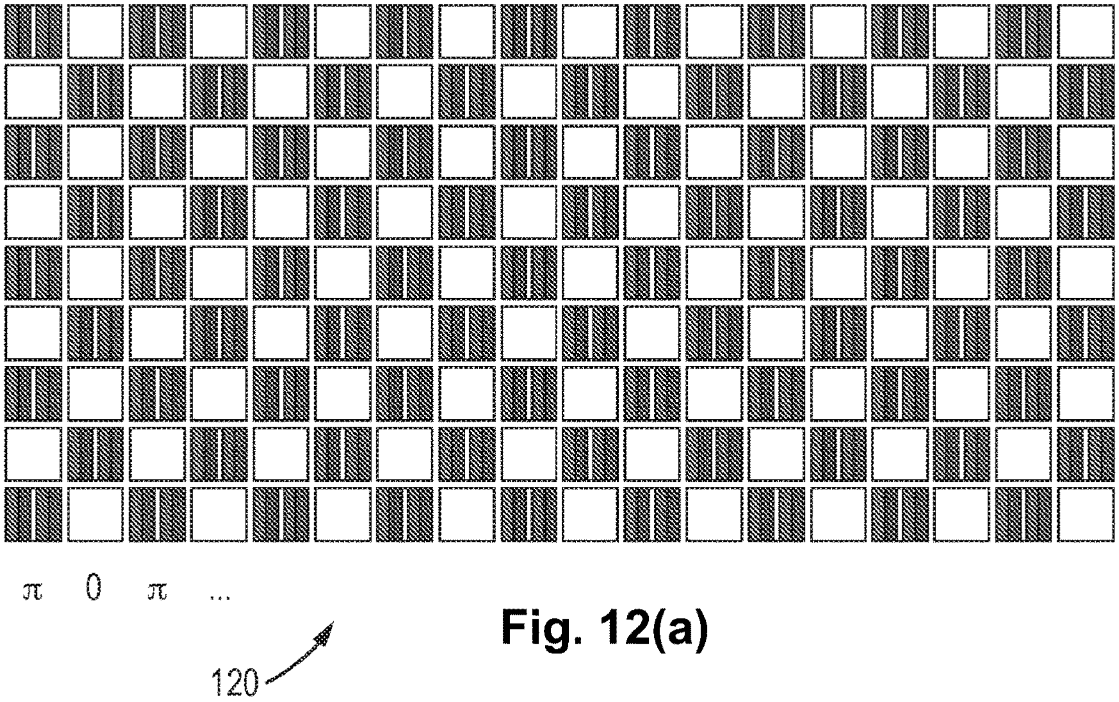
FIGS. 12A and 12B show an example of an acoustic metasurface window having a noise reducing effect.
Figure 12B:
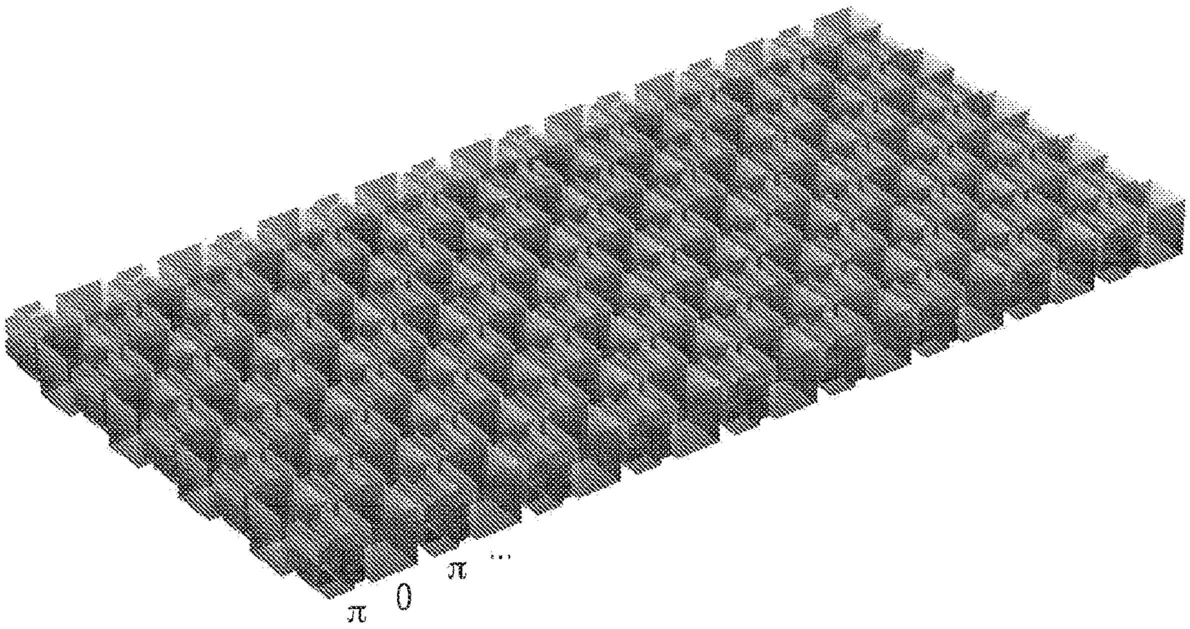

In addition to the various applications presented above, an acoustic metasurface may also be configured to provide a reduction in intensity for incident acoustic waves, i.e. to provide a noise cancelling (or reduction) operation. This could be realised, for example, as shown in FIGS. 12A and 12B, by providing an acoustic metasurface 120 having an alternating checkerboard pattern of unit cells designed to introduce phase delays of 0 and π. An acoustic wave encountering these phase delays will then have its intensity reduced as a result of the interference between the components passing through the different unit cells.

This structure may be used by itself, e.g. to provide a noise cancelling window. However, this structure may also be used in combination with other acoustic metasurfaces.

Figure 13B:
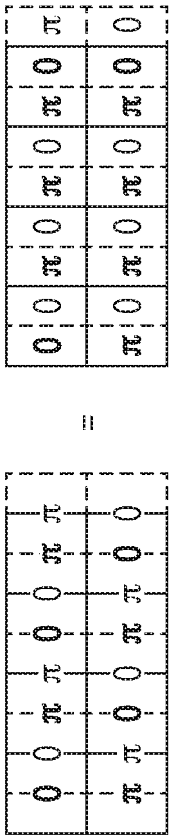
FIGS. 13A to 13C illustrate how a system of two noise reducing acoustic metasurfaces can be used to provide a selective filtering of noise.
Figure 13C:
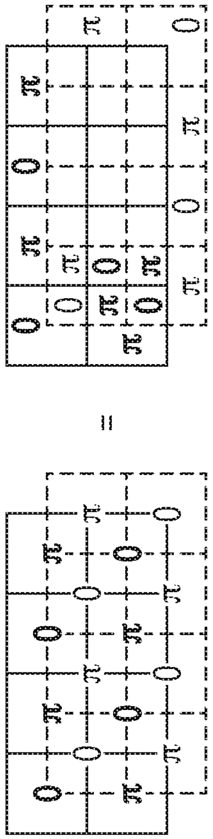
Figure 13A:
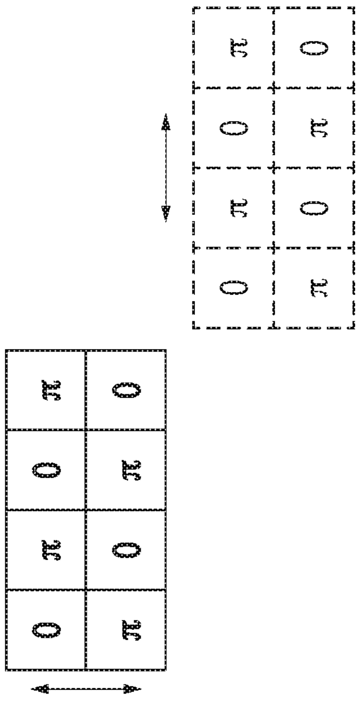

For example, FIGS. 13A to 13C show an example of a system comprising two acoustic metasurfaces, each configured to provide a noise reducing effect. In particular, each acoustic metasurface has a complimentary alternating checkerboard pattern of 0 and π phase delays (see FIG. 13A). The two acoustic metasurfaces can then be slid relative to each other to control the acoustic output. For instance, in the position shown in FIG. 13B, there is a noise reduction only in some directions (the sides ones, i.e. at the edges of the device), while other acoustic waves passing through the center of the device can still pass. In the position shown in FIG. 13C, there is noise reduction in all directions. In intermediate positions the noise cancelation may be selective, or even frequency selective (e.g. if the two metasurfaces are designed to operate over different but overlapping bandwidths).

Figure 14:
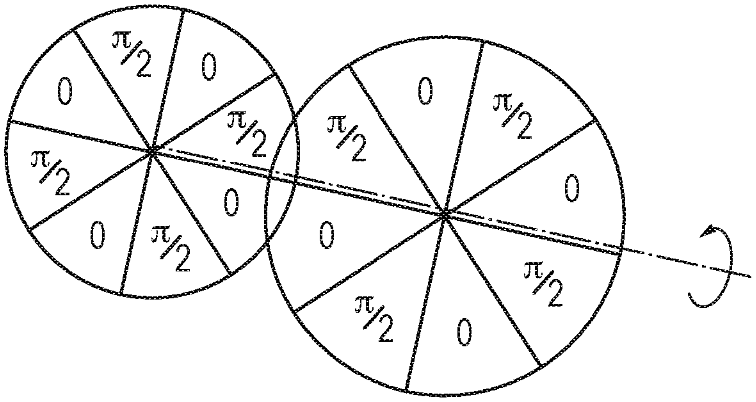
FIG. 14 shows another example of a selective noise reducing system.

Other patterns of unit cells can also be used for providing such noise reductions. For instance, in FIG. 14, a selective noise reducing structure is provided that comprises two acoustic metasurfaces each comprising an alternating pattern of acoustic metasurface having an alternating checkerboard pattern of 0 and π/2 phase delays. In this case, when the patterns are rotatably aligned (such that the π/2 phase delays for the two circular metasurfaces are aligned), the combined pattern is then an alternating pattern of 0 and π phase delays, and the resulting interference thus results in a reduction in intensity for acoustic waves experiencing these phase delays. On the other hand, for any intermediate positions there will be only a partial attenuation.

Figure 15A:
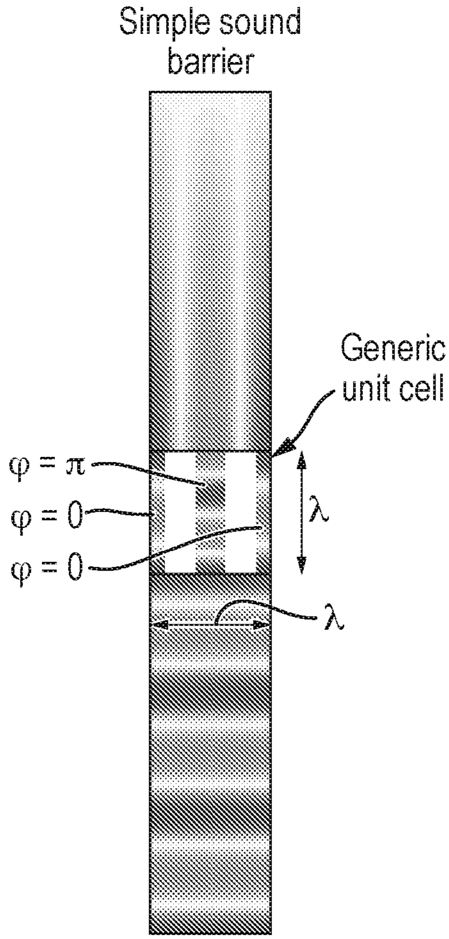
FIG. 15 shows another example of how the distance between two acoustic metasurfaces may be varied in order provide a noise reducing effect.
Figure 15B:
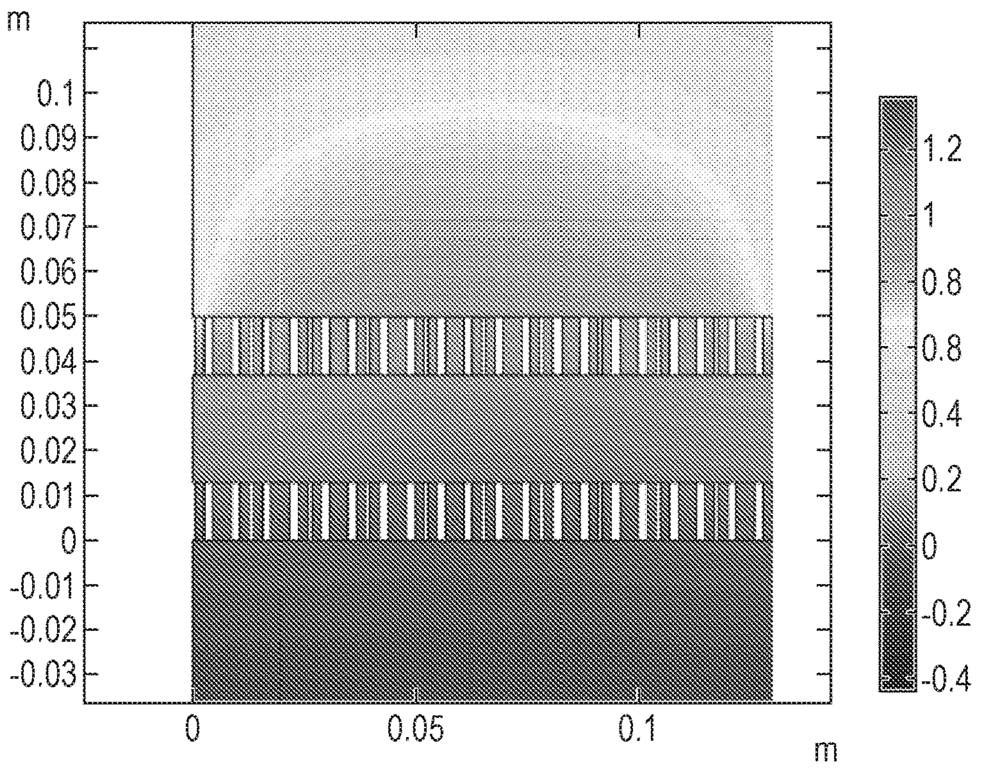
Figure 15C:
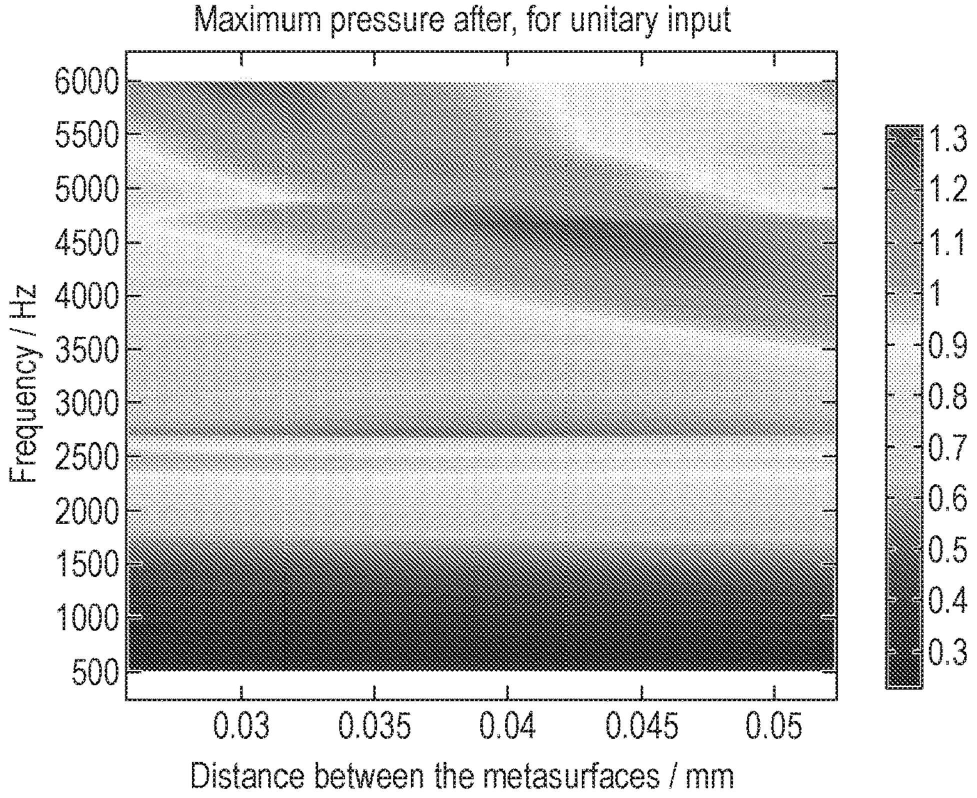

This concept is further illustrated in FIG. 15 which shows how the concept of alternating 0 and π phase delays can be implemented in a single unit cell, so that sound reduction can be achieved with a metasurface formed by the same repeated unit cell. In particular, for the unit cell shown in FIG. 15A, the portion of the incoming acoustic wave passing through the central channel of the unit cell is shifted out of phase with the portion(s) of the acoustic wave passing around the external (lateral) parts of the unit cell, and the resulting interference causes a reduction in sound in a similar fashion as described above. However, by placing another similar metasurface at appropriate distances from the first one (as shown in FIG. 15B), it is possible to 'recreate' the original acoustic wave. This is illustrated in FIG. 15C, which is a plot of the maximum pressure obtained after passing acoustic waves through a system of two identical metasurfaces as a function of the spacing between the acoustic metasurfaces and of the frequency of the acoustic waves, for a thickness of the metasurface equal to 13 mm. It can be seen from FIG. 15C that for some frequencies and spacings the initial pressure is reproduced and even amplified (due to resonance). In this way, by varying the distance between the two acoustic metasurfaces, a device can be realised than can selectively cancel/amplify sound by pressure (i.e. with one of the metasurfaces acting like a button).

Figure 16:
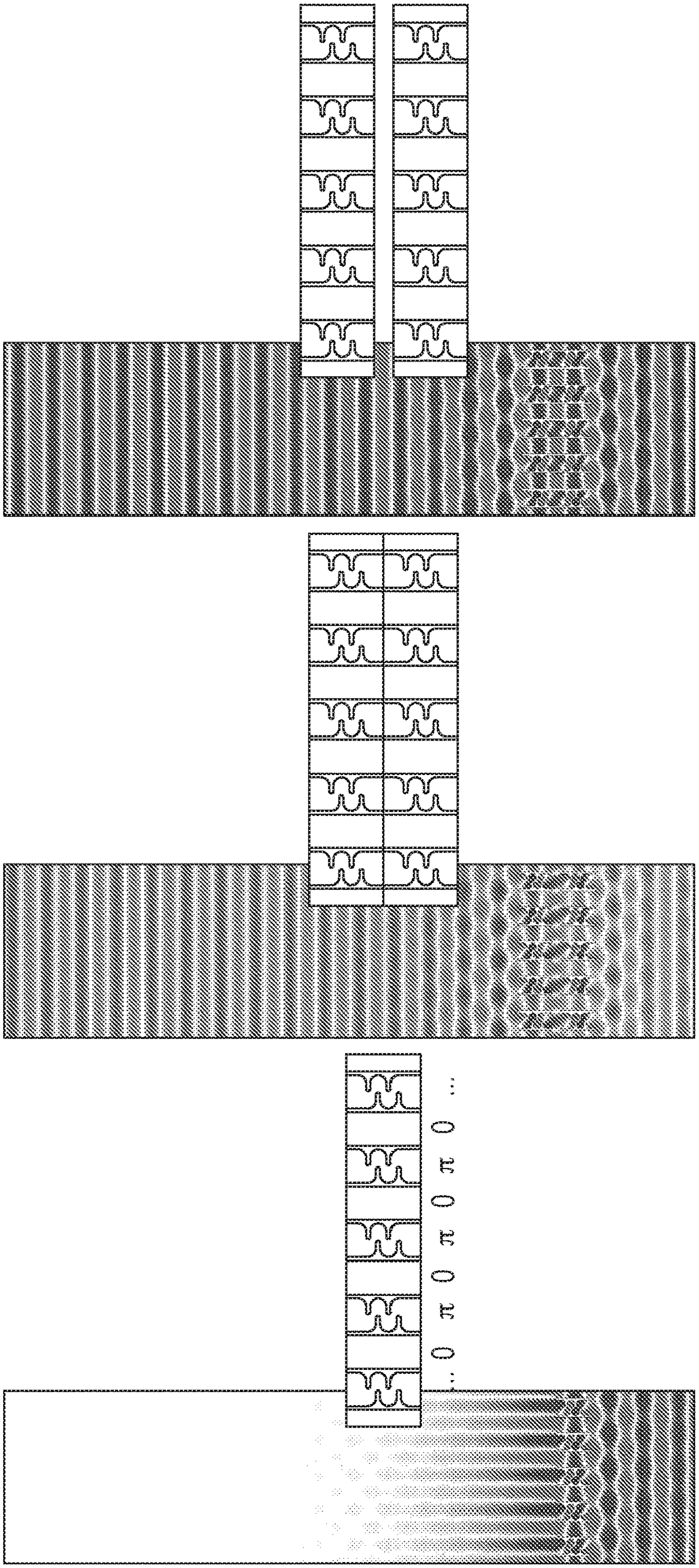
FIG. 16 shows the effect of varying the distance between two metasurfaces of the type shown in FIG. 13.

FIG. 16 shows an example of using two acoustic metasurfaces, e.g. of the type shown in FIGS. 13A to 13C, having an alternating arrangement of 0 and π phase delays. In this case the mutual distance may again be used to create resonant effects, so that the area of noise cancellation changes position as a function of the distance.

Figure 17:
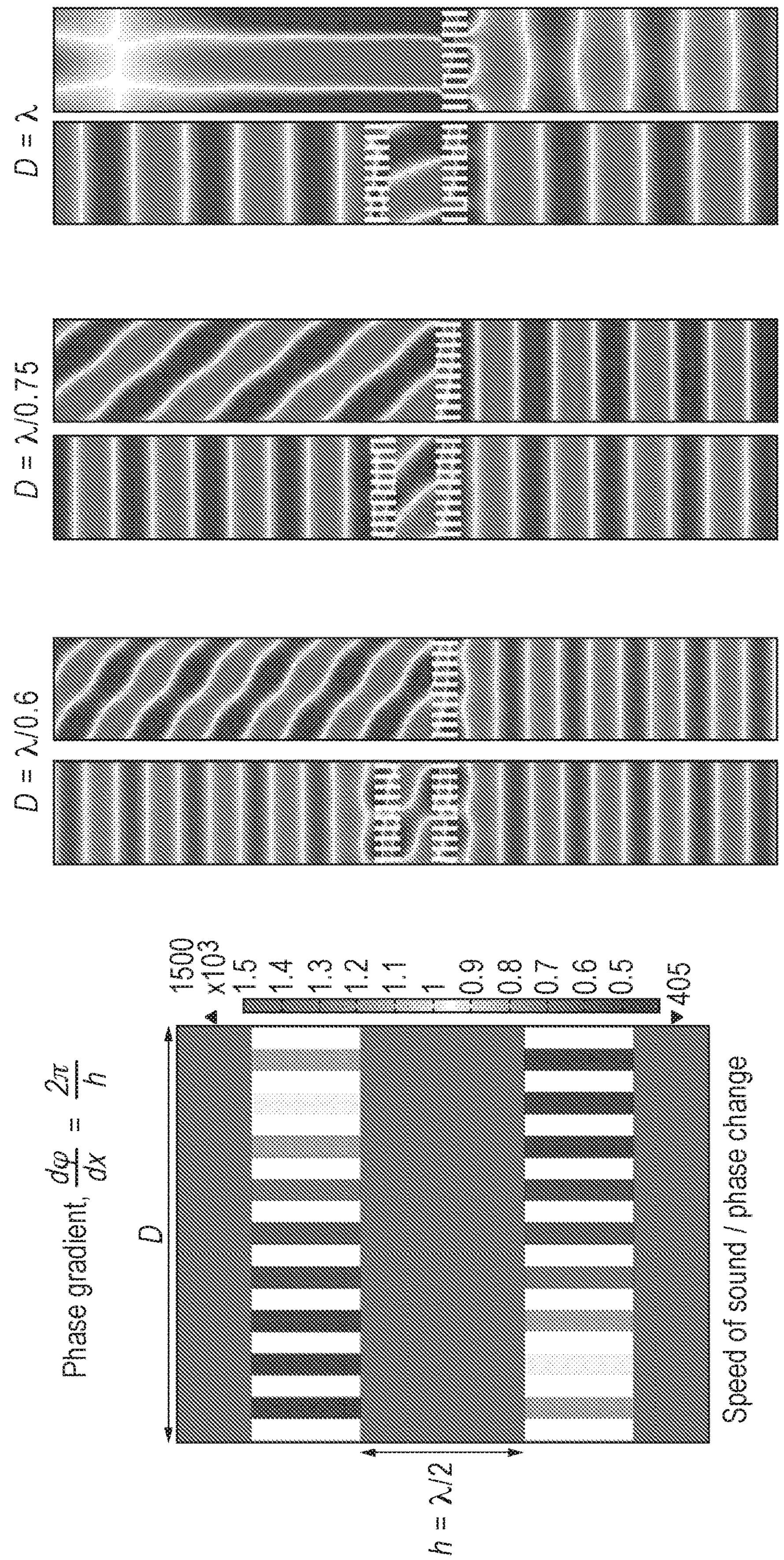
FIG. 17 shows an exemplary approach for possible way of realising noise cancellation (as a function of distance) using two metasurfaces with a gradient phase profile.

FIG. 17 shows another example where this concept is extended over a broader frequency range. In this case, rather than using alternating arrangements of 0 and π phase delays, two acoustic metasurfaces are provided having respective phase gradients of $d\varphi/dx=\pm 2\pi/h$, where $h=\lambda/2$ is the spacing between the acoustic metasurfaces. Each acoustic metasurface is configured to reduce noise at least in a certain direction (which direction is determined based on the direction and magnitude of the delay gradient). However, by placing the two acoustic metasurfaces next to each other, the sound is transmitted through the barrier. Again, this solution may cause cancellation only when desired.

Figure 18:
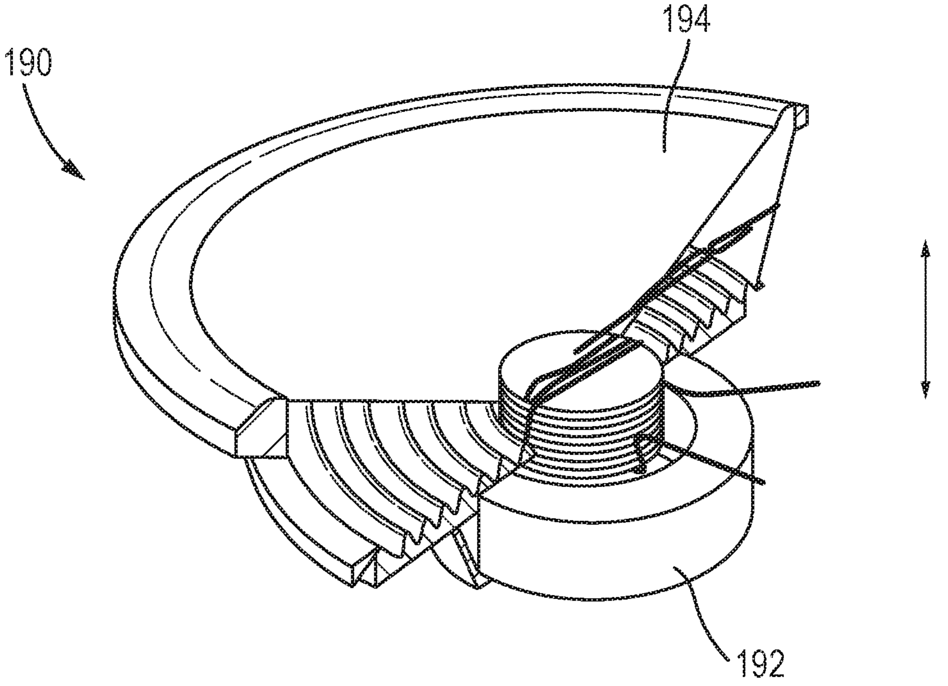
FIG. 18 shows an example of a speaker system having a diaphragm incorporating a metamaterial surface.

The unit cell metamaterial-based approaches described herein may also be applied to surfaces, or structures, rather than being used to provide stand-alone acoustic metasurfaces (or systems of acoustic metasurfaces, e.g. as described above). For instance, FIG. 18 shows an example of a speaker system 190 including a magnet 192 that causes a speaker diaphragm (or cone) 194 to oscillate in order to create the audio output, and wherein the speaker diaphragm 194 is patterned with a suitable arrangement of unit cells in order to control the speaker output. That is, the unit cells may be incorporated into the curved surface of the speaker diaphragm 194. In this way, the speaker may be configured as a parametric or directional speaker, with the directionality being determined by the arrangement of unit cells.

Figure 19:
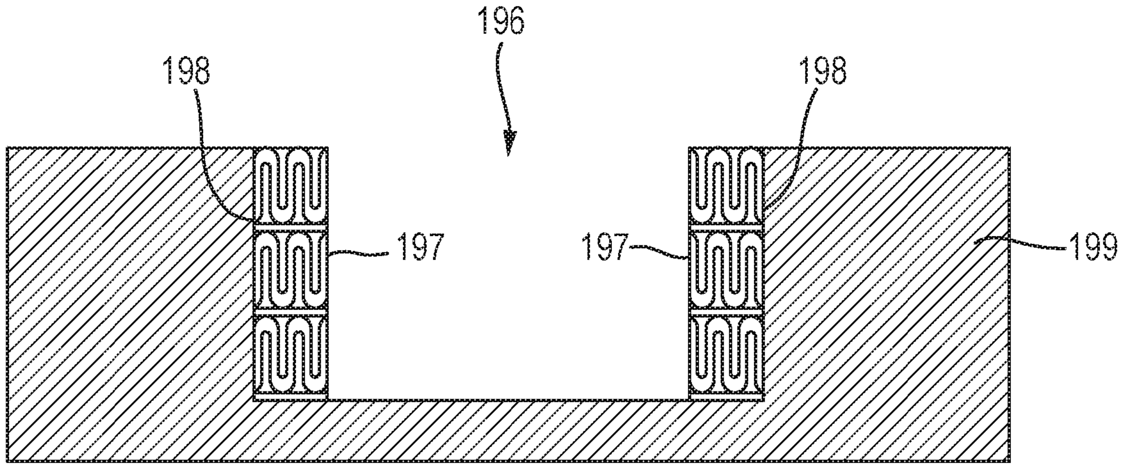
FIG. 19 shows an example of a surface channel having an arrangement of metamaterial unit cells patterned along the sides of the channel.

Various other arrangements would of course be possible. For example, FIG. 19 shows a channel 196 formed within a surface 199 (which may, e.g., comprise the surface of a tyre), with the inner walls 198 of the channel 196 being patterned with an arrangement of unit cells 197. In this way, sound waves passing through the cavity 196 may be manipulated, as desired, based on the arrangement of the unit cells 197. For example, the unit cells 197 may be arranged to provide a noise reduction effect. A specific example is the back box of a loudspeaker, which could be realised to be much lighter using noise-cancelling metasurfaces. Another example would be a surface patterned with grooves, like a partition wall in an open-office set-up.

Figure 20:
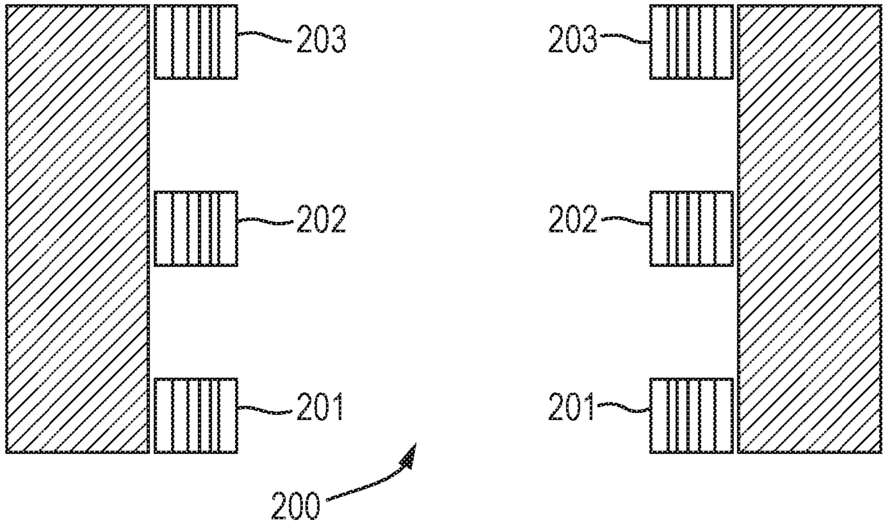
FIG. 20 shows an example of a cylindrical channel whose internal surfaces are patterned with metamaterial unit cells.
Figure 20:
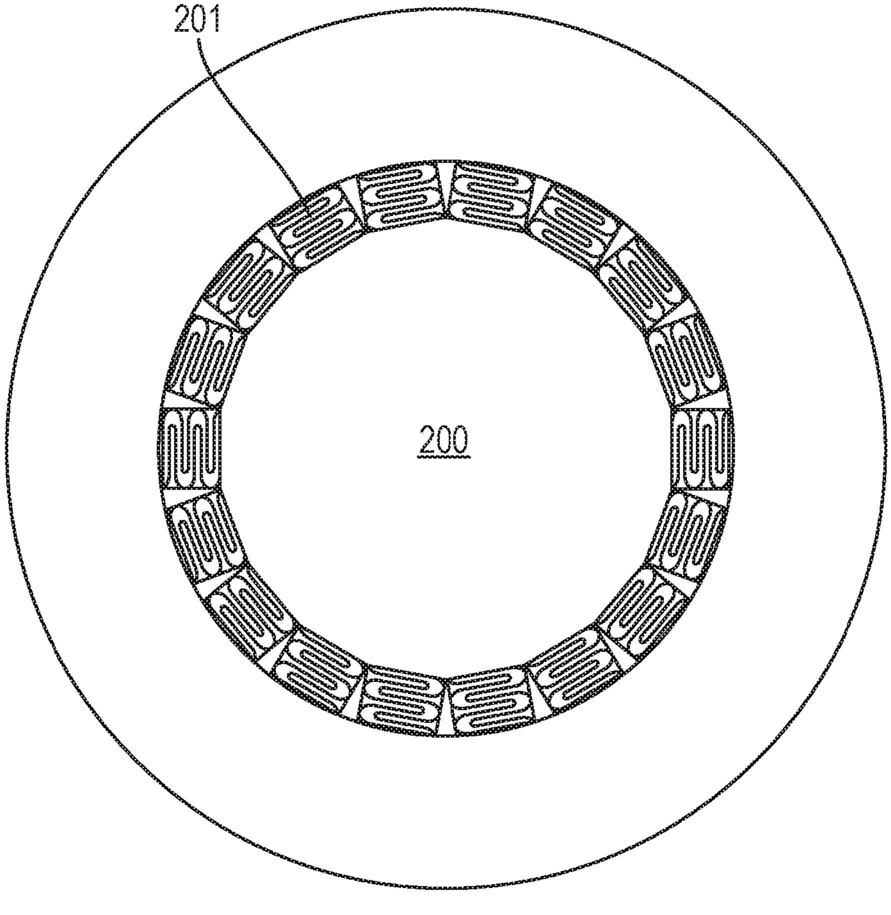

FIG. 20 shows another example wherein a plurality of unit cells 201, 202, 203 are arranged around the curved inner surface of a cylindrical channel 200 in order to manipulate acoustic waves passing through the channel 200. As shown in FIG. 20, the unit cells may be spaced along the length of the channel 200. For example, the channel 200 may comprise a vacuum cleaner or fan tube, with the unit cells arranged to attenuate noise associated with the vacuum cleaner or fan while letting the air through.

However, various other arrangements would of course be possible. For example, rather than an open channel (as shown in FIG. 19 or FIG. 20), such unit cells may be used on the outside of a closed channel. An example of this might be a tyre or a submarine anechoic tile.

In general the unit cells may be incorporated into any desired structure. For example, the unit cells may be provided on an item of clothing or to form a screen. In all cases, the metasurfaces can be designed to let air/fluid flow through them, while acting as noise-cancellation filters in their range of frequencies.

Figure 21:
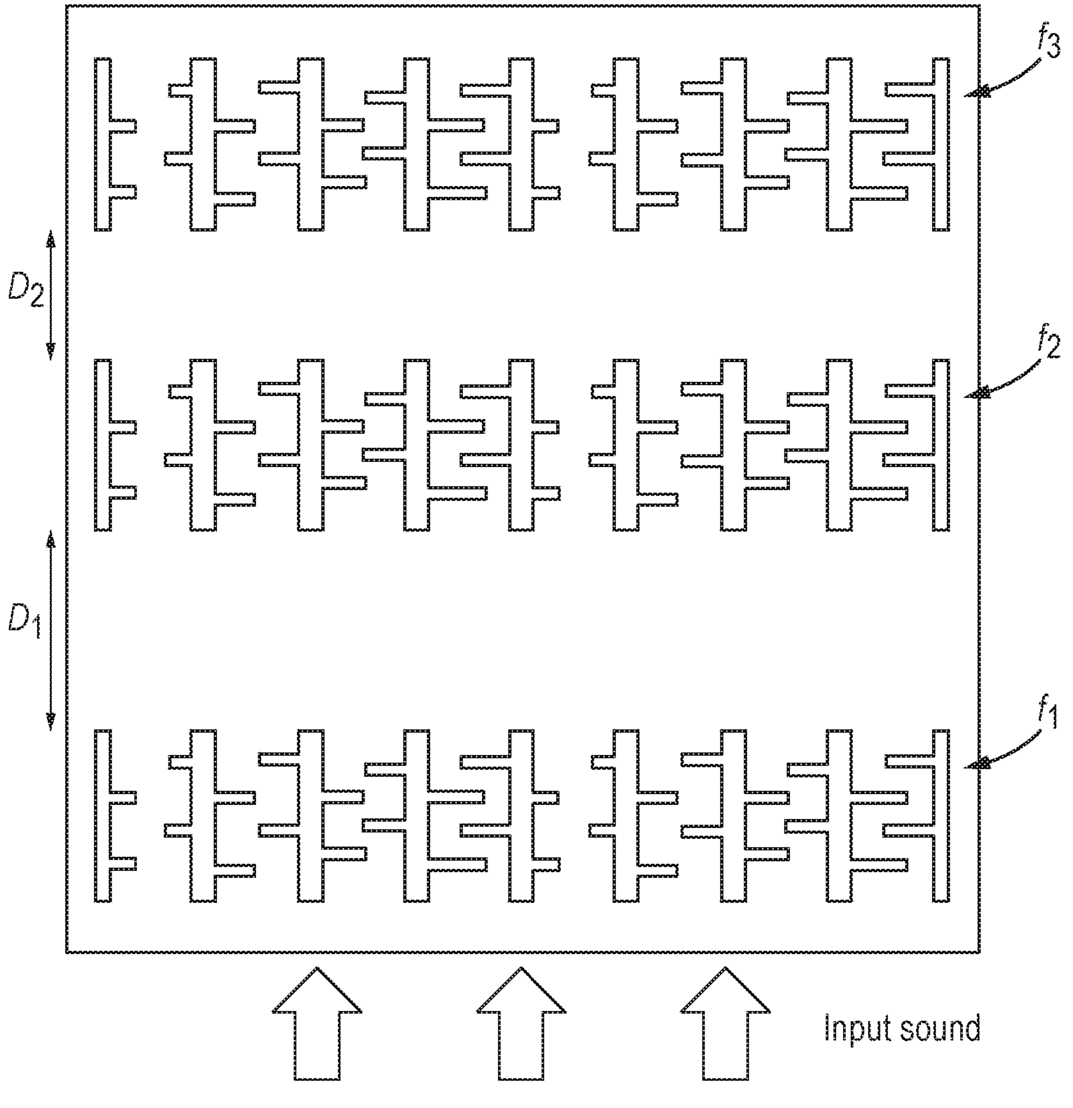
FIG. 21 shows an example of a metasurface system comprising a plurality of metasurfaces incorporated along a surface.

FIG. 21 shows how the spacing of the unit cells along a structure (e.g. along a channel as shown in FIG. 19 or FIG. 20) may be selected to provide a multi frequency response. In particular, FIG. 21 shows a structure in which three different acoustic metasurfaces have been formed. For example, the structure may comprise any suitable material, such as rubber, or wood, with the acoustic metasurfaces then being embossed/engraved onto the surface. However, various other arrangements would of course be possible. Furthermore, although FIG. 21 shows a flat arrangement it will be appreciated that this is merely for ease of illustration and that the arrangement of unit cells may be curved, e.g. such that the unit cells are arranged around an interior of a cylindrical flow channel (as in FIG. 20), or any other desired arrangement.

Each of the acoustic metasurfaces is optimised for a different operating frequency (f1, f2, f3), and has an associated operating bandwidth (Δf1, Δf2, Δf3). In general the acoustic metasurfaces may be configured to perform any desired operation. For instance the acoustic metasurfaces may be configured to perform the same function (e.g. lensing, or noise-cancellation), or may perform different functions.

It is desired to maximise, in convolution, the bandwidth of the entire pattern (i.e. of the system including each of the acoustic metasurfaces) so that the structure performs the same function over a wider range of frequencies. Two main methods are contemplated for doing this. In a first main method, the structure of the acoustic metasurfaces (and hence the operating frequencies) may be fixed, but the distances between the acoustic metasurfaces (D1, D2) may then be adjusted in a quasi-random pattern. The Applicants have found that the mutual distances can be optimised by analytical models, e.g. similar to those described in "The Pneumatic Tire" (US Department of Transportation, DOT HS 810 561, February 2006) or numerical methods used for optical systems, e.g. as described in Wetzstein et al., "Tensor Displays: Compressive Light Field Synthesis using Multilayer Displays with Directional Backlighting" (ACM Transactions on Graphics, July 2012). Alternatively, in a second main method, the distances (D1, D2) may be fixed, with the operating frequencies being varied. This may be more effective for applications with space constraints.

Although various embodiments have been described above in relation to systems that work in transmission, it will be appreciated that similar principles as described above can also be applied to systems using reflecting metasurfaces, or other types of acoustic waves.

Thus, although the techniques presented herein have been described with reference to particular embodiments, it will be understood by those skilled in the art that various changes in form and detail may be made without departing from the scope of the inventions as set forth in the accompanying claims.

The invention claimed is:

1. A noise reducing system that is configured to reduce an intensity associated with an incident acoustic wave, the system comprising a first acoustic metasurface including an arrangement of unit cells, the arrangement of unit cells defining a plane of the first acoustic metasurface, with at least some of the unit cells being configured to introduce time delays to an incident acoustic wave at the respective positions of the unit cells within the first acoustic metasurface, such that the unit cells define an arrangement of time delays to thereby define a spatial delay distribution for manipulating an incident acoustic wave, wherein the arrangement of unit cells comprises an alternating or repeating pattern of two or more different time delays, wherein the spatial delay distribution defined by the unit cells of the first acoustic metasurface is configured to reduce an intensity associated with an incident acoustic wave having an operating wavelength, $\lambda_0$, and wherein the arrangement of unit cells within the first acoustic metasurface is further configured to reduce an intensity associated with incident acoustic waves within a range of wavelengths around the operating wavelength, $\lambda_0$, such that the noise reducing system is configured to selectively reduce noise at a range of different operating wavelengths around the operating wavelength, $\lambda_0$, wherein at least some of the unit cells have a dimension within the plane of the acoustic metasurface of $\lambda_0/2$.

2. The system of claim 1, wherein the arrangement of unit cells defines a flat surface such that the plane of the first acoustic metasurface is a flat plane or wherein the arrangement of unit cells defines a curved surface such that the plane of the first acoustic metasurface is a curved plane.

3. The system of claim 1, further comprising a second acoustic metasurface provided in parallel to the first acoustic metasurface, and having a complimentary alternating pattern to the first acoustic metasurface, wherein the second acoustic metasurface is rotatable or otherwise moveable relative to the first acoustic metasurface to selectively attenuate incident acoustic waves.

4. The system of claim 1, further comprising a second acoustic metasurface provided in parallel to the first acoustic metasurface, wherein the first and second acoustic metasurfaces are rotatable or otherwise moveable relative to each other into at least a first configuration wherein the combination of the first and second acoustic metasurfaces acts to reduce an intensity of an incident acoustic wave.

5. The system of claim 1, further comprising a second acoustic metasurface that is spaced-apart from the first acoustic metasurface, wherein a mutual distance between the first and second acoustic metasurfaces is adjustable to selectively reduce an intensity of incident acoustic waves.

6. The system of claim 1, further comprising:

an acoustic source;

wherein the acoustic source and the first acoustic metasurface are arranged within a common housing or structure such that acoustic waves generated from the acoustic source are provided to and operated on by the first acoustic metasurface to generate an acoustic output or wherein an acoustic metasurface of the first acoustic metasurface comprises a surface of the acoustic source.

7. An adjustable noise reducing structure comprising a plurality of unit cells arranged into two or more acoustic metasurfaces, each acoustic metasurface comprising a respective arrangement of unit cells, at least some of the unit cells being configured to introduce time delays to an incident acoustic wave at the respective positions of the unit cells, such that the plurality of unit cells of the two or more acoustic metasurfaces together define an arrangement of time delays to thereby define a spatial delay distribution for the structure, wherein a relative orientation between the two or more acoustic metasurfaces is adjustable to control a noise reducing operation performed by the structure, wherein for a first relative orientation between the two or more acoustic metasurfaces, the spatial delay distribution for the structure is configured to cause an incident acoustic wave passing into and/or through the structure to at least partially destructively interfere with itself to generate an acoustic output with a reduced intensity, such that noise is substantially attenuated, whereas for a second, different relative orientation between the two or more acoustic metasurfaces, noise is not substantially attenuated.

8. An apparatus for reducing noise within a cylindrical cavity or passage, the apparatus comprising one or more unit cells, wherein at least some of the one or more unit cells comprise a respective channel extending through the unit cell, wherein the respective channel of the unit cell has a labyrinthine or meandered structure such that the unit cell is configured to introduce a respective time delay to an incident acoustic wave at the respective positions of the unit cells within the cylindrical cavity or passage, the respective time delays introduced by the one or more unit cells thereby defining a spatial delay distribution for the apparatus, wherein the spatial delay distribution for the apparatus is configured to cause an incident acoustic wave passing into and/or through the cylindrical cavity or passage to at least partially destructively interfere with itself to generate an acoustic output with a reduced intensity.

9. The apparatus of claim 8, wherein the apparatus defines a flow channel that is open to allow air, or another fluid, to flow through the cylindrical cavity or passage.

10. The apparatus of claim 9, wherein the flow channel comprises a substantially cylindrical pipe.

11. An appliance comprising an apparatus as claimed in claim 8, wherein the apparatus is arranged to reduce noise associated with an operation of the appliance.

12. The appliance of claim 11, wherein the appliance comprises: (i) a vacuum cleaner; (ii) a fan; or (iii) a hair dryer.

13. The apparatus of claim 9, wherein the flow channel is formed in an external surface of the apparatus.

14. A tyre or an item of clothing comprising the apparatus of claim 13.

15. The apparatus of claim 8 wherein the cylindrical cavity or passage defines a closed channel containing an incompressible fluid.

16. An anechoic tile comprising the apparatus of claim 15.

17. The apparatus of claim 8 wherein the cylindrical cavity or passage has a longitudinal axis along which a fluid can flow in use, and wherein the central channels of the at least some unit cells are arranged substantially parallel to the longitudinal axis of the flow channel.

18. The apparatus of claim 8, wherein two or more sets of unit cells are provided that are spaced-apart along the cylindrical cavity or passage.

19. The apparatus of claim 18, wherein the two or more sets of unit cells are configured to operate at different, but overlapping, frequency ranges, and wherein a distance between the two or more sets of unit cells is selected to increase the frequency range of operation of the structure.

20. The apparatus of claim 1, wherein the arrangement of unit cells comprises one or more annular or semi-annular unit cells.

21. An apparatus for reducing noise within a cylindrical cavity or passage, wherein the apparatus comprises a plurality of semi-annular unit cells that are configured to extend around an internal surface of the cylindrical cavity or passage, wherein the unit cells of the plurality of unit cells comprise respective central channels extending through the unit cell, and wherein the central channels of at least some of the plurality of unit cells have respective labyrinthine or meandered structures such that the unit cell is configured to introduce a respective time delay to an incident acoustic wave at the respective circumferential position of the unit cell within the cylindrical cavity or passage, and wherein the plurality of unit cells are arranged to cause an incident acoustic wave passing into and/or through the cylindrical cavity or passage to at least partially destructively interfere with itself to generate an acoustic output with a reduced intensity.

22. The apparatus of claim 21, wherein the apparatus defines a flow channel that is open to allow air, or another fluid, to flow through the cylindrical cavity or passage.

23. The apparatus of claim 1, wherein at least some of the unit cells are in the form of a substantially rectangular cuboid with a square base shape of side $\lambda_0/2$.

* * * * *